United States Patent
Fuji et al.

(10) Patent No.: US 9,176,014 B2
(45) Date of Patent: Nov. 3, 2015

(54) PRESSURE SENSOR, AUDIO MICROPHONE, BLOOD PRESSURE SENSOR, AND TOUCH PANEL

(71) Applicant: KABUSHIKI KAISHA TOSHIBA, Minato-ku (JP)

(72) Inventors: Yoshihiko Fuji, Kanagawa-ken (JP); Hideaki Fukuzawa, Kanagawa-ken (JP); Michiko Hara, Kanagawa-ken (JP); Yoshihiro Higashi, Kanagawa-ken (JP); Akio Hori, Kanagawa-ken (JP); Tomohiko Nagata, Kanagawa-ken (JP); Shiori Kaji, Kanagawa-ken (JP); Akiko Yuzawa, Kanagawa-ken (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 335 days.

(21) Appl. No.: 13/927,886

(22) Filed: Jun. 26, 2013

(65) Prior Publication Data
US 2014/0090486 A1    Apr. 3, 2014

(30) Foreign Application Priority Data
Oct. 3, 2012    (JP) .................................. 2012-221274

(51) Int. Cl.
| | |
|---|---|
| G01L 7/00 | (2006.01) |
| G01L 7/08 | (2006.01) |
| G01L 9/00 | (2006.01) |
| G01L 1/12 | (2006.01) |
| G01L 9/16 | (2006.01) |
| H04R 1/00 | (2006.01) |

(52) U.S. Cl.
CPC .................. *G01L 1/12* (2013.01); *G01L 9/0044* (2013.01); *G01L 9/0048* (2013.01); *G01L 9/16* (2013.01); *H04R 1/00* (2013.01)

(58) Field of Classification Search
None
See application file for complete search history.

(56) References Cited

U.S. PATENT DOCUMENTS

| | | | |
|---|---|---|---|
| 7,242,556 B2 * | 7/2007 | Gill | ........................... 360/324.12 |
| 7,324,310 B2 * | 1/2008 | Gill | ........................... 360/324.11 |
| 7,405,906 B2 * | 7/2008 | Funayama et al. | ............. 360/314 |
| 7,609,490 B2 * | 10/2009 | Mizuno et al. | ........... 360/324.11 |
| 7,656,621 B2 * | 2/2010 | Shimazawa et al. | ...... 360/324.12 |

(Continued)

OTHER PUBLICATIONS

U.S. Appl. No. 13/536,002, filed Jun. 28, 2012, Hideaki Fukuzawa, et al.

(Continued)

*Primary Examiner* — Peter MacChiarolo
*Assistant Examiner* — Jermaine Jenkins
(74) *Attorney, Agent, or Firm* — Oblon, McClelland, Maier & Neustadt, L.L.P.

(57) ABSTRACT

According to one embodiment, a pressure sensor includes a substrate, a first electrode, a second electrode, a first magnetic layer, a second magnetic, a spacer layer, a third magnetic layer. The substrate includes a first region and a second region. The first electrode is provided on the first region. The second electrode is provided on the first electrode. The first magnetic layer is provided between the first electrode and the second electrode. The second magnetic layer is provided between the first electrode and the first magnetic layer or between the first magnetic layer and the second electrode. The spacer layer is provided between the first magnetic layer and the second magnetic layer in a stacking direction of layers from the first electrode to the second electrode. The third magnetic layer is provided continuously with the second magnetic layer on the second region.

32 Claims, 49 Drawing Sheets

(56) References Cited

U.S. PATENT DOCUMENTS

| | | | |
|---|---|---|---|
| 7,715,156 B2* | 5/2010 | Hirata et al. | 360/324.2 |
| 8,569,852 B2* | 10/2013 | Morise et al. | 257/421 |
| 2007/0033799 A1* | 2/2007 | Pinarbasi | 29/603.13 |
| 2007/0081277 A1* | 4/2007 | Folks et al. | 360/319 |
| 2010/0294706 A1* | 11/2010 | Simonson | 210/222 |
| 2011/0295128 A1 | 12/2011 | Yuasa et al. | |
| 2012/0079887 A1 | 4/2012 | Giddings et al. | |
| 2012/0245477 A1 | 9/2012 | Giddings et al. | |
| 2013/0076687 A1 | 3/2013 | Giddings et al. | |
| 2013/0079648 A1 | 3/2013 | Fukuzawa et al. | |

OTHER PUBLICATIONS

U.S. Appl. No. 13/710,718, filed Dec. 11, 2012, Yoshihiro Higashi, et al.

D. Meyners, et al., "Pressure sensor based on magnetic tunnel junctions", Journal of Applied Physics 105, 07C914, 2009, 3 pages.

* cited by examiner

PRESSURE SENSOR, AUDIO MICROPHONE, BLOOD PRESSURE SENSOR, AND TOUCH PANEL

CROSS-REFERENCE TO RELATED APPLICATIONS

This application is based upon and claims the benefit of priority from Japanese Patent Application No. 2012-221274, filed on Oct. 3, 2012; the entire contents of which are incorporated herein by reference.

FIELD

Embodiments described herein relate generally to a pressure sensor, an audio microphone, a blood pressure sensor, and a touch panel.

BACKGROUND

For pressure sensors using MEMS (Micro Electro Mechanical Systems) technology, there are a piezoresistive change type and a capacitive type, for example. On the other hand, a pressure sensor using spin technology is proposed. The pressure sensor using spin technology is a strain resistance change type that detects a change in resistance according to strain. In the pressure sensor using spin technology, it is desired to provide a highly sensitive pressure sensor.

DETAILED DESCRIPTION

Figure 1A:
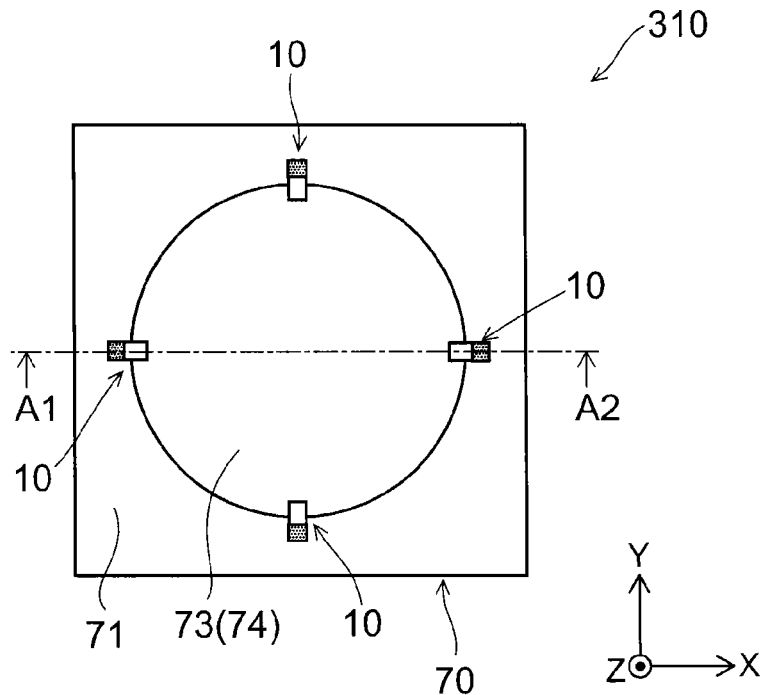
FIG. 1A and FIG. 1B are schematic views illustrating a pressure sensor according to a first embodiment.

According to one embodiment, a pressure sensor includes a substrate, a first electrode, a second electrode, a first magnetic layer, a second magnetic, a spacer layer, a third magnetic layer. The substrate includes a first region and a second region. A thickness of the second region is thinner than a thickness of the first region. The first electrode is provided on the first region. The second electrode is provided on the first electrode. The first magnetic layer is provided between the first electrode and the second electrode. The second magnetic layer is provided between the first electrode and the first magnetic layer or between the first magnetic layer and the second electrode. The magnetization direction of the second magnetic layer is variable. The spacer layer is provided between the first magnetic layer and the second magnetic layer in a stacking direction of layers from the first electrode to the second electrode. The third magnetic layer is provided continuously with the second magnetic layer on the second region. The magnetization of the third magnetic layer is changed according to strain caused on the second region.

In the following, embodiments will be described with reference to the drawings.

It is noted that the drawings are schematic or conceptual. A ratio of size between portions and the like are not necessarily the same as real ones. Moreover, even in the case of expressing the same portions, dimensions and ratios between the portions are sometimes expressed differently depending on the drawings. Furthermore, in the case where a notation A/B is expressed in a stacked structure of thin films, the notation expresses that a layer B is formed on a layer A.

In the specification and drawings, components similar to those described or illustrated in a drawing thereinabove are marked with the identical reference numerals, and a detailed description is omitted as appropriate.

First Embodiment

Figure 1B:
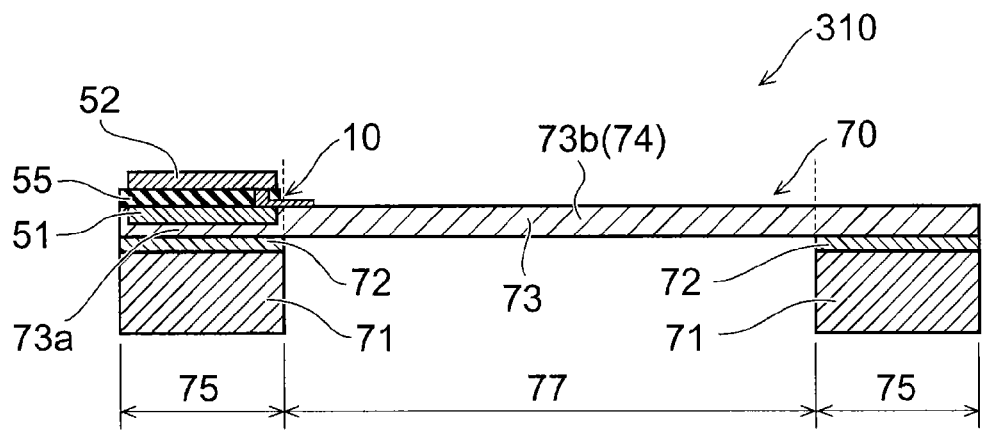

FIG. 1A and FIG. 1B are schematic views illustrating a pressure sensor according to a first embodiment.

FIG. 1A is a schematic plan view. FIG. 1B is a cross-sectional view along a line A1-A2 shown in FIG. 1A. In FIG. 1A and FIG. 1B, some layers are omitted for easily seeing the drawings.

As shown in FIG. 1A and FIG. 1B, a sensor 310 according to the embodiment includes a substrate 70, a first electrode 51, a second electrode 52, an insulator 55, and a stacked body 10. The substrate 70 includes a support substrate 71, an etching stopper layer 72, and a diaphragm film 73. The diaphragm film 73 is provided on the support substrate 71. The etching stopper layer 72 is provided between the support substrate 71 and the diaphragm film 73.

In the specification, a state in which "a component is provided on another component" also includes a state in which "a component is provided on another component with the component directly contacting another component" as wells a state in which "a component is provided on another component with a different element inserted between these components".

The substrate 70 includes a first region 75 and a second region 77. The first region 75 includes a first portion 73a located on the support substrate 71 among the support substrate 71, the etching stopper layer 72, and the diaphragm film 73. The second region 77 includes a second portion 73b of the diaphragm film 73 located on the inside of the support substrate 71. In other words, the diaphragm film 73 includes the first portion 73a and the second portion 73b. The second region 77 is provided on the inside of the first region 75. Namely, the second region 77 is surrounded by the first region 75.

Here, suppose that a plane parallel with the diaphragm film 73 is an X-Y plane. In the case where the surface of the diaphragm film 73 is not flat, a plane including the upper face of the support substrate 71 is the X-Y plane. Suppose that a direction perpendicular to the X-Y plane is a Z-axis direction.

The second portion 73b of the diaphragm film 73 located on the inside of the support substrate 71 is a portion that a part of the support substrate 71 is thinly processed, for example. In the following, the second portion 73b of the diaphragm film 73 located on the inside of the support substrate 71 is simply referred to as "a diaphragm". The thickness of the second region 77 (the length in the Z-axis direction) is thinner than the thickness of the first region 75 (the length in the Z-axis direction). A diaphragm 74 is of flexibility. The diaphragm 74 is bent when a pressure is externally applied. The external pressure includes a pressure itself and a pressure caused by acoustic waves or ultrasonic waves, for example. In the case of acoustic waves or ultrasonic waves, for example, a pressure sensor is to function as a microphone.

The first electrode 51 is provided on the first region 75. The second electrode 52 is provided on the first electrode 51. A part of the insulator 55 is provided between the first electrode 51 and the second electrode 52. A part of the stacked body 10 is provided between the first electrode 51 and the second electrode 52. The other part of the stacked body 10 is provided on the second region 77. The stacked body 10 functions as a strain sensing device whose electrical resistance is changed according to strain caused on the second region 77 (the diaphragm 74).

Figure 2A:
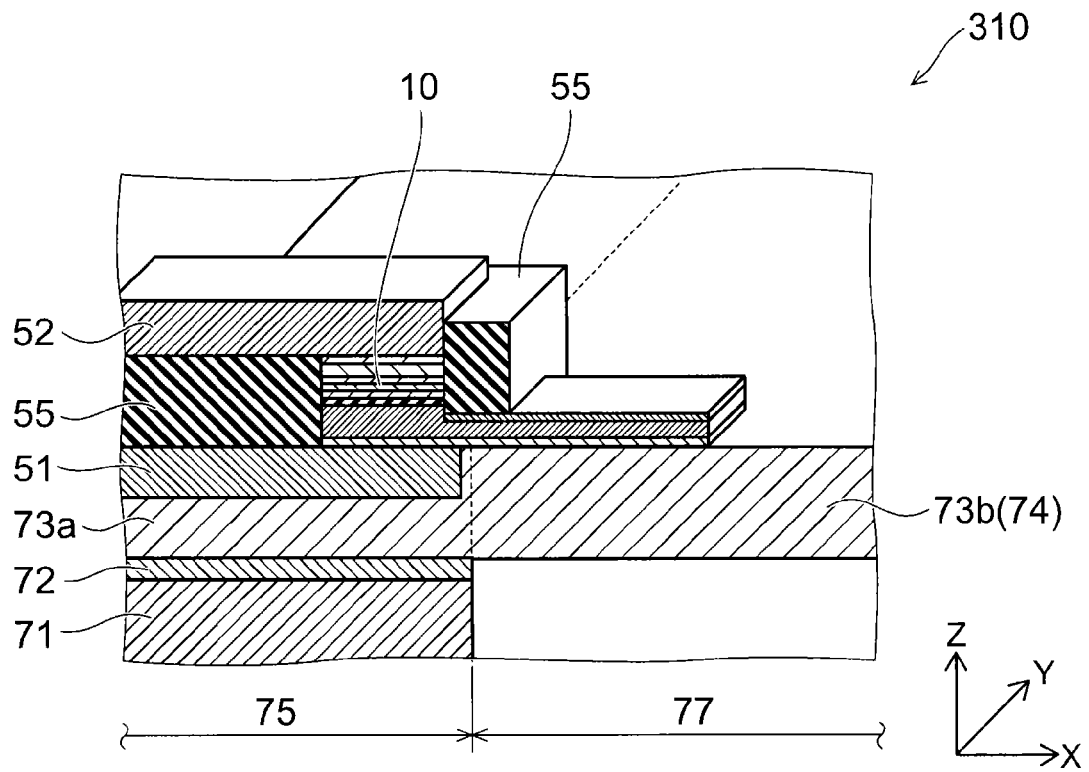
FIG. 2A and FIG. 2B are schematic views illustrating a part of the pressure sensor according to the first embodiment.
Figure 2B:
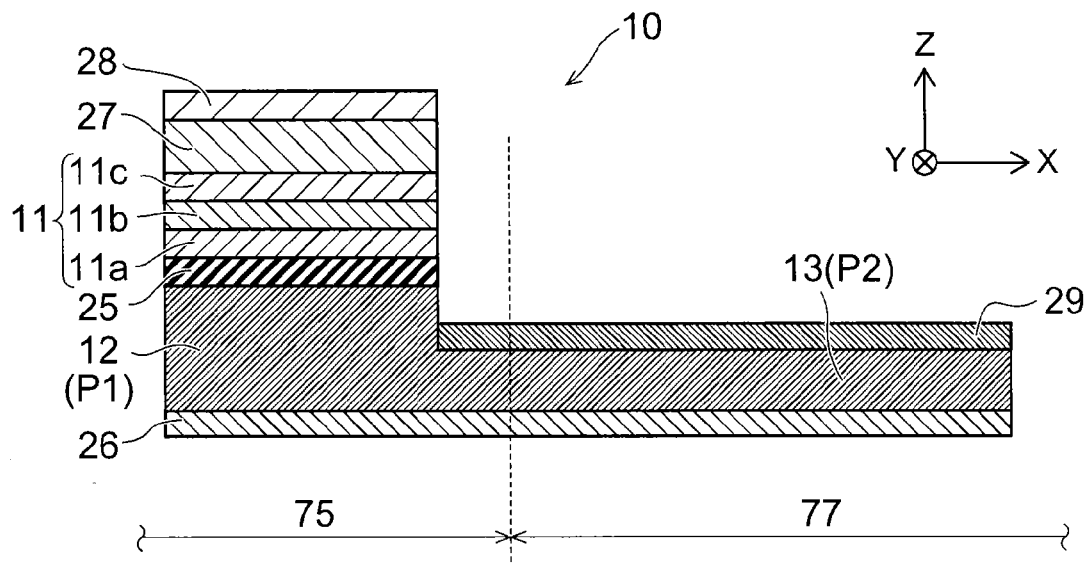

FIG. 2A and FIG. 2B are schematic views illustrating a part of the pressure sensor according to the first embodiment.

FIG. 2A is a perspective view schematically illustrating a part of the pressure sensor according to the first embodiment. FIG. 2B is a schematic plan view illustrating the stacked body provided on the pressure sensor according to the first embodiment.

As shown in FIG. 2A and FIG. 2B, a part of the stacked body 10 is provided on the first region 75. A portion of the stacked body 10 provided on the first region 75 is provided between the first electrode 51 and the second electrode 52. When a voltage is applied across the first electrode 51 and the second electrode 52, a current passes in a direction from the first electrode 51 to the second electrode 52 (the stacking direction of layers (the Z-axis direction)) or in a direction from the second electrode 52 to the first electrode 51.

The stacked body 10 includes a first magnetic layer 11, a second magnetic layer 12, and a spacer layer 25. The first magnetic layer 11 is provided between the first electrode 51 and the second electrode 52. The second magnetic layer 12 is provided between the first electrode 51 and the first magnetic layer 11 or between the first magnetic layer 11 and the second electrode 52. The magnetization direction of the second magnetic layer 12 is variable. The spacer layer 25 is provided between the first magnetic layer 11 and the second magnetic layer 12 in the stacking direction of layers from the first electrode 51 to the second electrode 52.

In the example, the stacked body 10 includes the first magnetic layer 11, the second magnetic layer 12, a third magnetic layer 13, the spacer layer 25, a under layer 26, a pinning layer 27, a first cap layer 28, and a second cap layer 29. The first magnetic layer 11 includes a first reference layer 11a, a magnetic coupling layer 11b, and a second reference layer 11c. However, the first magnetic layer 11 may be formed of a single reference layer.

On the first region 75 in the example, the under layer 26 is provided between the first electrode 51 and the second electrode 52. The second magnetic layer 12 is provided between the under layer 26 and the second electrode 52. The spacer layer 25 is provided between the second magnetic layer 12 and the second electrode 52. The first reference layer 11a is provided between the spacer layer 25 and the second electrode 52. The magnetic coupling layer 11b is provided between the first reference layer 11a and the second electrode 52. The second reference layer 11c is provided between the magnetic coupling layer 11b and the second electrode 52. The pinning layer 27 is provided between the second reference layer 11c and the second electrode 52. The first cap layer 28 is provided between the pinning layer 27 and the second electrode 52.

In the example, the second cap layer 29 is provided on the second region 77. The under layer 26 is provided between the diaphragm 74 and the second cap layer 29. The third magnetic layer 13 is provided between the under layer 26 and the second cap layer 29.

In the example, the third magnetic layer 13 continues with the second magnetic layer 12. For example, the third magnetic layer 13 is formed as a magnetic layer integrated with the second magnetic layer 12. In this case, the second magnetic layer 12 is a first portion P1 of one magnetic layer, and the first portion P1 is provided between the first electrode 51 and the second electrode 52. In this case, the third magnetic layer 13 is a second portion P2 of one magnetic layer, and the second portion P2 is provided on the second region.

Alternatively, the third magnetic layer 13 may be formed as a magnetic layer separately from the second magnetic layer 12.

In this case, the third magnetic layer 13 contacts the second magnetic layer 12 in the direction crossing the stacking direction of layers.

In any cases, in the direction crossing the stacking direction of layers (in the X-axis direction in the example in FIG. 2A), the third magnetic layer 13 includes a portion overlapping with the second magnetic layer 12. In other words, the third magnetic layer 13 is not apart from the second magnetic layer 12 in the stacking direction of layers.

In the following, the case will be described where the third magnetic layer 13 is formed as a magnetic layer integrated with the second magnetic layer 12.

The first magnetic layer 11 is a reference layer, for example. For the reference layer, a magnetization fixed layer or a magnetization free layer is used. For example, the first reference layer 11a is a magnetization fixed layer or a magnetization free layer. For example, the second reference layer 11c is a magnetization fixed layer or a magnetization free layer.

The second magnetic layer 12 is a magnetization free layer, for example. The third magnetic layer 13 is a magnetization free layer, for example. The magnetization of the second magnetic layer 12 tends to change more easily than the magnetization of the first magnetic layer 11 does.

In the following, the case will be described where the first magnetic layer 11 is a magnetization fixed layer (the case where the first reference layer 11a and the second reference layer 11c are magnetization fixed layers).

In the following, an exemplary operation of the pressure sensor according to the embodiment will be described.

Figure 3A:
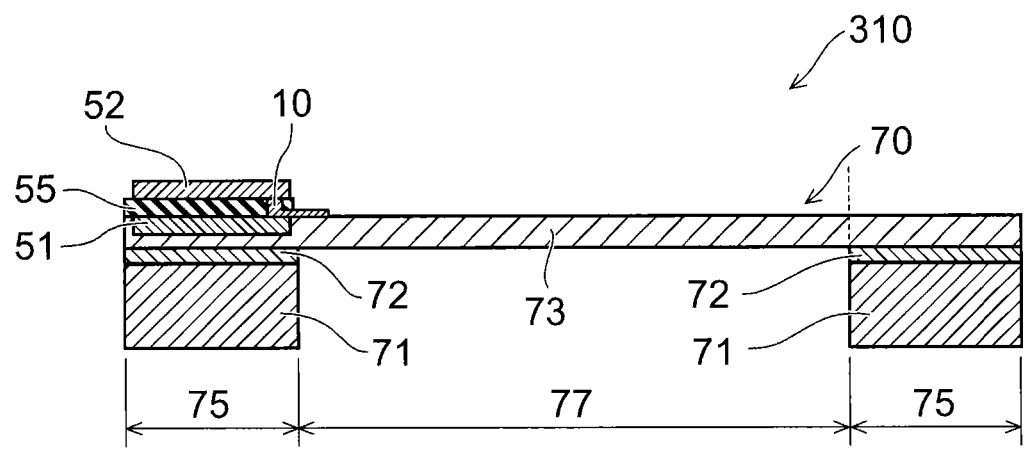
FIG. 3A and FIG. 3B are schematic views illustrating the operation of the pressure sensor according to the embodiment.
Figure 3B:
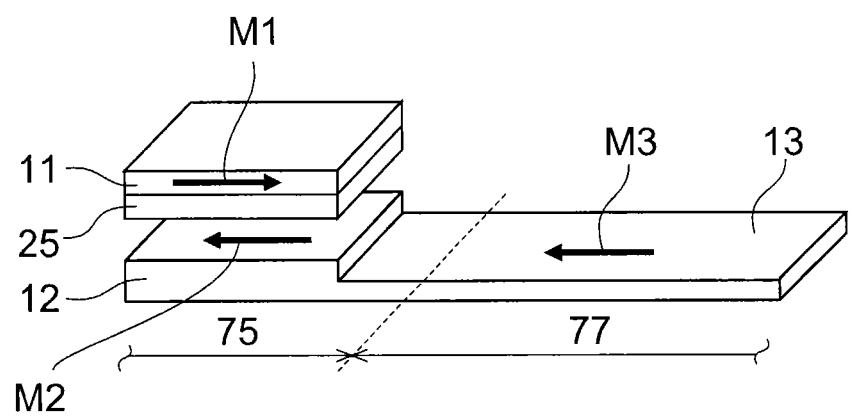

FIG. 3A and FIG. 3B are schematic views illustrating the operation of the pressure sensor according to the embodiment.

Figure 4A:
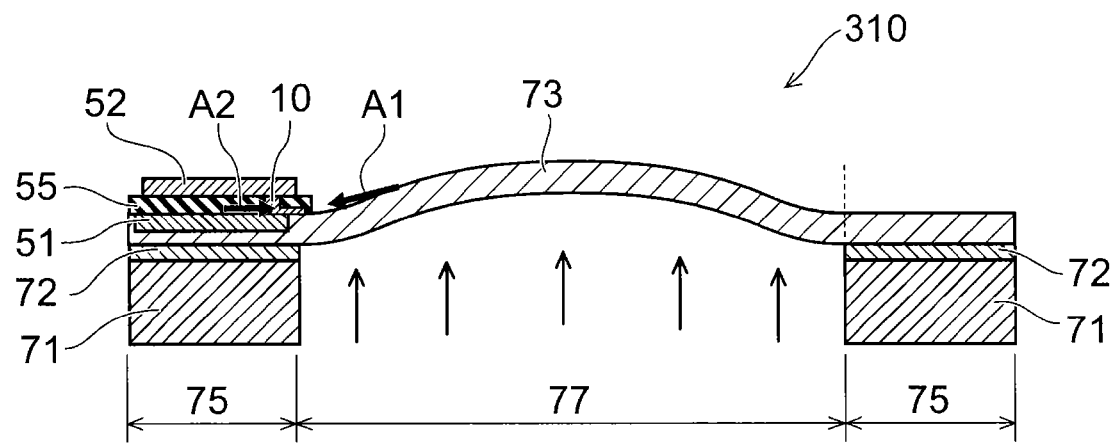
FIG. 4A and FIG. 4B are schematic views illustrating the operation of the pressure sensor according to the embodiment.
Figure 4B:
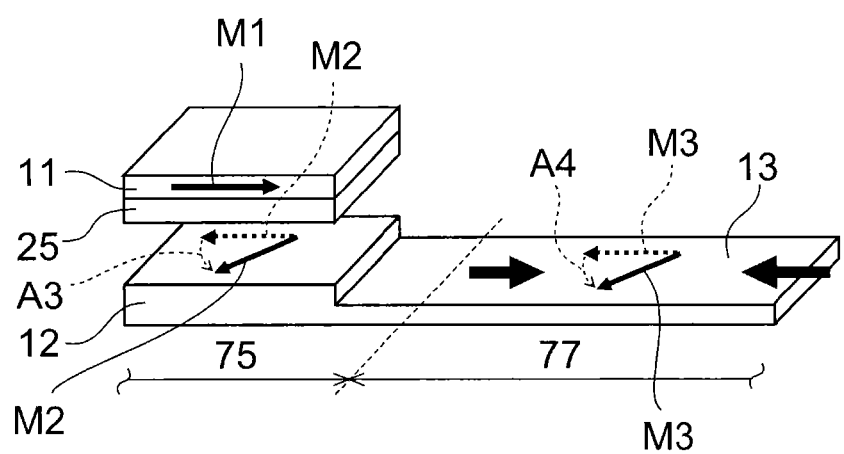

FIG. 4A and FIG. 4B are schematic views illustrating the operation of the pressure sensor according to the embodiment.

FIG. 3A is a schematic plan view illustrating the pressure sensor in the state in which no external pressure is applied. FIG. 3B is a perspective view schematically illustrating magnetization directions in the state in which no external pressure is applied.

FIG. 4A is a schematic plan view illustrating the pressure sensor in the state in which an external pressure is applied from the back surface (the lower surface) of the diaphragm. FIG. 4B is a perspective view schematically illustrating magnetization directions in the state in which an external pressure is applied from the back surface (the lower surface) of the diaphragm.

The operation of the stacked body 10 functioning as a strain sensing device in the pressure sensor 310 is based on the applications of "the inverse magnetostrictive effect" and "the magnetoresistive effect". "The inverse magnetostrictive effect" is obtained in a ferromagnetic layer used for the magnetization free layer. "The magnetoresistive effect" appears in a stacked film of the reference layer, the spacer layer, and the magnetization free layer.

"The inverse magnetostrictive effect" is a phenomenon in which the magnetization of a ferromagnetic body is changed by strain applied to the ferromagnetic body. Namely, when strain is externally applied to a stacked film (a magnetoresistive effect element), the magnetization direction of the magnetization free layer is changed. As a result, a relative angle between the magnetization of the reference layer and the magnetization of the magnetization free layer is changed. "The magnetoresistive effect" causes a change in electrical resistance.

"The magnetoresistive effect (the MR effect)" is a phenomenon in which when an external magnetic field is applied to a stacked film having a magnetic body, the value of the electrical resistance of the stacked film is changed due to a change in the magnetization of the magnetic body. The MR effect includes the GMR (giant magnetoresistance) effect, or the TMR (tunneling magnetoresistance) effect, for example. A change in a relative angle between the orientations of magnetization is read as a change in electrical resistance by passing a current through the stacked film, so that the MR effect appears. For example, tensile stress is applied to the stacked film based on stress applied to the stacked film. When the orientation of the magnetization of the magnetization free layer is different from the direction of the tensile stress applied to the reference layer, the MR effect appears due to the inverse magnetostrictive effect. ΔR/R is referred to as "an MR change rate" where a resistance in a low resistance state is R, and an amount of a change in electrical resistance varied due to the MR effect is ΔR.

As shown in FIG. 3A and FIG. 3B, in the state in which no external pressure is applied, the diaphragm 74 is not deformed. No strain occurs as well on the edge of the diaphragm 74 provided with the third magnetic layer 13 (the boundary portion between the first region 75 and the second region 77). FIG. 3B illustrates the case where the alignment between a magnetization M1 of the first magnetic layer and a magnetization M2 of the second magnetic layer 12 is at an angle of 180° in the state in which no strain occurs. FIG. 3B illustrates the case where the alignment between the magnetization M1 of the first magnetic layer and a magnetization M3 of the third magnetic layer is at an angle of 180° in the state in which no strain occurs. Here, the third magnetic layer 13 continues with the second magnetic layer 12. The third magnetic layer 13 is magnetically coupled to the second magnetic layer 12.

As shown in FIG. 4A and FIG. 4B, in the state in which a positive pressure is applied from the back surface of the diaphragm 74, the surface (the upper surface) of the diaphragm 74 is deformed upwards. In this case, the central portion of the diaphragm 74 has a convex shape. Thus, strain on the surface of the diaphragm 74 at the central portion is tensile strain. On the other hand, on the edge of the diaphragm 74, the joining portion of the diaphragm 74 to the support substrate 71 is a fixing end, and warpage occurs. Thus, a concave deformation occurs on the edge of the diaphragm 74. In this case, as arrows A1 and A2 shown in FIG. 4A, compressive strain occurs on the surface of the diaphragm 74 in the radial direction on the edge of the diaphragm 74.

In the occurrence of the compressive strain, compressive strain occurs on the third magnetic layer 13. Thus, in the case where the third magnetic layer 13 is formed of a ferromagnetic body having a positive magnetostriction constant, "the inverse magnetostrictive effect" acts in such a way that the magnetization of the third magnetic layer 13 deviates from the direction to which compressive strain is applied. Thus, as an arrow A4 shown in FIG. 4B, a relative angle between the magnetization M3 of the third magnetic layer and the magnetization M1 of the first magnetic layer is changed from an angle of 180° in the state in which the diaphragm 74 is not deformed.

On the other hand, strain does not substantially occur on the second magnetic layer 12. Here, the second magnetic layer 12 is magnetically coupled to the third magnetic layer. Thus, as an arrow A3 shown in FIG. 4B, the magnetization M2 of the second magnetic layer 12 is changed together with a change in the magnetization M3 of the third magnetic layer 13. In other words, the direction of the magnetization M2 of the second magnetic layer 12 is changed according to the direction of the magnetization M3 of the third magnetic layer 13. Namely, a change in the magnetization M3 of the third magnetic layer 13 provided on the second region 77 where strain occurs can be transduced to the magnetization M2 of the second magnetic layer 12 provided on the first region 75.

The transduction of a change in a physical quantity caused by strain between the third magnetic layer 13 on the second region 77 and the second magnetic layer 12 on the first region 75 does not exist in a silicon (Si) piezoresistive change element. The transduction is a phenomenon in a strain sensing device using a magnetic film. Also on the first region 75 where no strain occurs, a change in the magnetization M2 of the second magnetic layer can be caused by an external pressure. Accordingly, a change in electrical resistance caused by an external pressure can be obtained.

Figure 5:
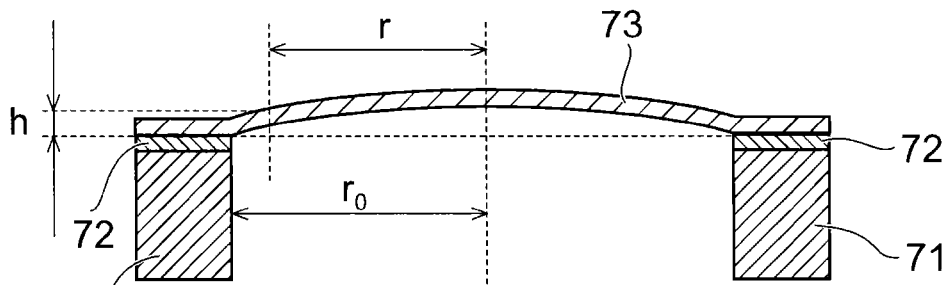
FIG. 5 is a schematic plan view illustrating the pressure sensor in the state in which an external pressure is applied.

FIG. 5 is a schematic plan view illustrating the pressure sensor in the state in which an external pressure is applied.

Figure 6:
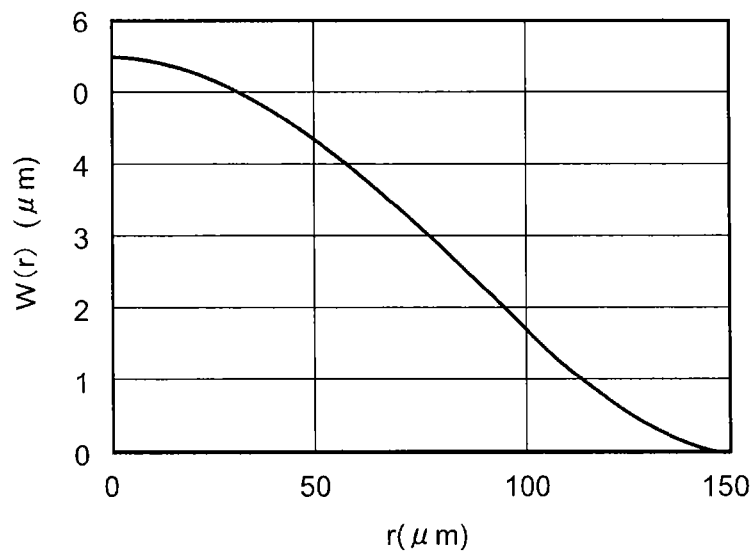
FIG. 6 is a graph illustrating the deformation of the diaphragm.

FIG. 6 is a graph illustrating the deformation of the diaphragm.

Figure 7:
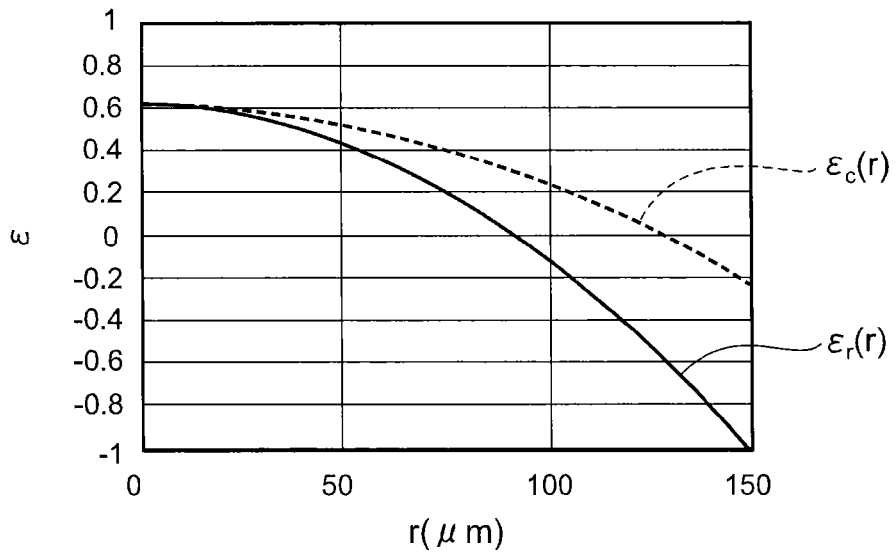
FIG. 7 is a graph illustrating strain caused on the diaphragm.

FIG. 7 is a graph illustrating strain caused on the diaphragm.

Deformation W (r) of the diaphragm 74, strain $\varepsilon_r$ (r) caused on the surface of the diaphragm 74 in the radial direction, and strain $\varepsilon_c$ (r) caused on the surface of the diaphragm 74 in the circumferential direction are expressed by equations below, respectively.

Equation 1

$$W(r) = \frac{3}{16} P \frac{(1-v^2)}{Eh^3} (r_0^2 - r^2) \left\{ (r_0^2 - r^2) + \frac{4}{1-v} h^2 \right\} \quad (1)$$

Equation 2

$$\varepsilon_r(r) = \frac{3}{8Eh^2} P\{(1+v)r_0^2 - (3+v)r^2\} \quad (2)$$

Equation 3

$$\varepsilon_c(r) = \frac{3}{8Eh^2} P\{(1+v)r_0^2 - (1+3v)r^2\} \quad (3)$$

As shown in FIG. 5, "r" is a distance from the center of the diaphragm 74 in the case where an external pressure is applied. "$r_0$" is the radius of the diaphragm 74. "E" is the Young's modulus of the diaphragm 74. "v" is the Poisson's ratio of the diaphragm 74. "h" is the thickness of the diaphragm 74 (the length in the Z-axis direction). "p" is an external pressure applied to the back surface of the diaphragm 74.

FIG. 6 and FIG. 7 illustrate the calculated results of the equations. The following is the structure parameters: r=150 P=10 kPa, E=165 GPa (the value of a Si single crystal), and v=0.22 (the value of a Si single crystal). As shown in FIG. 6, a portion near the center of the diaphragm 74 (r to 0) is warped convexly. The edge of the diaphragm 74 (r to 150) is warped concavely. As shown in FIG. 7, a larger strain is obtained in the radial direction of the edge of the diaphragm 74. From Equation (2), strain caused on the diaphragm 74 is inversely proportional to the square of the thickness of the diaphragm 74. When the diaphragm 74 is thin, strain caused against a pressure can be increased. Thus, pressure sensitivity can be improved.

In the sensor 310 according to the embodiment, the first electrode 51 is provided on the first region 75. The second electrode 52 is provided on the first electrode 51. The thickness of the first electrode 51 (the length in the Z-axis direction) is thicker than the thickness of the third magnetic layer 13. The thickness of the second electrode 52 (the length in the Z-axis direction) is thicker than the thickness of the third magnetic layer 13. The thickness of the third magnetic layer 13 is about 4 to 20 nanometers (nm), for example. The thickness of the third magnetic layer 13 is thinner than the thickness of the diaphragm 74. The third magnetic layer 13 is provided on the second region 77. Thus, the first electrode 51 and the second electrode 52 are provided on the first region 75, so that the thickness of an element formed on the second region 77 can be more reduced. Namely, the reduction in the thickness of the diaphragm 74 is implemented. Accordingly, pressure sensitivity is improved. According to the embodiment, a pressure sensor of high pressure sensitivity can be provided.

In the sensor 310 according to the embodiment, as described above, the third magnetic layer 13 is provided on the second region 77. The first electrode 51 is provided on the first region 75. The second electrode 52 is provided on the first electrode 51. In other words, the second electrode 52 is provided on the second region 77. The thickness of the third magnetic layer 13 is thinner than the thickness of the first electrode 51. The thickness of the third magnetic layer 13 is thinner than the thickness of the second electrode 52. Accordingly, the pressure sensor 310 can obtain a large strain against an external pressure. The pressure sensor 310 transduces the magnetization of the third magnetic layer 13 changed due to a large strain to the magnetization of the second magnetic layer 12, so that the pressure sensor 310 can detect a large change in electrical resistance.

In the description related to FIG. 3A to FIG. 4B, the case is described where the third magnetic layer 13 is formed of a magnetic body having a positive magnetostriction constant and magnetization is changed in such a way that an angle between the magnetization and the direction to which compressive strain is applied is increased. Such a configuration may be possible in which the third magnetic layer 13 is formed of a ferromagnetic body having a positive magnetostriction constant and magnetization is directed in the direction to which tensile strain is applied. Such a configuration may be possible in which in the case where the third magnetic layer 13 is formed of a ferromagnetic body having a negative magnetostriction constant, magnetization is directed in the direction to which compressive strain is applied. In this case, magnetization may be changed in such a way that an angle between the magnetization and the direction to which tensile strain is applied is increased.

In the description related to FIG. 4A and FIG. 4B, the case is described where a positive external pressure is applied from the back surface of the diaphragm 74. The sensor 310 according to the embodiment is similarly operated also in the case where a negative external pressure is applied. In the description related to FIG. 4A and FIG. 4B, the case is described where the alignment between the magnetization M1 of the first magnetic layer and the magnetization M2 of the second magnetic layer 12 is at an angle of 180° in the state in which no external pressure is applied. In the description related to FIG. 4A and FIG. 4B, the case is described where the alignment between the magnetization M1 of the first magnetic layer and the magnetization M3 of the third magnetic layer is at an angle of 180° in the state in which no external pressure is applied. An initial relative angle between the magnetization M1 of the first magnetic layer and the magnetization M2 of the second magnetic layer 12 is optional. An initial relative angle between the magnetization M1 of the first magnetic layer and the magnetization M3 of the third magnetic layer is optional.

In the following, a reference sample will be described.

In a pressure sensor according to the reference sample, a stacked body 10, a first electrode 51, and a second electrode 52 are provided on a second region 77. The stacked body 10, the first electrode 51, and the second electrode 52 are provided on the edge of a diaphragm 74. The thickness of the first electrode 51 is about 100 to 300 nm, for example. The thickness of the second electrode 52 is about 100 to 300 nm, for example. The thickness of the stacked body 10 is about 40 nm, for example. The thickness of the diaphragm 74 is about 500 nm, for example.

In the pressure sensor according to the reference sample, the thickness of the first electrode 51 is a considerable thickness with respect to the diaphragm 74. The thickness of the second electrode 52 is a considerable thickness with respect to the diaphragm 74. This means the same as the fact that the thickness of the edge of the diaphragm 74 is substantially increased. Thus, even though the thickness of the diaphragm 74 is reduced, it is sometimes difficult to sufficiently increase a change in strain against a pressure.

In the following, an exemplary configuration of the stacked body according to the embodiment will be described with reference to the drawings.

The structure of the stacked body shown in FIG. 8 to FIG. 13 below is a top spin-valve structure in which a magnetization free layer is formed below a magnetization fixed layer.

Figure 8:
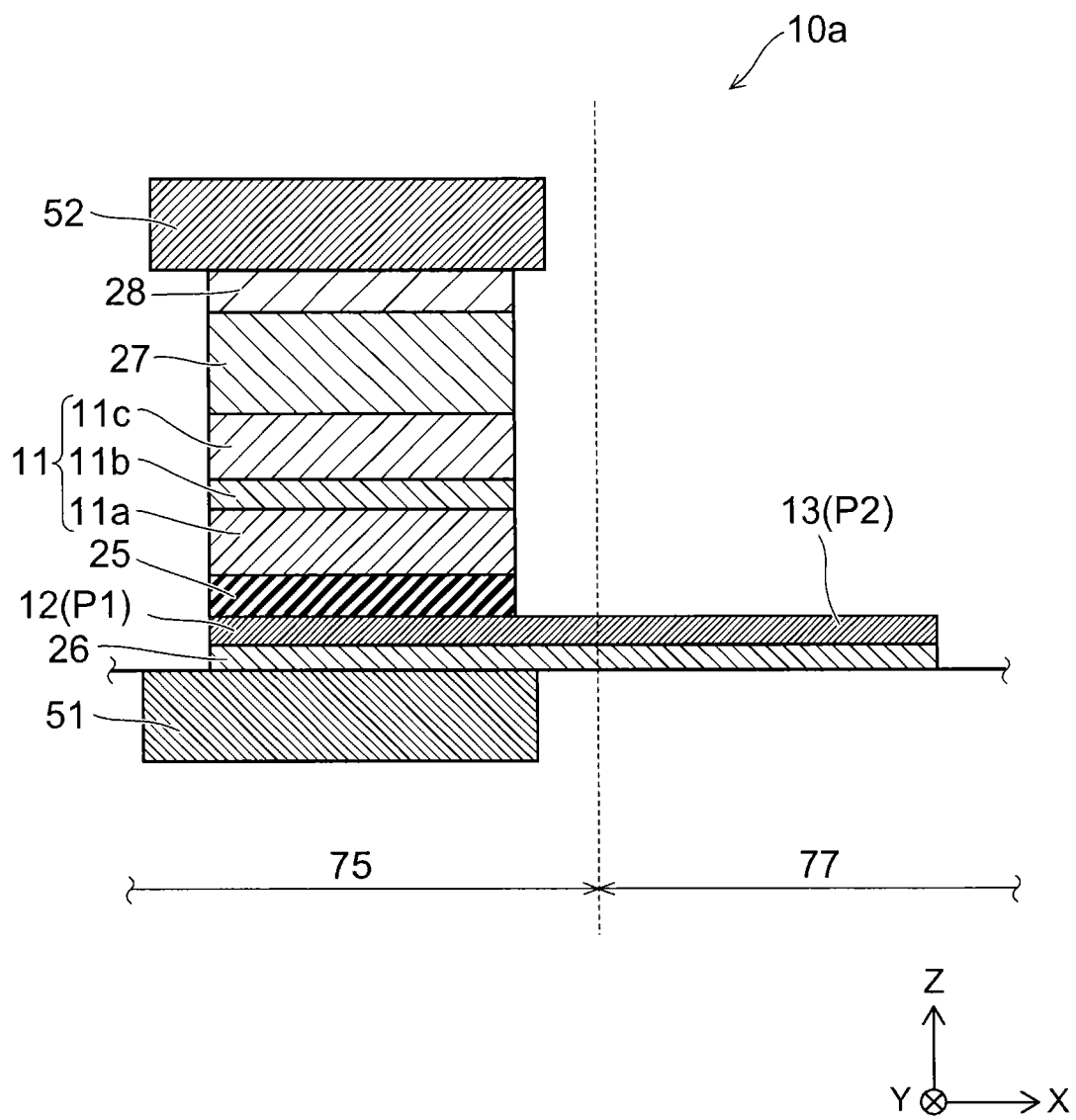
FIG. 8 is a schematic cross-sectional view illustrating a first stacked body.

FIG. 8 is a schematic cross-sectional view illustrating a first stacked body.

A first stacked body 10a shown in FIG. 8 includes the first magnetic layer 11, the second magnetic layer 12, the third magnetic layer 13, the spacer layer 25, the under layer 26, the pinning layer 27, and the first cap layer 28. The first magnetic layer 11 includes the first reference layer 11a, the magnetic coupling layer 11b, and the second reference layer 11c.

On the first region 75, the under layer 26 is provided between the first electrode 51 and the second electrode 52. The second magnetic layer 12 is provided between the under layer 26 and the second electrode 52. The spacer layer 25 is provided between the second magnetic layer 12 and the second electrode 52. The first reference layer 11a is provided between the spacer layer 25 and the second electrode 52. The magnetic coupling layer 11b is provided between the first reference layer 11a and the second electrode 52. The second reference layer 11c is provided between the magnetic coupling layer 11b and the second electrode 52. The pinning layer 27 is provided between the second reference layer 11c and the second electrode 52. The first cap layer 28 is provided between the pinning layer 27 and the second electrode 52.

The third magnetic layer 13 is provided on the second region 77. The under layer 26 is provided between the diaphragm 74 and the third magnetic layer 13.

The third magnetic layer 13 continues with the second magnetic layer 12. For example, the third magnetic layer 13 is formed as a magnetic layer integrated with the second magnetic layer 12. In this case, the second magnetic layer 12 is the first portion P1 of one magnetic layer, and the first portion P1 is provided between the first electrode 51 and the second electrode 52. In this case, the third magnetic layer 13 is the second portion P2 of one magnetic layer, and the second portion P2 is provided on the second region.

Alternatively, the third magnetic layer 13 may be formed as a magnetic layer separately from the second magnetic layer 12. In this case, the third magnetic layer 13 contacts the second magnetic layer 12 in the direction crossing the stacking direction of layers.

In any cases, in the direction crossing the stacking direction of layers (in the X-axis direction), the third magnetic layer 13 includes a portion overlapping with the second magnetic layer 12. In other words, the third magnetic layer 13 is not apart from the second magnetic layer 12 in the stacking direction of layers. In the case where the third magnetic layer 13 is formed as a magnetic layer separately from the second magnetic layer 12, preferably, the absolute value of the magnetostriction constant of the third magnetic layer 13 is greater than the absolute value of the magnetostriction constant of the second magnetic layer 12.

The first stacked body 10a has the following configuration, for example.

Silicon is used for the support substrate 71.

Tantalum (Ta)/copper (Cu)/tantalum (Ta) is used for the first electrode 51. The thickness of tantalum formed below copper (the length in the Z-axis direction) is 10 nm. The thickness of copper (the length in the Z-axis direction) is 200 nm. The thickness of tantalum formed on copper (the length in the Z-axis direction) is 30 nm.

Ta/Cu is used for the under layer 26. The thickness of Ta (the length in the Z-axis direction) is 3 nm. The thickness of Cu (the length in the Z-axis direction) is 2 nm.

$Fe_{80}Ga_{20}/Co_{40}Fe_{40}B_{20}$ is used for the second magnetic layer 12 and the third magnetic layer 13. The thickness of $Fe_{80}Ga_{20}$ is 4 nm. The thickness of $Co_{40}Fe_{40}B_{20}$ is 2 nm.

An MgO layer having a thickness of 1.5 nm is used for the spacer layer 25.

A $Co_{40}Fe_{40}B_{20}$ layer having a thickness of 3 nm is used for the first reference layer 11a.

A Ru layer having a thickness of 0.9 nm is used for the magnetic coupling layer 11b.

A $Co_{75}Fe_{25}$ layer having a thickness of 2.5 nm is used for the second reference layer 11c.

An IrMn layer having a thickness of 7 nm is used for the pinning layer 27.

Ta/Ru is used for the first cap layer 28. The thickness of a Ta layer (the length in the Z-axis direction) is 1 nm. The thickness of a Ru layer (the length in the Z-axis direction) is 5 nm.

Tantalum (Ta)/copper (Cu)/tantalum (Ta) is used for the second electrode 52. The thickness of tantalum formed below copper (the length in the Z-axis direction) is 10 nm. The thickness of copper (the length in the Z-axis direction) is 200 nm. The thickness of tantalum formed on copper (the length in the Z-axis direction) is 30 nm.

Aluminum (Al), an aluminum copper alloy (Al—Cu), copper (Cu), silver (Ag), and gold (Au), for example, are used for the first electrode 51 and the second electrode 52. A material whose electrical resistance is relatively small is used for the first electrode 51 and the second electrode 52, so that a current can be efficiently passed through the first stacked body 10a.

The first electrode 51 may have a structure in which a layer formed of a material having a relatively small electrical resistance described above is provided between a under layer for the first electrode 51 (not shown) and a cap layer (not shown). For example, tantalum (Ta)/copper (Cu)/tantalum (Ta) or the like is used for the first electrode 51. Ta is used for the under layer for the first electrode 51, so that the adhesion between the support substrate 71 and the first electrode 51 can be improved. Titanium (Ti), titanium nitride (TiN), or the like can be used for the under layer for the first electrode 51, other than Ta.

A non-conductor film is formed on the surface of the Ta layer due to surface oxidation. Thus, Ta is used for the cap layer for the first electrode 51, so that the oxidation of copper (Cu) below the cap layer can be prevented, for example. Titanium (Ti), titanium nitride (TiN), or the like is used for the cap layer for the first electrode 51, other than Ta.

For the under layer 26, a stacked structure of a buffer layer (not shown) and a seed layer (not shown) is used. The buffer layer relaxes the roughness of the surfaces of the first electrode 51 and the diaphragm 74, and improves the crystal quality of a layer stacked on the buffer layer, for example. For the buffer layer, at least one selected from a group consisting of tantalum (Ta), titanium (Ti), vanadium (V), tungsten (W), zirconium (Zr), hafnium (Hf), and chromium (Cr) is used, for example. For the buffer layer, an alloy including at least one material selected from these materials may be used.

Preferably, the thickness of the buffer layer is 1 nm or more and 10 nm or less. More preferably, the thickness of the buffer layer is 1 nm or more and 5 nm or less. When the thickness of the buffer layer is too thin, the buffer effect is lost. On the other hand, when the thickness of the buffer layer is too thick, the thickness of the thin film (the stacked body 10) on the diaphragm 74 becomes thick. A seed layer is formed on the buffer layer, and the seed layer can have the buffer effect. In this case, the buffer layer may be omitted. A Ta layer having a thickness of 3 nm is used for the buffer layer, for example.

The seed layer, not shown, controls the crystal alignment of a layer stacked on the seed layer. The seed layer controls the crystal grain size of a layer stacked on the seed layer. For the seed layer, a metal in an fcc structure (face-centered cubic structure), an hcp structure (hexagonal close-packed structure), or a bcc structure (body-centered cubic structure), for example, is used.

For the seed layer, ruthenium (Ru) in the hcp structure or NiFe or Cu in the fcc structure is used, so that the crystal alignment of the spin valve film (the second magnetic layer 12 and the third magnetic layer 13) on the seed layer can be aligned in the fcc alignment (111), for example. A Cu layer having a thickness of 2 nm or a Ru layer having a thickness of 2 nm is used for the seed layer, for example. In the case of enhancing the crystal alignment characteristics of a layer formed on the seed layer, preferably, the thickness of the seed layer is 1 nm or more and 5 nm or less. More preferably, the thickness of the seed layer is 1 nm or more and 3 nm or less. Accordingly, the function of the seed layer to improve crystal alignment is sufficiently exerted. On the other hand, for example, in the case where it is unnecessary to align the crystals of a layer formed on the seed layer (in the case of forming an amorphous magnetization free layer, for example), the seed layer may be omitted. A Cu layer having a thickness of 2 nm is used for the seed layer.

The second magnetic layer 12 is a magnetization free layer. The third magnetic layer 13 is a magnetization free layer. A ferromagnetic material is used for the second magnetic layer 12 and the third magnetic layer 13. A FeCo alloy or a NiFe alloy, for example, is used for the materials of the second magnetic layer 12 and the third magnetic layer 13. In addition to this, the following is used for the materials of the second magnetic layer 12 and the third magnetic layer 13: a Co—Fe—B alloy, a Fe—Co—Si—B alloy, a Fe—Ga alloy expressing a magnetostriction constant $\lambda s > 100$ ppm, a Fe—Co—Ga alloy, a Tb-M—Fe alloy (M is at least one selected from a group consisting of Sm, Eu, Gd, Dy, Ho, and Er), a Tb-M1-Fe-M2 alloy (M1 is at least one selected from a group consisting of Sm, Eu, Gd, Dy, Ho, and Er, and M2 is at least one selected from a group consisting of Ti, Cr, Mn, Co, Cu, Nb, Mo, W, and Ta), a Fe-M3-M4-B alloy (M3 is at least one selected from a group consisting of Ti, Cr, Mn, Co, Cu, Nb, Mo, W, and Ta, and M4 is at least one selected from a group consisting of Ce, Pr, Nd, Sm, Tb, Dy, and Er), Ni, Fe—Al, or ferrite (such as $Fe_3O_4$ and $(FeCo)_3O_4$)), for example. The thicknesses of the second magnetic layer 12 and the third magnetic layer 13 are 2 nm or more, for example.

The second magnetic layer 12 may have a multi-layer structure. The third magnetic layer 13 may have a multi-layer structure. The second magnetic layer 12 may have a two-layer structure, for example. The third magnetic layer 13 may have a two-layer structure, for example. In the case where an MgO tunnel insulating layer is used for the spacer layer 25, preferably, a layer of a Co—Fe—B alloy is provided on an interface contacting the spacer layer 25. Accordingly, a high magnetoresistive effect is obtained. In this case, the following stacked structure is used in which a Fe—Co—Si—B alloy, a Fe—Ga alloy expressing λs>100 ppm, a Fe—Co—Ga alloy, a Tb-M—Fe alloy (M is at least one selected from a group consisting of Sm, Eu, Gd, Dy, Ho, and Er), a Tb-M1-Fe-M2 alloy (M1 is at least one selected from a group consisting of Sm, Eu, Gd, Dy, Ho, and Er, and M2 is at least one selected from a group consisting of Ti, Cr, Mn, Co, Cu, Nb, Mo, W, and Ta), a Fe-M3-M4-B alloy (M3 is at least one selected from a group consisting of Ti, Cr, Mn, Co, Cu, Nb, Mo, W, and Ta, and M4 is at least one selected from a group consisting of Ce, Pr, Nd, Sm, Tb, Dy, and Er), Ni, Fe—Al, or ferrite (such as $Fe_3O_4$ and $(FeCo)_3O_4$)) is formed on the under layer 26 and a layer of a Co—Fe—B alloy is provided thereon. $Fe_{80}Ga_{20}/Co_{40}Fe_{40}B_{20}$ is used, for example. The thickness of $Fe_{80}Ga_{20}$ is 4 nm. The thickness of $Co_{40}Fe_{40}B_{20}$ is 2 nm.

The spacer layer 25 decouples magnetic coupling between the second magnetic layer 12 and the first magnetic layer 11. For the spacer layer 25, a metal or an insulator is used. For the metal, Cu, Au, Ag, or the like is used, for example. In the case where a metal is used for the spacer layer 25, the thickness of the spacer layer 25 is about 1 nm to 7 nm, for example. For the insulator, a magnesium oxide (such as MgO), an aluminum oxide (such as $Al_2O_3$), a titanium oxide (such as TiO), a zinc oxide (such as ZnO), or a gallium oxide (Ga—O), for example, is used. In the case where an insulator is used for the spacer layer 25, the thickness of the spacer layer 25 is about 0.6 nm to 2.5 nm, for example. A CCP (Current-Confined-Path) spacer layer, for example, is used for the spacer layer 25. In the case where a CCP-spacer layer is used for the spacer layer 25, such a structure is used in which a copper (Cu) metal path is formed in an insulating layer of aluminum oxide ($Al_2O_3$), for example. For example, an MgO layer having a thickness of 1.5 nm is used for the spacer layer 25.

A magnetic layer is used for the first reference layer 11a. The magnetic layer used for the first reference layer 11a directly contributes to the MR effect. A Co—Fe—B alloy is used for the first reference layer 11a, for example. More specifically, a $(Co_xFe_{100-x})_{100-y}B_y$ alloy (x=0% to 100%, y=0% to 30%) can also be used for the first reference layer 11a. In the case where an amorphous alloy of $(Co_xFe_{100-x})_{100-y}B_y$ is used for the first reference layer 11a, variations between elements caused by crystal grains can be suppressed, even though the size of the first stacked body 10a is reduced, for example. In the case where an amorphous alloy of $(Co_xFe_{100-x})_{100-y}B_y$ is used for the first reference layer 11a, the second reference layer 11c can be made a flatter film. Therefore, a layer formed on the second reference layer 11c (a tunnel insulating layer (not shown), for example) can be flattened. The flattening of the tunnel insulating layer can reduce the defect density of the tunnel insulating layer. Thus, a greater MR change rate is obtained with a lower sheet resistivity. For example, in the case where MgO is used for the material of the tunnel insulating layer, an amorphous alloy of $(Co_xFe_{100-x})_{100-y}B_y$ is used, so that the (100) orientation of the MgO layer formed on the tunnel insulating layer can be enhanced. The (100) orientation of the MgO layer is made higher, so that a greater MR change rate is obtained. A $(Co_xFe_{100-x})_{100-y}B_y$ alloy is crystallized in annealing as the (100) plane of the MgO layer is used as a template. Therefore, an excellent crystal conformation is obtained between MgO and a $(Co_xFe_{100-x})_{100-y}B_y$ alloy. An excellent crystal conformation is obtained, so that a greater MR change rate is obtained.

A Fe—Co alloy, for example, may be used for the first reference layer 11a, other than a Co—Fe—B alloy.

When the thickness of the first reference layer 11a is thicker, a greater MR change rate is obtained. In order to obtain a larger fixed magnetic field, preferably, the thickness of the second reference layer 11c is thinner. The tradeoff relationship exists between the MR change rate and the fixed magnetic field in the thickness of the second reference layer 11c. In the case where a Co—Fe—B alloy is used for the first reference layer 11a, preferably, the thickness of the first reference layer 11a is 1.5 nm or more and 5 nm or less. More preferably, the thickness of the first reference layer 11a is 2.0 nm or more and 4 nm or less.

In addition to the materials described above, a $Co_{90}Fe_{10}$ alloy in the fcc structure or a Co alloy in the HCP structure is used for the first reference layer 11a. At least one selected from a group consisting of Co, Fe, and Ni is used for the first reference layer 11a. An alloy including at least one material selected from these materials is used for the first reference layer 11a. A FeCo alloy material in the bcc structure, a Co alloy including 50% or more of cobalt composition, or a material including 50% or more of Ni composition is used for the first reference layer 11a, for example, so that a greater MR change rate is obtained. A layer of a Heusler magnetic alloy such as $Co_2MnGe$, $Co_2FeGe$, $Co_2MnSi$, $Co_2FeSi$, $Co_2MnAl$, $Co_2FeAl$, $Co_2MnGa_{0.5}Ge_{0.5}$, and $Co_2FeGa_{0.5}Ge_{0.5}$ may be used for the first reference layer 11a. For example, a $Co_{40}Fe_{40}B_{20}$ layer having a thickness of 3 nm is used for the first reference layer 11a.

The magnetic coupling layer 11b causes antiferromagnetic coupling between the first reference layer 11a and the second reference layer 11c. The magnetic coupling layer 11b forms a synthetic pin structure. Ru is used for the magnetic coupling layer 11b, for example. Preferably, the thickness of the magnetic coupling layer 11b is 0.8 nm or more and 1 nm or less. A material other than Ru may be used for the magnetic coupling layer 11b as long as the material causes a sufficient antiferromagnetic coupling between the first reference layer 11a and the second reference layer 11c. The thickness of the magnetic coupling layer 11b may be a thickness of 0.3 nm or more and 0.6 nm or less corresponding to the first peak of the RKKY (Rudernlan-Kittel-Kasuya-Yosida) coupling, instead of a thickness of 0.8 nm or more and 1 nm or less corresponding to the second peak of the RKKY coupling. Ru having a thickness of 0.9 nm is used for the magnetic coupling layer 11b, for example. Accordingly, more highly reliable coupling can be stably obtained.

A $Co_xFe_{100-x}$ alloy (x=0% to 100%), a $Ni_xFe_{100-x}$ alloy (x=0% to 100%), or an alloy that a nonmagnetic element is added to these alloys is used for the second reference layer 11c, for example. At least one selected from a group consisting of Co, Fe, and Ni is used for the second reference layer 11c. An alloy including at least one material selected from these materials may be used for the second reference layer 11c. A $(Co_xFe_{100-x})_{100-y}B_y$ alloy (x=0% to 100%, y=0% to 30%) may be used for the second reference layer 11c. An amorphous alloy of $(CoFe10-x)_{100-y}B_y$ is used for the second reference layer 11c, so that variations between elements can be suppressed even though the size of the first stacked body 10a is reduced. Preferably, the thickness of the second reference layer 11c is 1.5 nm or more and nm or less. Accordingly, for example, the strength of a unidirectional anisotropy magnetic field caused by the pinning layer 27 can be secured more strongly. For example, the strength of an antiferromagnetically coupled magnetic field between the second reference layer 11c and the pinning layer 27 can be secured more strongly through the magnetic coupling layer 11b. Preferably, the magnetic thickness of the second reference layer 11c (a product (Bs·t) of a saturation magnetization Bs and a thickness t) is substantially equal to the magnetic thickness of the first reference layer 11a.

The saturation magnetization of $Co_{40}Fe_{40}B_{20}$ in a thin film is about 1.9 T (tesla). For example, in the case where the first reference layer 11a is $Co_{40}Fe_{40}B_{20}$ having a thickness of 3 nm, the magnetic thickness of the first reference layer 11a is a thickness of 1.9 T×3 nm=5.7 Tnm. On the other hand, the saturation magnetization of $Co_{75}Fe_{25}$ is about 2.1 T. The thickness of the first reference layer 11a that provides the magnetic thickness equal to the thicknesses is 50 Tnm/2.1 T=2.7 nm. In this case, preferably, $Co_{75}Fe_{25}$ having a thickness of about 2.7 nm is used for the second reference layer 11c. A $Co_{75}Fe_{25}$ layer having a thickness of 2.5 nm, for example, is used for the second reference layer 11c.

In the example shown in FIG. 8, a synthetic pin structure of the first reference layer 11a, the magnetic coupling layer 11b, and the second reference layer 11c is used for the first magnetic layer 11. Instead of the structure, a single pin structure formed of a single magnetization fixed layer may be used for the first magnetic layer 11. In the case where the single pin structure is used, a $Co_{40}Fe_{40}B_{20}$ layer having a thickness of 3 nm is used for the first magnetic layer 11, for example. For the ferromagnetic layer used for the magnetization fixed layer in the single pin structure, the same materials as the materials that can be used for the first reference layer 11a described above may be used.

The pinning layer 27 gives unidirectional anisotropy to the ferromagnetic layer of the second reference layer 11c formed below the pinning layer 27 for fixing magnetization, for example. An antiferromagnetic layer is used for the pinning layer 27, for example. At least one selected from a group consisting of IrMn, PtMn, PdPtMn, and RuRhMn is used for the pinning layer 27. In order to give a strong enough unidirectional anisotropy, the thickness of the pinning layer 27 is appropriately set. In the case where the material of the pinning layer 27 is PtMn or PdPtMn, preferably, the thickness of the pinning layer 27 is 8 nm or more and 20 nm or less. More preferably, the thickness of the pinning layer 27 is 10 nm or more and 15 nm or less. In the case where the material of the pinning layer 27 is IrMn, unidirectional anisotropy can be given with the pinning layer 27 in the thickness thinner than the thickness in the case where the material of the pinning layer 27 is PtMn, for example. In this case, preferably, the thickness of the pinning layer 27 is 4 nm or more and 18 nm or less. More preferably, the thickness of the pinning layer 27 is 5 nm or more and 15 nm or less. An $Ir_{22}Mn_{78}$ layer having a thickness of 7 nm is used for the pinning layer 27, for example.

A hard magnetic layer is used for the pinning layer 27. For the hard magnetic layer, CoPt (Co=50% to 85%), $(Co_xPt_{100-x})_{100-y}Cr_y$ (x=50% to 85%, y=0% to 40%), or FePt (Pt=40% to 60%) may be used, for example.

The first cap layer 28 protects the layers provided below the first cap layer 28. A plurality of metal layers are used for the first cap layer 28, for example. A two-layer structure of a Ta layer and a Ru layer (Ta/Ru) is used for the first cap layer 28, for example. The thickness of a Ta layer is 1 nm. The thickness of a Ru layer is 5 nm.

Another metal layer may be provided as the first cap layer 28, instead of a Ta layer and a Ru layer. The first cap layer 28 is optional. Another material may be used for the first cap layer 28 as long as the material can protect the layers provided below the first cap layer 28.

A second cap layer different from the first cap layer 28 (the second cap layer 29 described related to FIG. 2, for example) may be provided at a location on at least one of the second magnetic layer 12 and the third magnetic layer 13 where the spacer layer 25 is not provided.

Figure 9:
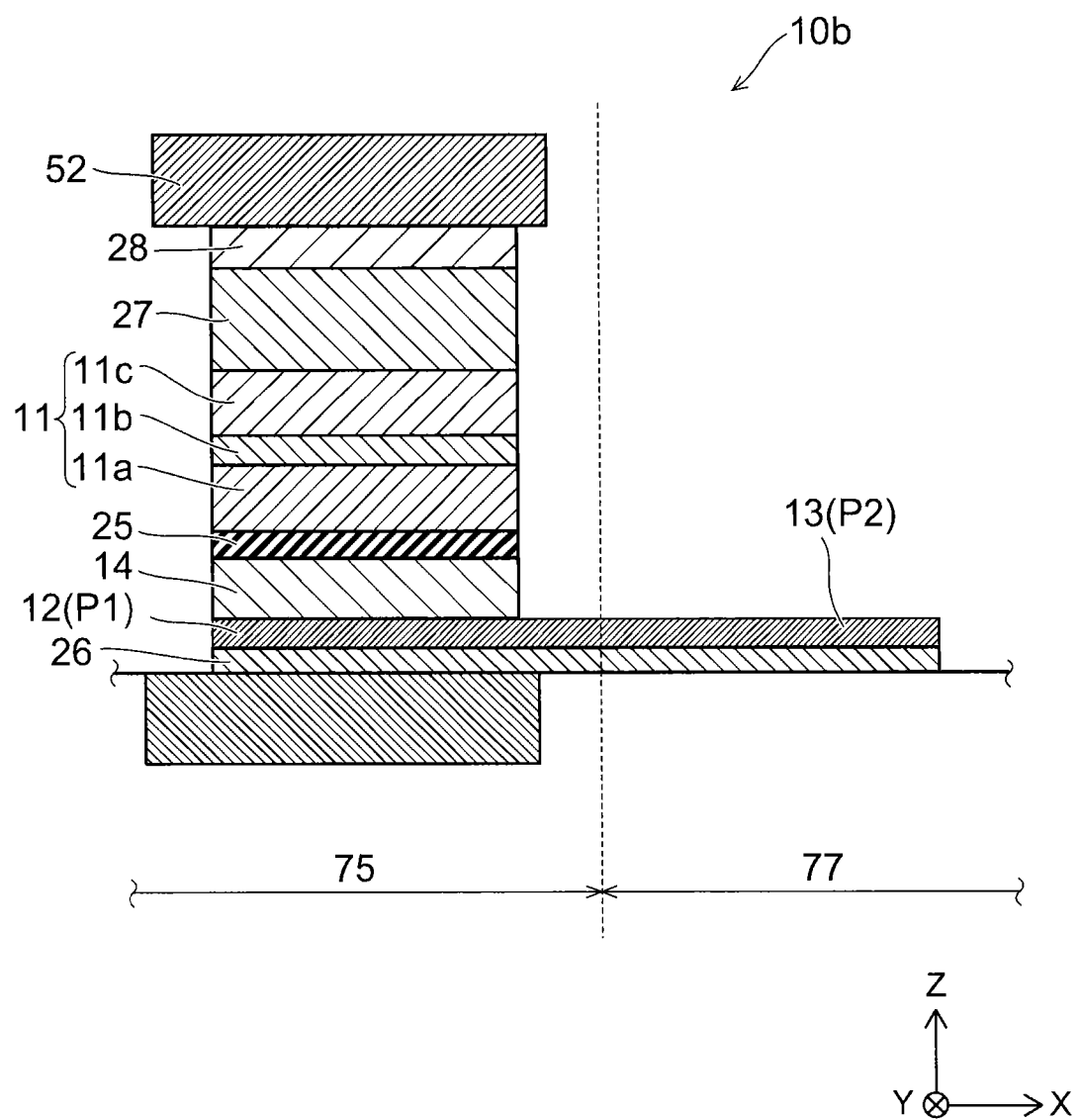
FIG. 9 is a schematic cross-sectional view illustrating a second stacked body.

FIG. 9 is a schematic cross-sectional view illustrating a second stacked body.

As compared with the first stacked body 10a shown in FIG. 8, a second stacked body 10b shown in FIG. 9 further includes a fourth magnetic layer 14. The fourth magnetic layer 14 is provided between the second magnetic layer 12 and the spacer layer 25. In other words, on the first region 75, the under layer 26 is provided between the first electrode 51 and the second electrode 52. The second magnetic layer 12 is provided between the under layer 26 and the second electrode 52. The fourth magnetic layer 14 is provided between the second magnetic layer 12 and the second electrode 52. The spacer layer 25 is provided between the fourth magnetic layer and the second electrode 52. The first reference layer 11a is provided between the spacer layer 25 and the second electrode 52. The magnetic coupling layer 11b is provided between the first reference layer 11a and the second electrode 52. The second reference layer 11c is provided between the magnetic coupling layer 11b and the second electrode 52. The pinning layer 27 is provided between the second reference layer 11c and the second electrode 52. The first cap layer 28 is provided between the pinning layer 27 and the second electrode 52.

The fourth magnetic layer 14 is a magnetization free layer. The second magnetic layer 12 is magnetically coupled to the third magnetic layer 13. The fourth magnetic layer 14 is magnetically coupled to the second magnetic layer 12. The magnetization of the fourth magnetic layer 14 is changed together with a change in the magnetization of the second magnetic layer 12. In other words, the magnetization direction of the fourth magnetic layer 14 is changed according to the magnetization direction of the second magnetic layer 12. Namely, a change in the magnetization of the third magnetic layer 13 provided on the second region 77 where strain occurs can be transduced to the magnetization of the fourth magnetic layer 14 through the second magnetic layer 12.

The third magnetic layer 13 obtains a change in magnetization caused by strain on the diaphragm 74 where strain occurs due to "the inverse magnetostrictive effect". The third magnetic layer 13 contributes to the responsiveness of magnetization to strain. Thus, desirably, a ferromagnetic material that higher magnetic strain occurs is used for the third magnetic layer 13.

The fourth magnetic layer 14 is provided as contacting the spacer layer 25, and contributes to the change rate of the electrical resistance to the magnetization response due to "the magnetoresistive effect". Thus, desirably, a ferromagnetic material that exhibits a higher magnetoresistive effect is used for the fourth magnetic layer 14. A similar material used for the first reference layer 11c of the first stacked body 10a can be used for the fourth magnetic layer 14, for example. A $Co_{40}Fe_{40}B_{20}$ layer having a thickness of 4 nm may be used for the fourth magnetic layer 14, for example.

A ferromagnetic material that higher magnetic strain occurs is not always matched with a ferromagnetic material that exhibits a higher magnetoresistive effect. Thus, materials appropriate to the individual layers are used. Desirably, a ferromagnetic body whose absolute value of the magnetostriction constant is greater than the absolute value of the magnetostriction constant of the fourth magnetic layer 14 is used for the third magnetic layer 13.

A FeCo alloy or a NiFe alloy, for example, is used for the materials of the second magnetic layer 12 and the third magnetic layer 13. In addition to this, the following may be used for the materials of the second magnetic layer 12 and the third magnetic layer 13: a Co—Fe—B alloy, a Fe—Co—Si—B alloy, a Fe—Ga alloy expressing a magnetostriction constant λs>100 ppm, a Fe—Co—Ga alloy, a Tb-M—Fe alloy (M is at least one selected from a group consisting of Sm, Eu, Gd, Dy, Ho, and Er), a Tb-M1-Fe-M2 alloy (M1 is at least one selected from a group consisting of Sm, Eu, Gd, Dy, Ho, and Er, and M2 is at least one selected from a group consisting of Ti, Cr, Mn, Co, Cu, Nb, Mo, W, and Ta), a Fe-M3-M4-B alloy (M3 is at least one selected from a group consisting of Ti, Cr, Mn, Co, Cu, Nb, Mo, W, and Ta, and M4 is at least one selected from a group consisting of Ce, Pr, Nd, Sm, Tb, Dy, and Er), Ni, Fe—Al, or ferrite (such as $Fe_3O_4$ and $(FeCo)_3O_4$)), for example. For example, $Fe_{80}Ga_{20}$ having a thickness of 10 nm may be used for the second magnetic layer 12. For example, $Fe_{80}Ga_{20}$ having a thickness of 10 nm may be used for the third magnetic layer 13.

The structures and materials of the other layers are the same as the structures and materials of the layers described related to the first stacked body 10a.

Figure 10:
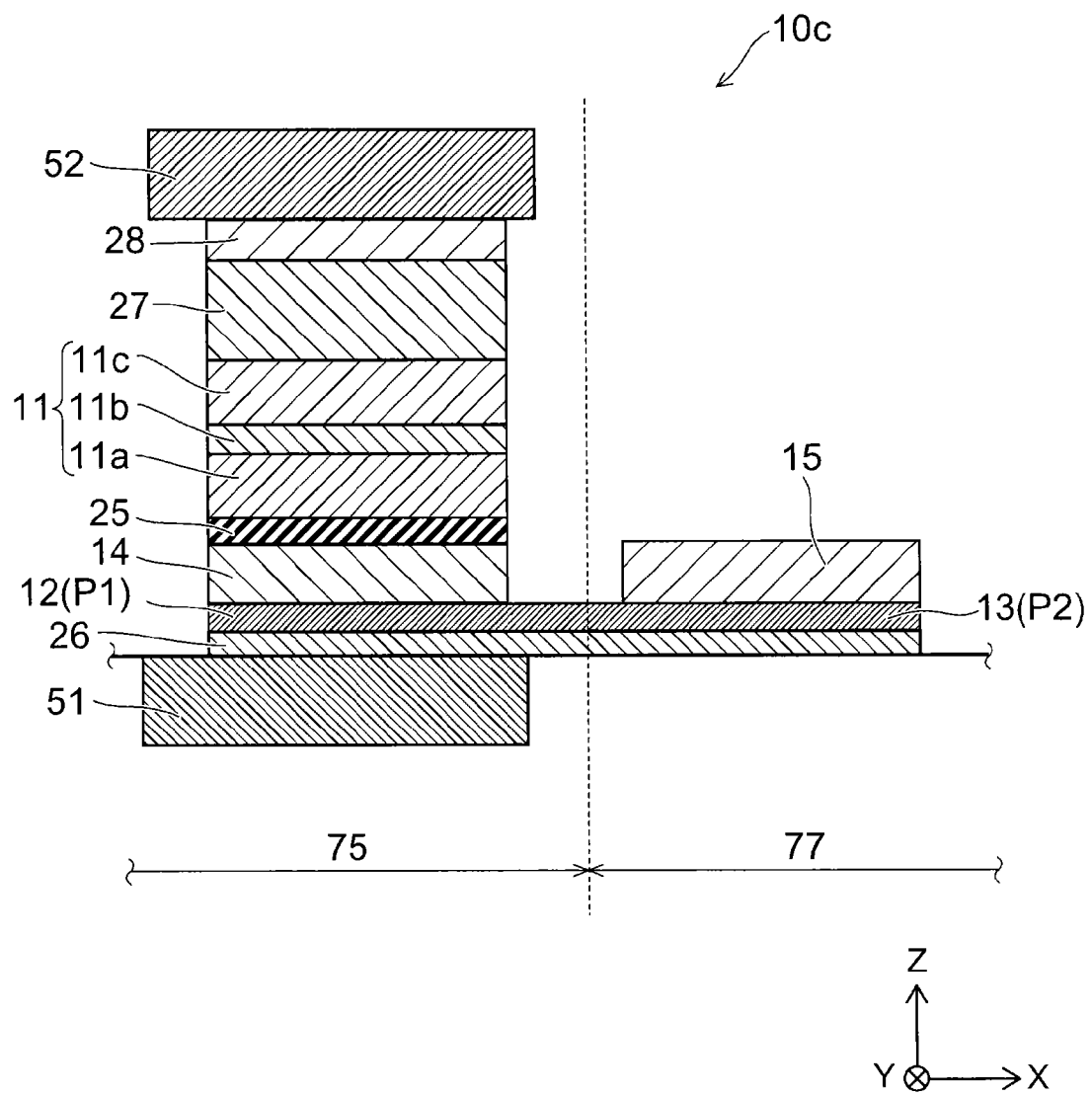
FIG. 10 is a schematic cross-sectional view illustrating a third stacked body.

FIG. 10 is a schematic cross-sectional view illustrating a third stacked body.

As compared with the second stacked body 10b shown in FIG. 9, a third stacked body 10c shown in FIG. 10 further includes a fifth magnetic layer 15. The fifth magnetic layer 15 is provided on the third magnetic layer 13. In other words, on the second region 77, the under layer 26 is provided between the first electrode 51 and the fifth magnetic layer 15. The third magnetic layer 13 is provided between the under layer 26 and the fifth magnetic layer 15. On the first region 75, the configurations of the layers provided between the first electrode 51 and the second electrode 52 are the same as the configurations of the layers provided between the first electrode 51 and the second electrode 52 of the second stacked body 10b.

The fifth magnetic layer 15 is a magnetization free layer. The third magnetic layer 13 is magnetically coupled to the fifth magnetic layer 15. The magnetization of the fifth magnetic layer 15 is changed together with a change in the magnetization of the third magnetic layer 13. In other words, the magnetization direction of the fifth magnetic layer 15 is changed according to the magnetization direction of the third magnetic layer 13. Namely, a change in the magnetization of the third magnetic layer 13 provided on the second region 77 where strain occurs can be transduced to the magnetization of the fifth magnetic layer 15.

The second magnetic layer 12 is magnetically coupled to the third magnetic layer 13. The fourth magnetic layer 14 is magnetically coupled to the second magnetic layer 12. Thus, desirably, a ferromagnetic body of stronger exchange coupling is used for the second magnetic layer 12 and the third magnetic layer 13.

The fifth magnetic layer 15 obtains a change in magnetization caused by strain on the diaphragm 74 where strain occurs due to "the inverse magnetostrictive effect". The fifth magnetic layer 15 contributes to the responsiveness of magnetization to strain. Thus, desirably, a ferromagnetic material that higher magnetic strain occurs is used for the fifth magnetic layer 15. Desirably, a ferromagnetic body whose absolute value of the magnetostriction constant is greater than the absolute value of the magnetostriction constant of the fourth magnetic layer 14 is used for the fifth magnetic layer 15.

A FeCo alloy or a NiFe alloy, for example, is used for the material of the fifth magnetic layer 15. In addition to this, the following is used for the material of the fifth magnetic layer 15: a Co—Fe—B alloy, a Fe—Co—Si—B alloy, a Fe—Ga alloy expressing a magnetostriction constant λs>100 ppm, a Fe—Co—Ga alloy, a Tb-M—Fe alloy (M is at least one selected from a group consisting of Sm, Eu, Gd, Dy, Ho, and Er), a Tb-M1-Fe-M2 alloy (M1 is at least one selected from a group consisting of Sm, Eu, Gd, Dy, Ho and Er, and M2 is at least one selected from a group consisting of Ti, Cr, Mn, Co, Cu, Nb, Mo, W, and Ta), a Fe-M3-M4-B alloy (M3 is at least one selected from a group consisting of Ti, Cr, Mn, Co, Cu, Nb, Mo, W, and Ta, and M4 is at least one selected from a group consisting of Ce, Pr, Nd, Sm, Tb, Dy, and Er), Ni, Fe—Al, or ferrite (such as $Fe_3O_4$ and $(FeCo)_3O_4$)). For example, a $Fe_{80}Ga_{20}$ layer having a thickness of 10 nm is used for the fifth magnetic layer 15.

At least one selected from a group consisting of Fe, Co, and Ni is used for the second magnetic layer 12 and the third magnetic layer 13, for example. At least one selected from a group consisting of a Fe—Co alloy, a Ni—Fe alloy, and a Co—Ni alloy is used for the second magnetic layer 12 and the third magnetic layer 13. In addition to this, a given ferromagnetic body including at least one material selected from a group consisting of Fe, Co, and Ni such as a Co—Fe—B alloy is used for the second magnetic layer 12 and the third magnetic layer 13. For example, a $Fe_{50}Co_{50}$ layer having a thickness of 5 nm is used for the second magnetic layer 12. For example, a $Fe_{50}Co_{50}$ layer having a thickness of 5 nm is used for the third magnetic layer 13.

A Co40Fe4B20 layer having a thickness of 4 nm is used for the fourth magnetic layer 14, for example.

The structures and materials of the other layers are the same as the structures and materials of the layers described related to the first stacked body 10a and the second stacked body 10b.

Figure 11:
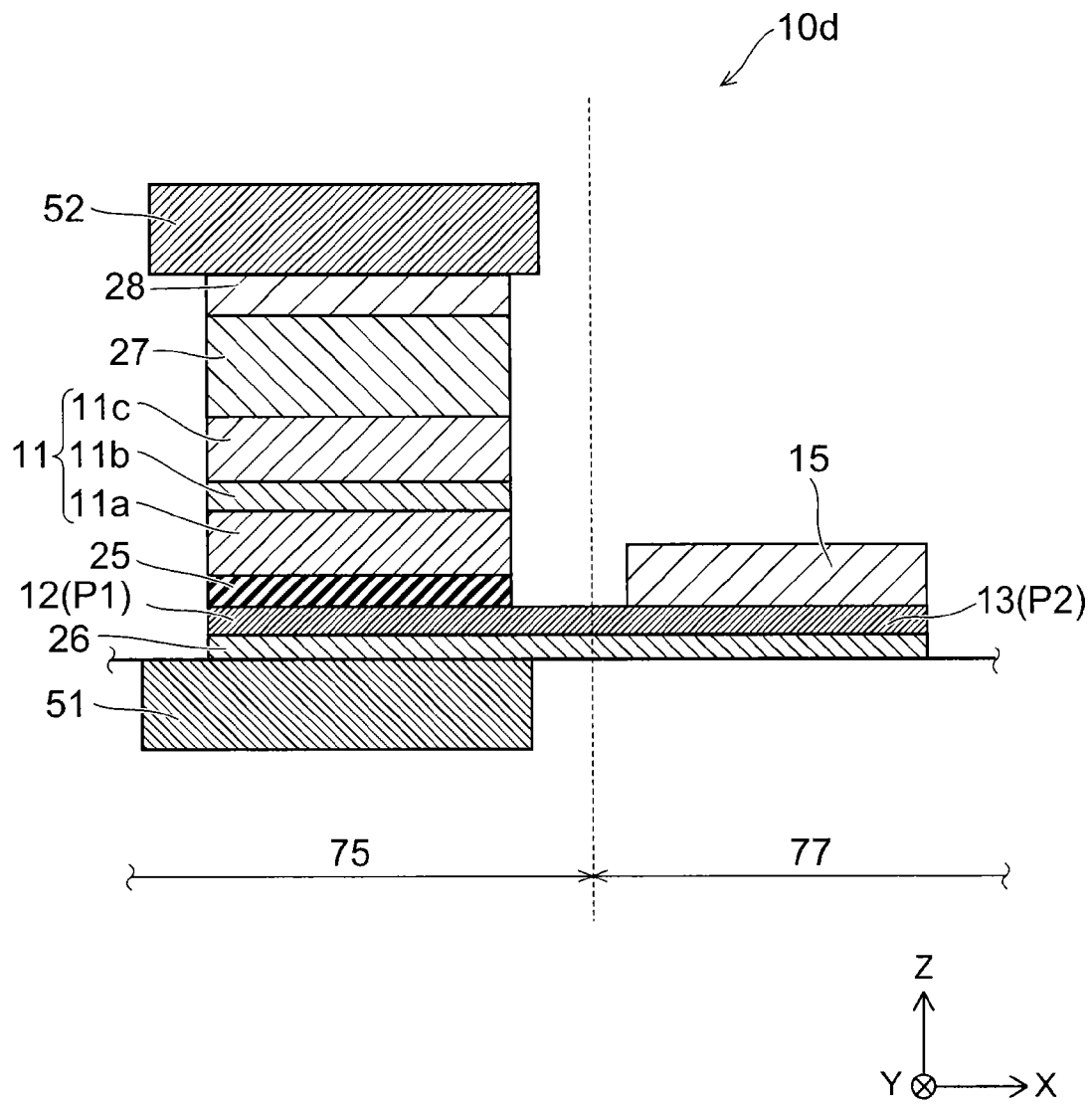
FIG. 11 is a schematic cross-sectional view illustrating a fourth stacked body.

FIG. 11 is a schematic cross-sectional view illustrating a fourth stacked body.

As compared with the first stacked body 10a shown in FIG. 8, a fourth stacked body 10d shown in FIG. 11 further includes the fifth magnetic layer 15. The fifth magnetic layer 15 is provided on the third magnetic layer 13. In other words, on the second region 77, the under layer 26 is provided between the first electrode 51 and the fifth magnetic layer 15. The third magnetic layer 13 is provided between the under layer 26 and the fifth magnetic layer 15. On the first region 75, the configurations of the layers provided between the first electrode 51 and the second electrode 52 are the same as the configurations of the layers provided between the first electrode 51 and the second electrode 52 of the first stacked body 10a.

A $Fe_{80}Ga_{20}$ layer having a thickness of 10 nm is used for the fifth magnetic layer 15, for example. A $Co_{40}Fe_{40}B_{20}$ layer having a thickness of 4 nm is used for the second magnetic layer 12, for example. A $Co_{40}Fe_{40}B_{20}$ layer having a thickness of 4 nm is used for the third magnetic layer 13, for example.

A material similar to the material of the fifth magnetic layer 15 described related to the third stacked body 10c can be used for the fifth magnetic layer 15.

The structures and materials of the other layers are the same as the structures and materials of the layers described related to the first stacked body 10a.

Figure 12:
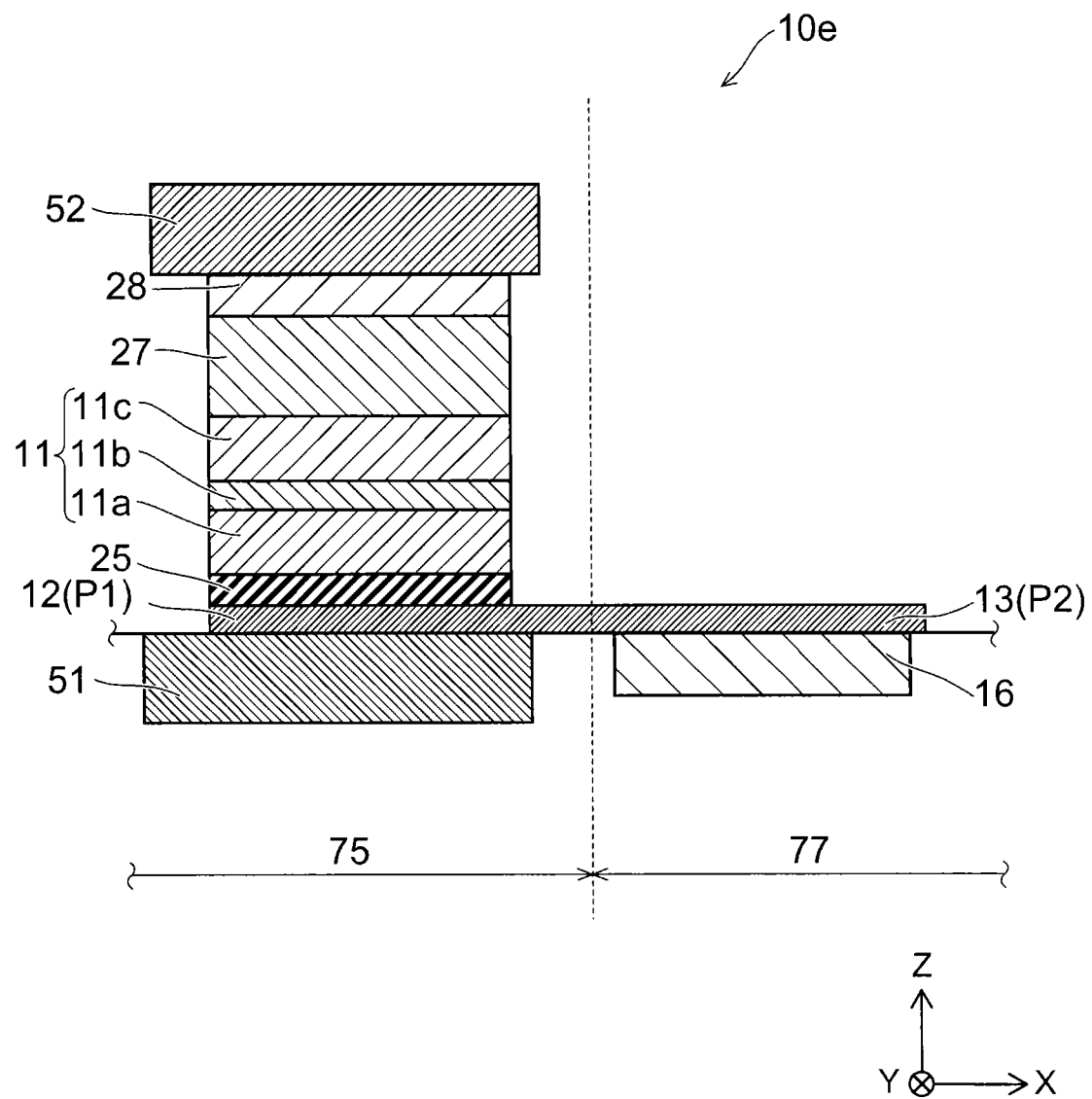
FIG. 12 is a schematic cross-sectional view illustrating a fifth stacked body.

FIG. 12 is a schematic cross-sectional view illustrating a fifth stacked body.

As compared with the first stacked body 10a shown in FIG. 8, a fifth stacked body 10e shown in FIG. 12 further includes a sixth magnetic layer 16. The sixth magnetic layer 16 is provided on the second region 77. The sixth magnetic layer 16 is filled on the second region 77. As compared with the first stacked body 10a shown in FIG. 8, the under layer 26 is not provided on the fifth stacked body 10e shown in FIG. 12.

In the specification, a state in which "a component is filled" includes a state in which all of layers are filled as well as a state in which a part of a layer is filled.

A $Fe_{80}Ga_{20}$ layer having a thickness of 10 nm is used for the sixth magnetic layer 16, for example. A $Co_{40}Fe_{40}B_{20}$ layer having a thickness of 4 nm is used for the second magnetic layer 12, for example. A $Co_{40}Fe_{40}B_{20}$ layer having a thickness of 4 nm is used for the third magnetic layer 13, for example.

A material similar to the material of the fifth magnetic layer 15 described related to the third stacked body 10c can be used for the sixth magnetic layer 16.

The structures and materials of the other layers are the same as the structures and materials of the layers described related to the first stacked body 10a.

Figure 13:
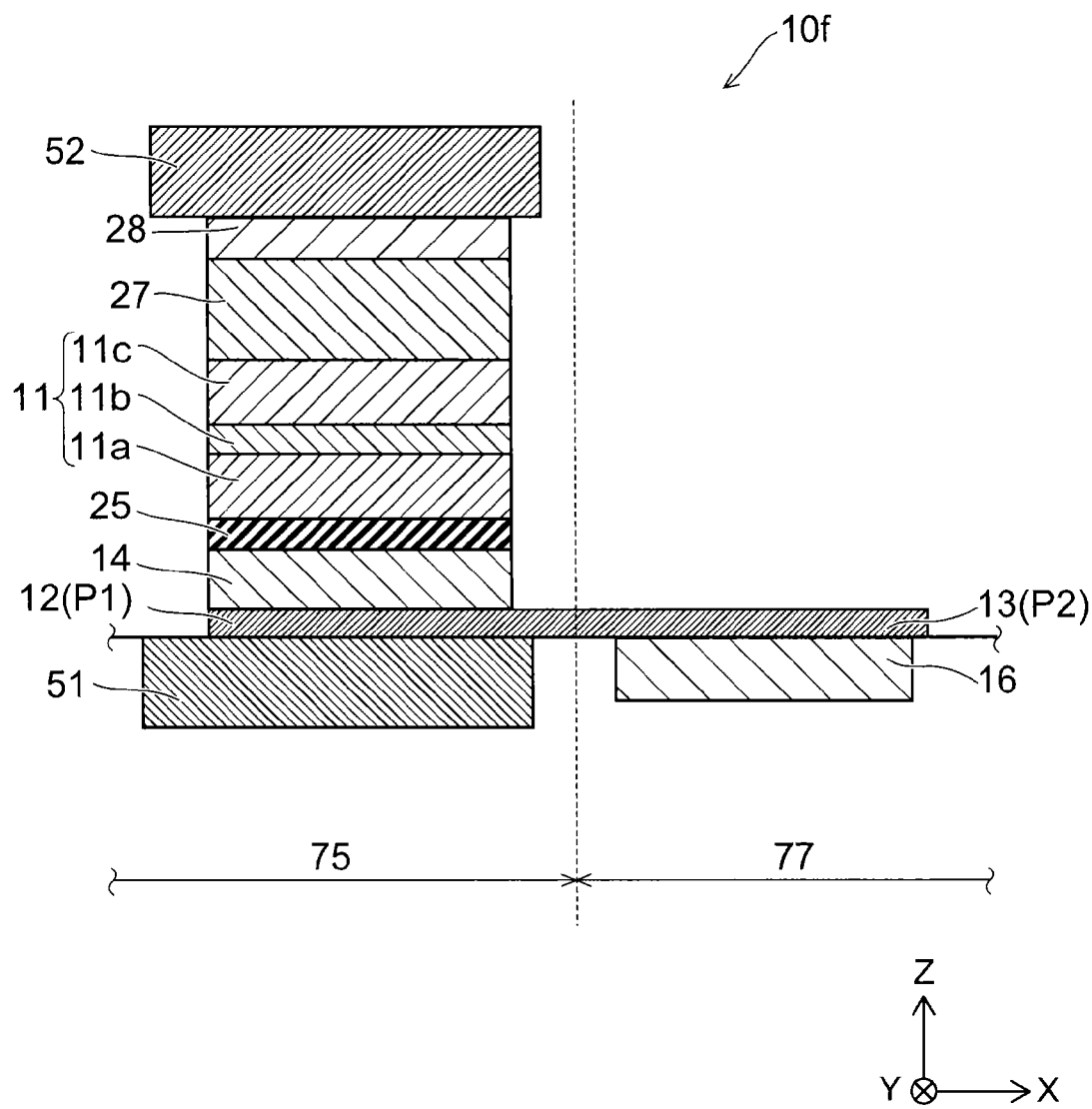
FIG. 13 is a schematic cross-sectional view illustrating a sixth stacked body.

FIG. 13 is a schematic cross-sectional view illustrating a sixth stacked body.

As compared with the second stacked body 10b shown in FIG. 9, a sixth stacked body 10f shown in FIG. 13 further includes the sixth magnetic layer 16. The sixth magnetic layer 16 is provided on the second region 77. The sixth magnetic layer 16 is filled on the second region 77. As compared with the second stacked body 10b shown in FIG. 9, the under layer 26 is not provided on the sixth stacked body 10f shown in FIG. 13.

A $Fe_{80}Ga_{20}$ layer having a thickness of 10 nm is used for the sixth magnetic layer 16, for example. A $Fe_{50}Co_{50}$ layer having a thickness of 5 nm is used for the second magnetic layer 12, for example. A $Fe_{50}Co_{50}$ layer having a thickness of 5 nm is used for the third magnetic layer 13, for example. A $Co_{40}Fe_{40}B_{20}$ layer having a thickness of 4 nm is used for the fourth magnetic layer 14, for example. A material similar to the material of the fifth magnetic layer 15 described related to the third stacked body 10c can be used for the sixth magnetic layer 16.

The structures and materials of the other layers are the same as the structures and materials of the layers described related to the first stacked body 10a.

In the following, the structures of stacked bodies shown in FIG. 14 to FIG. 19 have a bottom spin-valve structure in which a magnetization free layer is formed above a magnetization fixed layer.

Figure 14:
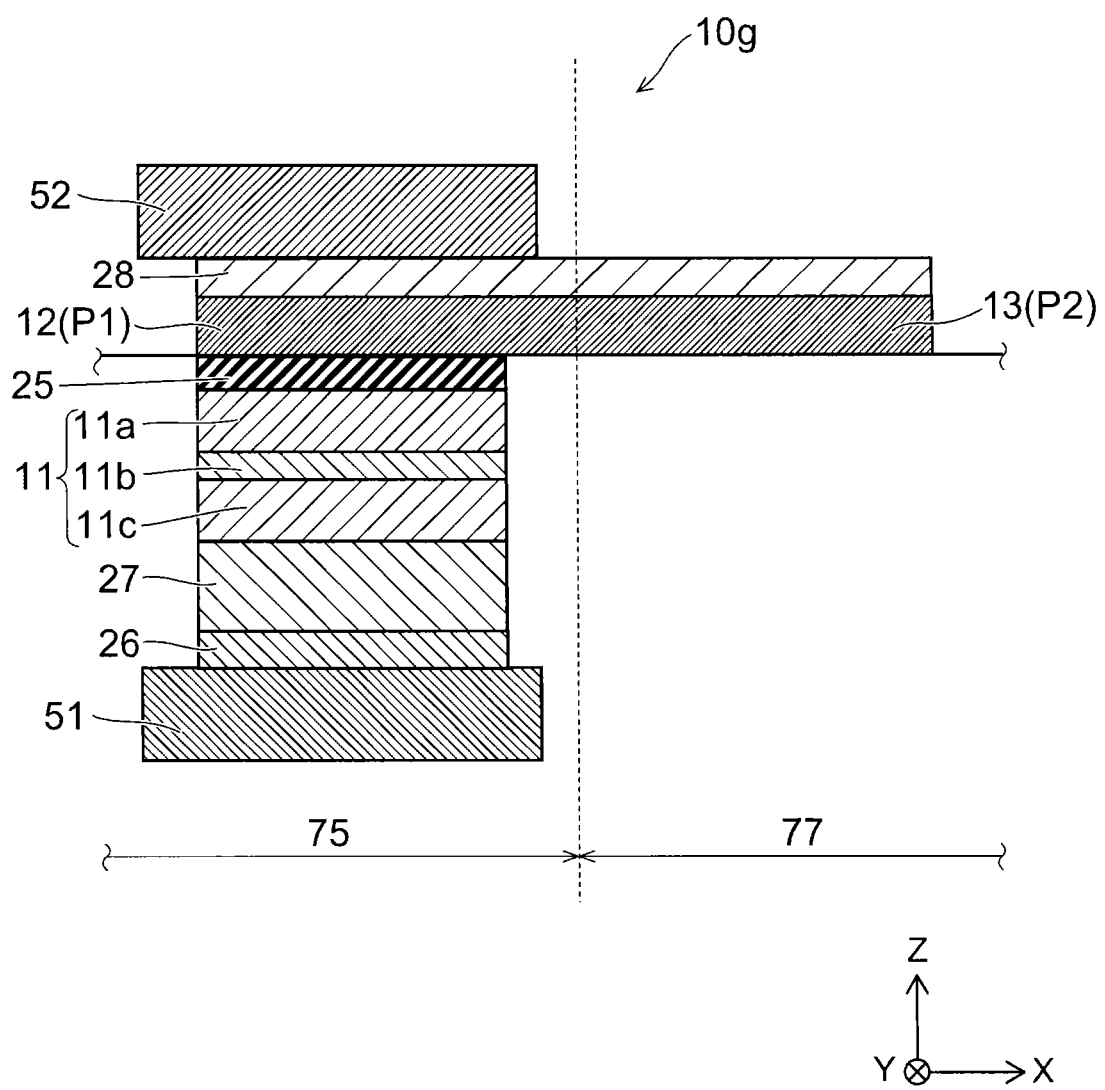
FIG. 14 is a schematic cross-sectional view illustrating a seventh stacked body.

FIG. 14 is a schematic cross-sectional view illustrating a seventh stacked body.

A seventh stacked body 10g shown in FIG. 14 includes the first magnetic layer 11, the second magnetic layer 12, the third magnetic layer 13, the spacer layer 25, the under layer 26, the pinning layer 27, and the first cap layer 28. The first magnetic layer 11 includes the first reference layer 11a, the magnetic coupling layer 11b, and the second reference layer 11c.

On the first region 75, the under layer 26 is provided between the first electrode 51 and the second electrode 52. The pinning layer 27 is provided between the under layer 26 and the second electrode 52. The second reference layer 11c is provided between the pinning layer 27 and the second electrode 52. The magnetic coupling layer 11b is provided between the second reference layer 11c and the second electrode 52. The first reference layer 11a is provided between the magnetic coupling layer 11b and the second electrode 52. The spacer layer 25 is provided between the first reference layer 11a and the second electrode 52. The second magnetic layer 12 is provided between the spacer layer 25 and the second electrode 52. The first cap layer 28 is provided between the second magnetic layer 12 and the second electrode 52.

The under layer 26, the pinning layer 27, the first magnetic layer 11, and the spacer layer 25 are filled on the first region 75.

The first cap layer 28 is provided on the second region 77. The third magnetic layer 13 is provided between the diaphragm 74 and the first cap layer 28.

The third magnetic layer 13 continues with the second magnetic layer 12. For example, the third magnetic layer 13 is formed as a magnetic layer integrated with the second magnetic layer 12. In this case, the second magnetic layer 12 is the first portion P1 of one magnetic layer, and the first portion P1 is provided between the first electrode 51 and the second electrode 52. In this case, the third magnetic layer 13 is the second portion P2 of one magnetic layer, and the second portion P2 is provided on the second region.

Alternatively, the third magnetic layer 13 may be formed as a magnetic layer separately from the second magnetic layer 12. In this case, the third magnetic layer 13 contacts the second magnetic layer 12 in the direction crossing the stacking direction of layers.

In any cases, in the direction crossing the stacking direction of layers (in the X-axis direction), the third magnetic layer 13 includes a portion overlapping with the second magnetic layer 12. In other words, the third magnetic layer 13 is not apart from the second magnetic layer 12 in the stacking direction of layers.

A material similar to the material of the second magnetic layer 12 described related to FIG. 8 can be used for the second magnetic layer 12. A material similar to the material of the third magnetic layer 13 described related to FIG. 8 can be used for the third magnetic layer 13. The disposition of the spacer layer 25 with respect to the second magnetic layer 12 in the seventh stacked body 10g is opposite to the disposition of the spacer layer 25 with respect to the second magnetic layer 12 in the first stacked body 10a in the stacking direction of layers (in the Z-axis direction). Thus, in the case where at least one of the second magnetic layer 12 and the third magnetic layer 13 has a two-layer structure, desirably, the two-layer structure (the relationship of disposition between two layers) is opposite to the case of the first stacked body 10a in the stacking direction of layers (in the Z-axis direction).

In the case where an MgO tunnel insulating layer is used for the spacer layer 25, preferably, a layer of a Co—Fe—B alloy is provided on an interface contacting the spacer layer 25. Accordingly, a high magnetoresistive effect is obtained. In this case, desirably, such a configuration is provided in which a layer of a Co—Fe—B alloy is provided on the spacer layer 25 and the following is formed on the layer: a Fe—Co—Si—B alloy, a Fe—Ga alloy expressing a magnetostriction constant λs>100 ppm, a Fe—Co—Ga alloy, a Tb-M—Fe alloy (M is at least one selected from a group consisting of Sm, Eu, Gd, Dy, Ho, and Er), a Tb-M1-Fe-M2 alloy (M1 is at least one selected from a group consisting of Sm, Eu, Gd, Dy, Ho, and Er, and M2 is at least one selected from a group consisting of Ti, Cr, Mn, Co, Cu, Nb, Mo, W, and Ta), a Fe-M3-M4-B alloy (M3 is at least one selected from a group consisting of Ti, Cr, Mn, Co, Cu, Nb, Mo, W, and Ta, and M4 is at least one selected from a group consisting of Ce, Pr, Nd, Sm, Tb, Dy, and Er), Ni, Fe—Al, or ferrite (such as $Fe_3O_4$ and $(FeCo)_3O_4$)). For example, $Co_{40}Fe_{40}B_{20}/Fe_{80}Ga_{20}$ can be used for at least one of the second magnetic layer 12 and the third magnetic layer 13. The thickness of $Co_{40}Fe_{40}B_{20}$ is 2 nm. The thickness of $Fe_{80}Ga_{20}$ is 4 nm. Materials similar to the materials described related to the first stacked body 10a can be used for the layers other than the second magnetic layer 12 and the third magnetic layer 13.

Figure 15:
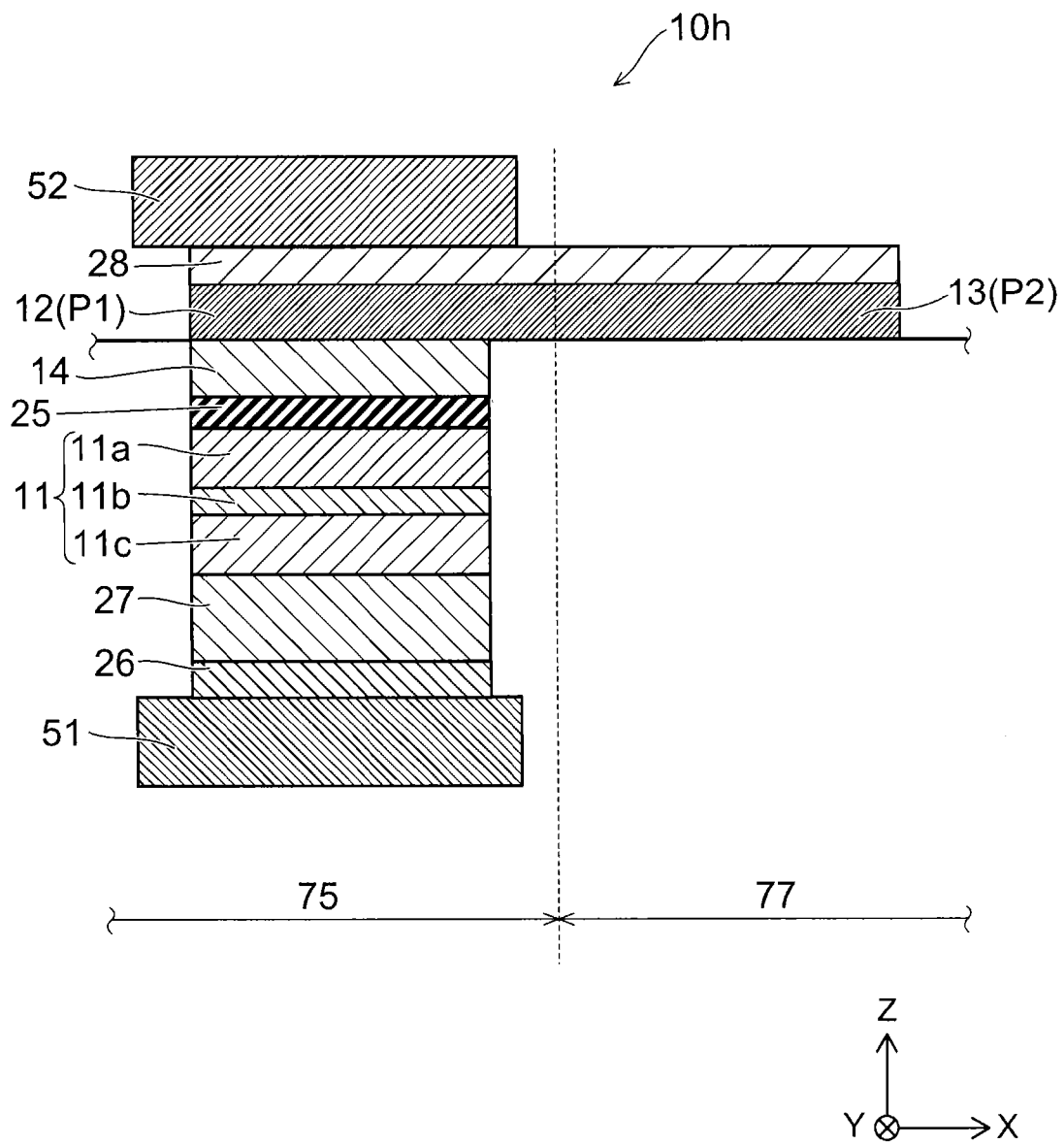
FIG. 15 is a schematic cross-sectional view illustrating an eighth stacked body.

FIG. 15 is a schematic cross-sectional view illustrating an eighth stacked body.

As compared with the seventh stacked body 10g shown in FIG. 14, an eighth stacked body 10h shown in FIG. 15 further includes the fourth magnetic layer 14. The fourth magnetic layer 14 is provided between the spacer layer 25 and the second magnetic layer 12 on the first region 75. The fourth magnetic layer 14 is filled on the first region 75.

A $Co_{40}Fe_{40}B_{20}$ layer having a thickness of 4 nm is used for the fourth magnetic layer 14, for example. A $Fe_{80}Ga_{20}$ layer having a thickness of 10 nm is used for the second magnetic layer 12, for example. A $Fe_{80}Ga_{20}$ layer having a thickness of 10 nm is used for the third magnetic layer 13, for example.

A material similar to the material of the fourth magnetic layer 14 described related to the second stacked body 10b can be used for the fourth magnetic layer 14. A material similar to the material of the second magnetic layer 12 described related to the second stacked body 10b can be used for the second magnetic layer 12. A material similar to the material of the third magnetic layer 13 described related to the second stacked body 10b can be used for the third magnetic layer 13. Materials similar to the materials described related to the first stacked body 10a can be used for the layers other than the second magnetic layer 12, the third magnetic layer 13, and the fourth magnetic layer 14.

Figure 16:
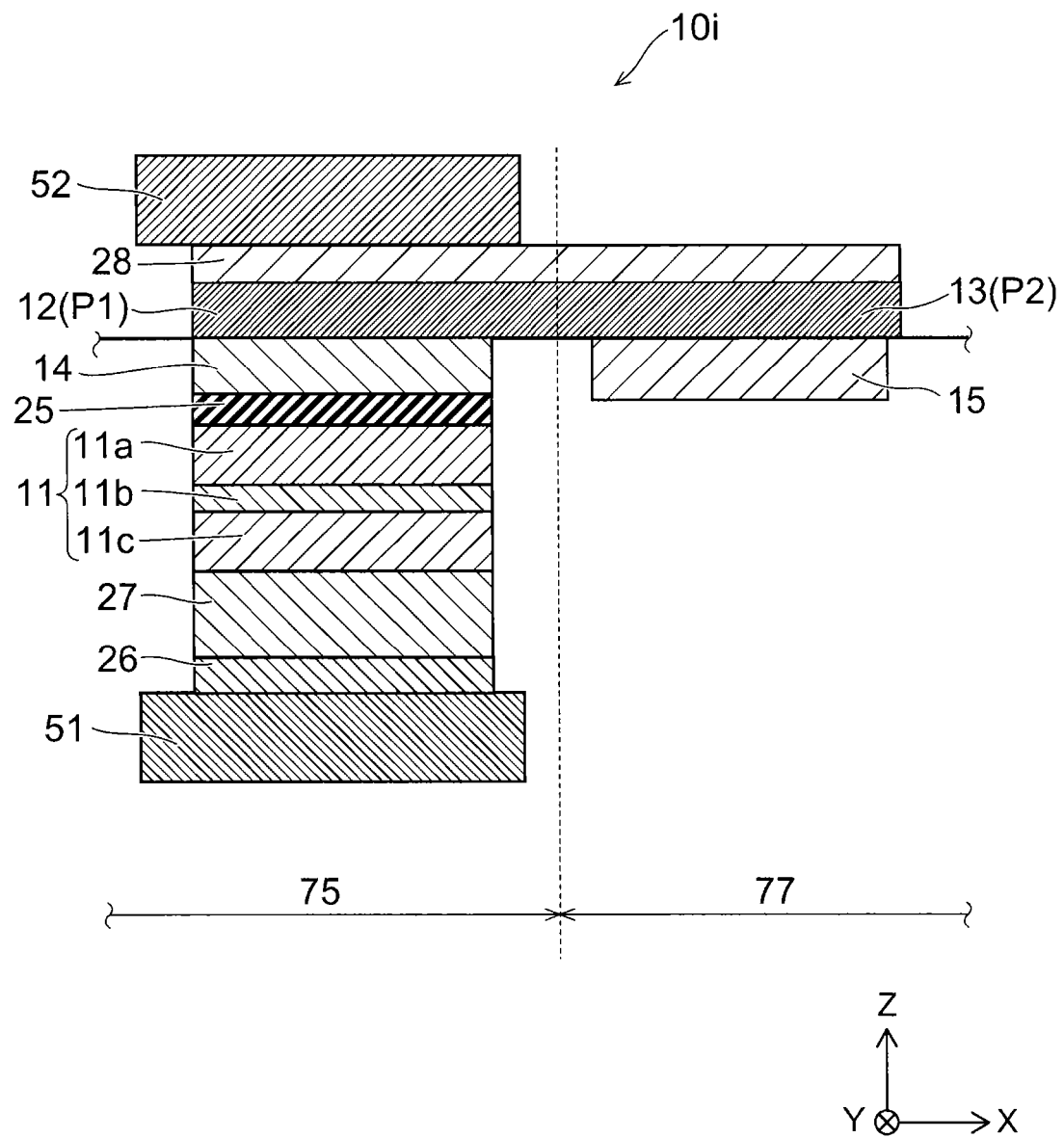
FIG. 16 is a schematic cross-sectional view illustrating a ninth stacked body.

FIG. 16 is a schematic cross-sectional view illustrating a ninth stacked body.

As compared with the eighth stacked body 10h shown in FIG. 15, a ninth stacked body 10i shown in FIG. 16 further includes the fifth magnetic layer 15. The fifth magnetic layer 15 is provided below the third magnetic layer 13. The fifth magnetic layer 15 is filled on the second region 77.

A $Fe_{50}Co_{50}$ layer having a thickness of 5 nm is used for the second magnetic layer 12, for example. A $Fe_{50}Co_{50}$ layer having a thickness of 5 nm is used for the third magnetic layer 13, for example. A $Co_{40}Fe_{40}B_{20}$ layer having a thickness of 4 nm is used for the fourth magnetic layer 14, for example. A $Fe_{80}Ga_{20}$ layer having a thickness of 10 nm is used for the fifth magnetic layer 15, for example.

A material similar to the material of the second magnetic layer 12 described related to the third stacked body 10c can be used for the material of the second magnetic layer 12. A material similar to the material of the third magnetic layer 13 described related to the third stacked body 10c can be used for the material of the third magnetic layer 13. A material similar to the material of the fourth magnetic layer 14 described related to the third stacked body 10c can be used for the material of the fourth magnetic layer 14. A material similar to the material of the fifth magnetic layer 15 described related to the third stacked body 10c can be used for the material of the fifth magnetic layer 15. Materials similar to the materials described related to the first stacked body 10a can be used for the layers other than the second magnetic layer 12, the third magnetic layer 13, the fourth magnetic layer 14, and the fifth magnetic layer 15.

Figure 17:
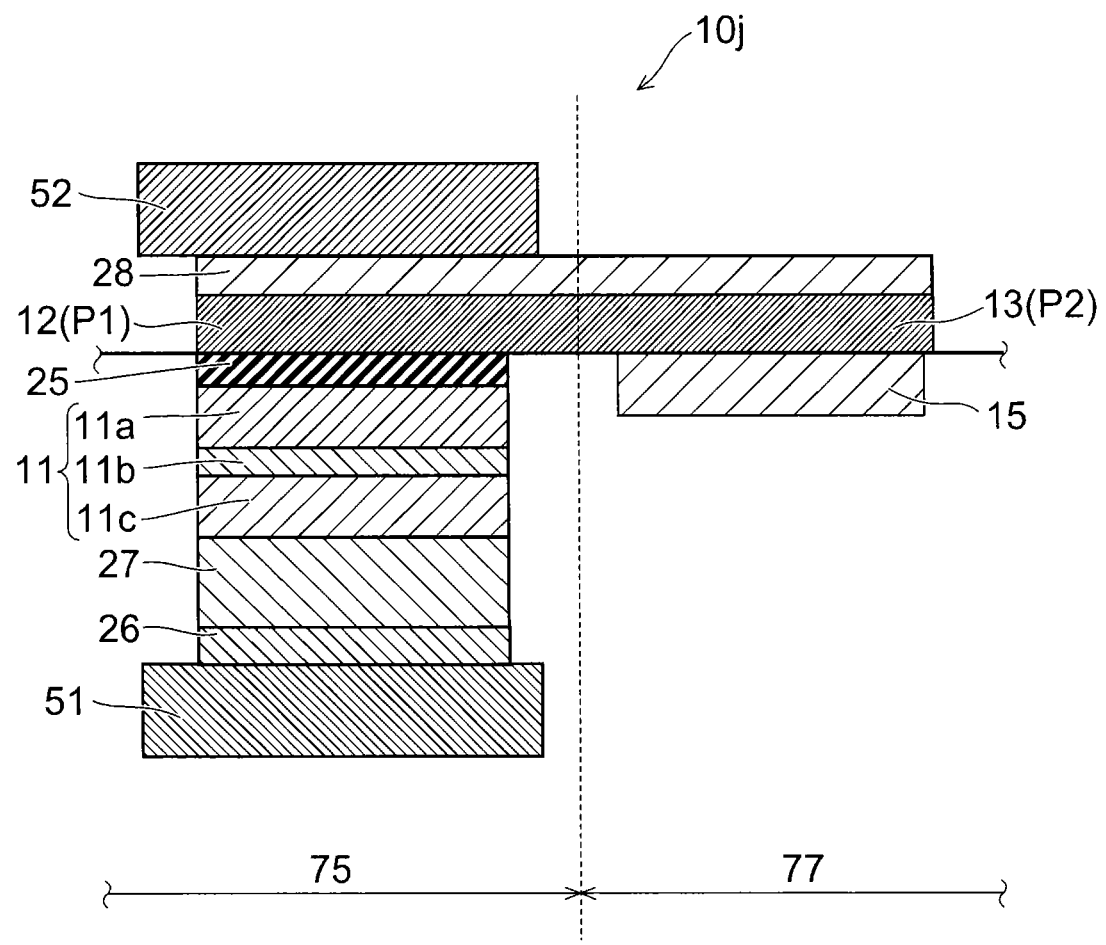
FIG. 17 is a schematic cross-sectional view illustrating a tenth stacked body.

FIG. 17 is a schematic cross-sectional view illustrating a tenth stacked body.

As compared with the seventh stacked body 10g shown in FIG. 14, a tenth stacked body 10j shown in FIG. 17 further includes the fifth magnetic layer 15. The fifth magnetic layer 15 is provided below the third magnetic layer 13. The fifth magnetic layer 15 is filled on the second region 77.

A $Co_{40}Fe_{40}B_{20}$ layer having a thickness of 4 nm is used for the second magnetic layer 12, for example. A $Co_{40}Fe_{40}B_{20}$ layer having a thickness of 4 nm is used for the third magnetic layer 13, for example. A $Fe_{80}Ga_{20}$ layer having a thickness of 10 nm is used for the fifth magnetic layer 15, for example.

A material similar to the material of the second magnetic layer 12 described related to the fourth stacked body 10d can be used for the material of the second magnetic layer 12. A material similar to the material of the third magnetic layer 13 described related to the fourth stacked body 10d can be used for the material of the third magnetic layer 13. A material similar to the material of the fifth magnetic layer 15 described related to the fourth stacked body 10d can be used for the material of the fifth magnetic layer 15. Materials similar to the materials described related to the first stacked body 10a can be used for the layers other than the second magnetic layer 12, the third magnetic layer 13, and the fifth magnetic layer 15.

Figure 18:
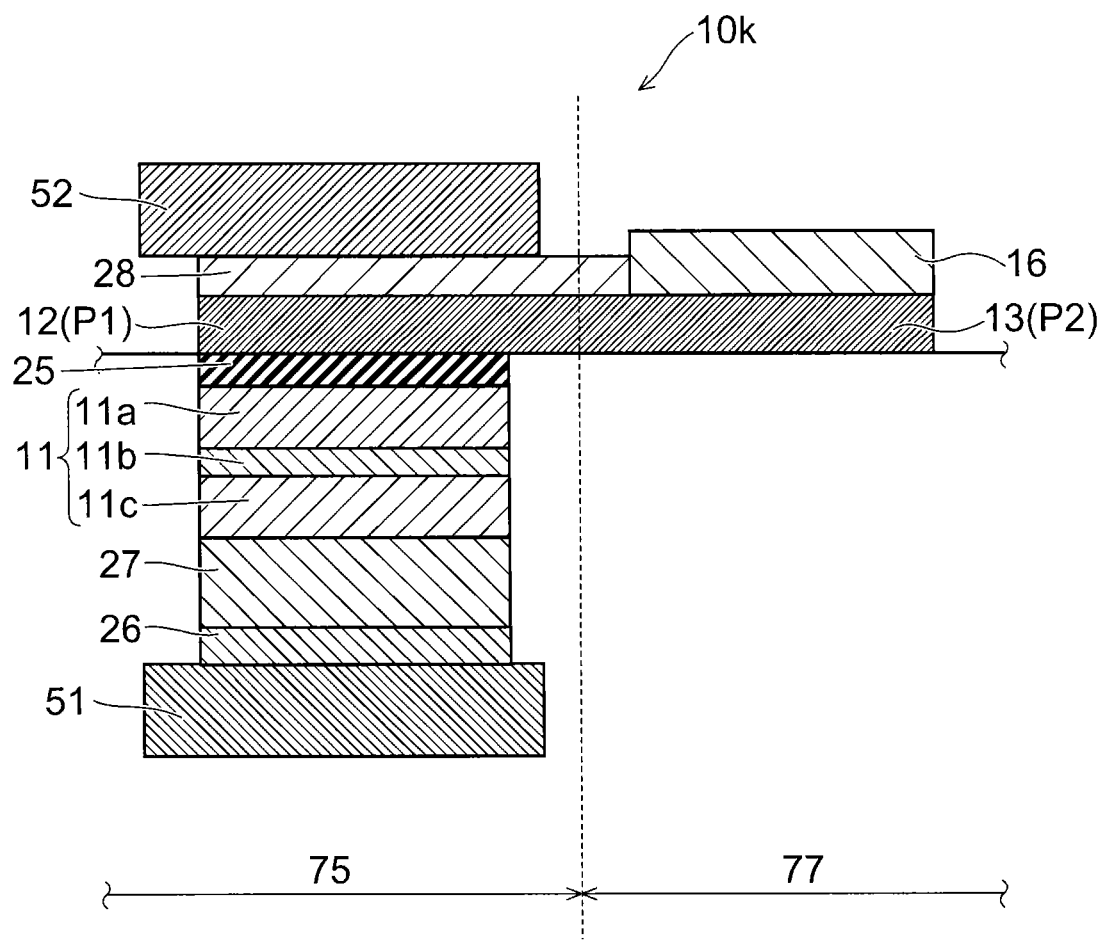
FIG. 18 is a schematic cross-sectional view illustrating an eleventh stacked body.

FIG. 18 is a schematic cross-sectional view illustrating an eleventh stacked body.

As compared with the seventh stacked body 10g shown in FIG. 14, an eleventh stacked body 10k shown in FIG. 18 further includes the sixth magnetic layer 16. The sixth magnetic layer 16 is provided on the third magnetic layer 13 on the second region 77. In other words, the third magnetic layer 13 is provided between the diaphragm 74 and the sixth magnetic layer 16.

A $Co_{40}Fe_{40}B_{20}$ layer having a thickness of 4 nm is used for the second magnetic layer 12, for example. A $Co_{40}Fe_{40}B_{20}$ layer having a thickness of 4 nm is used for the third magnetic layer 13, for example. A $Fe_{80}Ga_{20}$ layer having a thickness of 10 nm is used for the sixth magnetic layer 16, for example.

A material similar to the material of the second magnetic layer 12 described related to the fifth stacked body 10e can be used for the material of the second magnetic layer 12. A material similar to the material of the third magnetic layer 13 described related to the fifth stacked body 10e can be used for the material of the third magnetic layer 13. A material similar to the material of the sixth magnetic layer 16 described related to the fifth stacked body 10e can be used for the material of the sixth magnetic layer 16. Materials similar to the materials described related to the first stacked body 10a can be used for the layers other than the second magnetic layer 12, the third magnetic layer 13, and the sixth magnetic layer 16.

Figure 19:
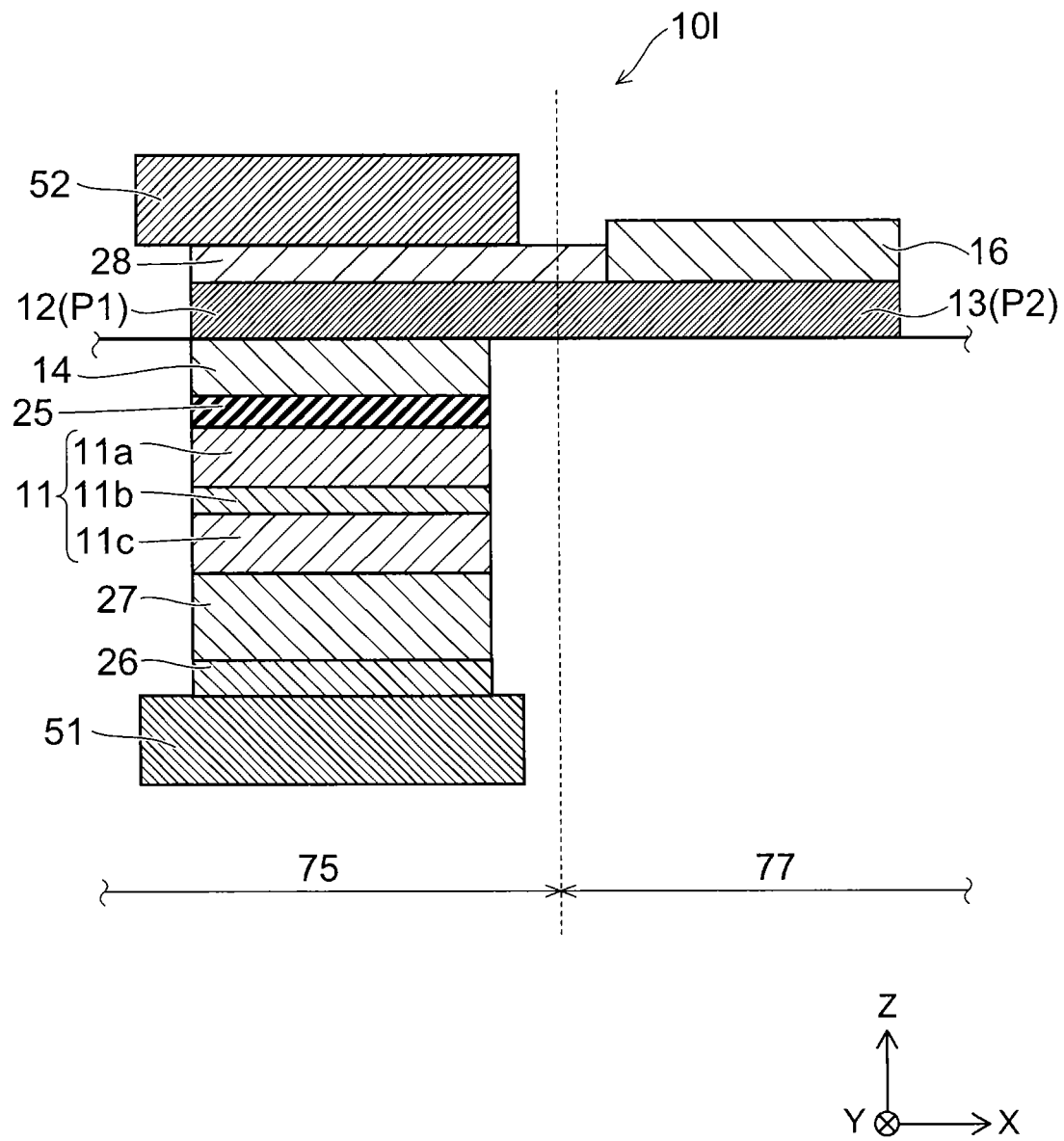
FIG. 19 is a schematic cross-sectional view illustrating a twelfth stacked body.

FIG. 19 is a schematic cross-sectional view illustrating a twelfth stacked body.

As compared with the eighth stacked body 10h shown in FIG. 15, a twelfth stacked body 10l shown in FIG. 19 further includes the sixth magnetic layer 16. The sixth magnetic layer 16 is provided on the third magnetic layer 13 on the second region 77. In other words, the third magnetic layer 13 is provided between the diaphragm 74 and the sixth magnetic layer 16.

A $Fe_{80}Ga_{20}$ layer having a thickness of 10 nm is used for the sixth magnetic layer 16, for example. A $Fe_{50}Co_{50}$ layer having a thickness of 5 nm is used for the second magnetic layer 12, for example. A $Fe_{50}Co_{50}$ layer having a thickness of 5 nm is used for the third magnetic layer 13, for example. A $Co_{40}Fe_{40}B_{20}$ layer having a thickness of 4 nm is used for the fourth magnetic layer 14, for example.

A material similar to the material of the second magnetic layer 12 described related to the sixth stacked body 10f can be used for the material of the second magnetic layer 12. A material similar to the material of the third magnetic layer 13 described related to the sixth stacked body 10f can be used for the material of the third magnetic layer 13. A material similar to the material of the fourth magnetic layer 14 described related to the sixth stacked body 10f can be used for the material of the fourth magnetic layer 14. A material similar to the material of the sixth magnetic layer 16 described related to the sixth stacked body 10f can be used for the material of the sixth magnetic layer 16. Materials similar to the materials described related to the first stacked body 10a can be used for the layers other than the second magnetic layer 12, the third magnetic layer 13, the fourth magnetic layer 14, and the sixth magnetic layer 16.

In the following, the structures of stacked bodies shown in FIG. 20 to FIG. 23 have a dual spin-valve structure in which a magnetization fixed layer is formed above and below a magnetization free layer. In the case where the structure of the stacked body is a dual spin-valve structure, when a tunnel insulating layer is used for the spacer layer, for example, the insulating layer includes two layers. In the case where a constant voltage is applied to a stacked body, a voltage applied to each insulating layer is lower than a voltage applied to an insulating layer formed of a single layer. Thus, a higher magnetoresistive effect is obtained at a higher voltage. A higher device current carrying reliability is obtained at a higher voltage.

Figure 20:
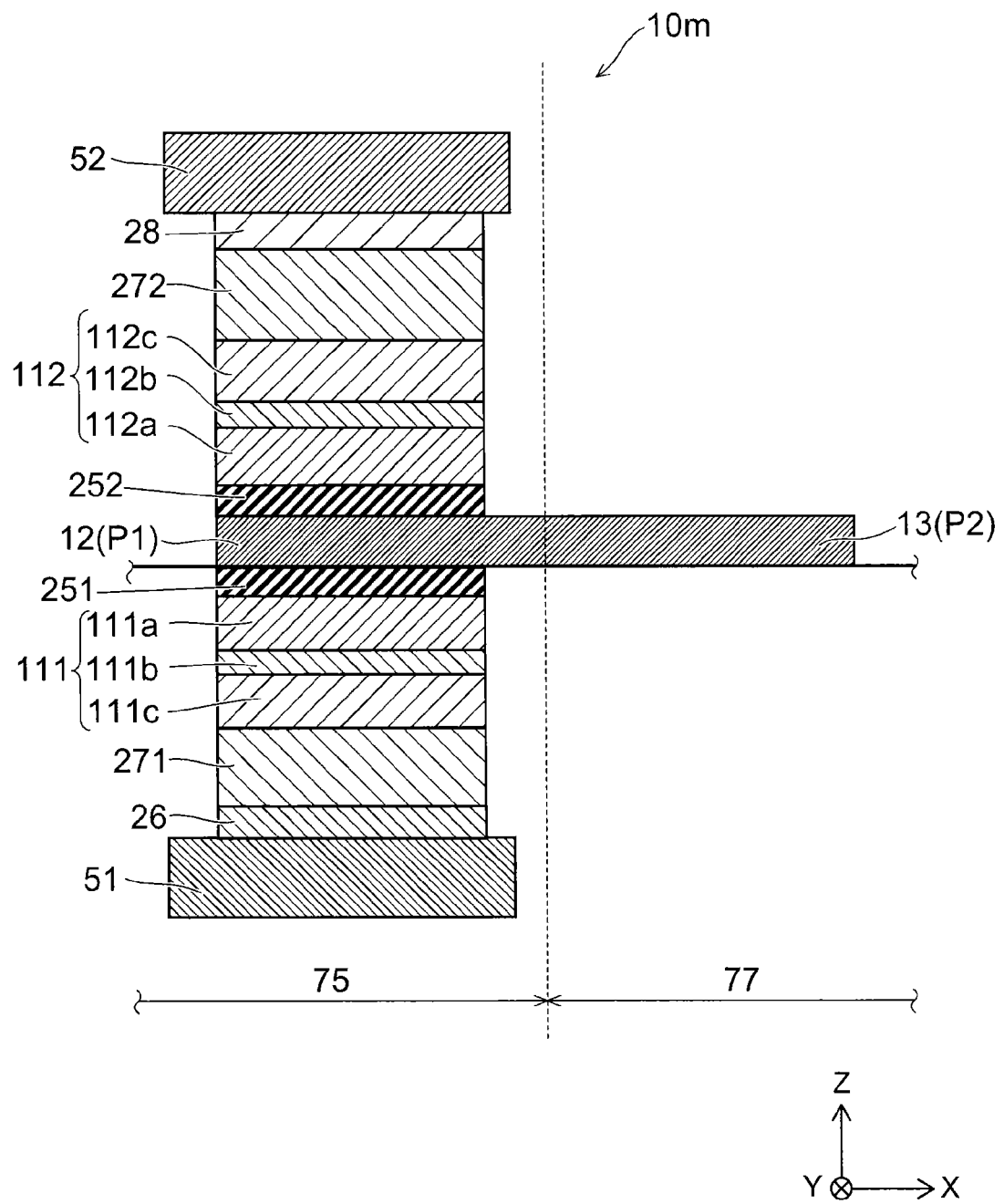
FIG. 20 is a schematic cross-sectional view illustrating a thirteenth stacked body.

FIG. 20 is a schematic cross-sectional view illustrating a thirteenth stacked body.

A thirteenth stacked body 10m shown in FIG. 20 includes a first magnetic layer 111 of a first stacked layer portion, a first magnetic layer 112 of a second stacked layer portion, the second magnetic layer 12, the third magnetic layer 13, a first spacer layer 251, a second spacer layer 252, the under layer 26, a first pinning layer 271, a second pinning layer 272, and the first cap layer 28. The first magnetic layer 111 of the first stacked layer portion includes a first reference layer 111a of the first stacked layer portion, a magnetic coupling layer 111b of the first stacked layer portion, and a second reference layer 111c of the first stacked layer portion. The first magnetic layer 112 of the second stacked layer portion includes a first reference layer 112a of the second stacked layer portion, a magnetic coupling layer 112b of the second stacked layer portion, and a second reference layer 112c of the second stacked layer portion.

On the first region 75, the under layer 26 is provided between the first electrode 51 and the second electrode 52. The first pinning layer 271 is provided between the under layer 26 and the second electrode 52. The second reference layer 111c of the first stacked layer portion is provided between the first pinning layer 271 and the second electrode 52. The magnetic coupling layer 111b of the first stacked layer portion is provided between the second reference layer 111c of the first stacked layer portion and the second electrode 52. The first reference layer 111a of the first stacked layer portion is provided between the magnetic coupling layer 111b of the first stacked layer portion and the second electrode 52. The first spacer layer 251 is provided between the first reference layer 111a of the first stacked layer portion and the second electrode 52. The second magnetic layer 12 is provided between the first spacer layer 251 and the second electrode 52. The second spacer layer 252 is provided between the second magnetic layer 12 and the second electrode 52. The first reference layer 112a of the second stacked layer portion is provided between the second spacer layer 252 and the second electrode 52. The magnetic coupling layer 112b of the second stacked layer portion is provided between the first reference layer 112a of the second stacked layer portion and the second electrode 52. The second reference layer 112c of the second stacked layer portion is provided between the magnetic coupling layer 112b of the second stacked layer portion and the second electrode 52. The second pinning layer 272 is provided between the second reference layer 112c of the second stacked layer portion and the second electrode 52. The first cap layer 28 is provided between the second pinning layer 272 and the second electrode 52.

The under layer 26, the first pinning layer 271, the first magnetic layer 111 of the first stacked layer portion, and the first spacer layer 251 are filled on the first region 75.

The third magnetic layer 13 is provided on the second region 77.

The third magnetic layer 13 continues with the second magnetic layer 12. For example, the third magnetic layer 13 is formed as a magnetic layer integrated with the second magnetic layer 12. In this case, the second magnetic layer 12 is the first portion P1 of one magnetic layer, and the first portion P1 is provided between the first electrode 51 and the second electrode 52. In this case, the third magnetic layer 13 is the second portion P2 of one magnetic layer, and the second portion P2 is provided on the second region.

Alternatively, the third magnetic layer 13 may be formed as a magnetic layer separately from the second magnetic layer 12. In this case, the third magnetic layer 13 contacts the second magnetic layer 12 in the direction crossing the stacking direction of layers.

In any cases, in the direction crossing the stacking direction of layers (in the X-axis direction), the third magnetic layer 13 includes a portion overlapping with the second magnetic layer 12. In other words, the third magnetic layer 13 is not apart from the second magnetic layer 12 in the stacking direction of layers.

A material similar to the material of the second magnetic layer 12 described related to FIG. 8 can be used for the second magnetic layer 12. A material similar to the material of the third magnetic layer 13 described related to FIG. 8 can be used for the third magnetic layer 13. In the thirteenth stacked body 10m, the first spacer layer 251 is provided below the second magnetic layer 12. In the thirteenth stacked body 10m, the second spacer layer 252 is provided on the second magnetic layer 12. Thus, in the case where at least one of the second magnetic layer 12 and the third magnetic layer 13 has a two-layer structure, desirably, a ferromagnetic body that can obtain a higher magnetoresistive effect is disposed on the interface of the first spacer layer 251. Desirably, a ferromagnetic body that can obtain a higher magnetoresistive effect is disposed on the interface of the second spacer layer 252.

In the case where an MgO tunnel insulating layer is used for the first spacer layer 251 and the second spacer layer 252, preferably, a layer of a Co—Fe—B alloy is provided on the interfaces contacting the first spacer layer 251 and the second spacer layer 252. Accordingly, a high magnetoresistive effect is obtained. In this case, desirably, a layer of a Co—Fe—B alloy is provided on the interfaces of the first spacer layer 251 and the second spacer layer 252, and the following layer is formed between the layers: a Fe—Co—Si—B alloy, a Fe—Ga alloy expressing a magnetostriction constant $\lambda s > 100$ ppm, a Fe—Co—Ga alloy, a Tb-M—Fe alloy (M is at least one selected from a group consisting of Sm, Eu, Gd, Dy, Ho, and Er), a Tb-M1-Fe-M2 alloy (M1 is at least one selected from a group consisting of Sm, Eu, Gd, Dy, Ho, and Er, and M2 is at least one selected from a group consisting of Ti, Cr, Mn, Co, Cu, Nb, Mo, W, and Ta), a Fe-M3-M4-B alloy (M3 is at least one selected from a group consisting of Ti, Cr, Mn, Co, Cu, Nb, Mo, W, and Ta, and M4 is at least one selected from a group consisting of Ce, Pr, Nd, Sm, Tb, Dy, and Er), Ni, Fe—Al, or ferrite (such as $Fe_3O_4$ and $(FeCo)_3O_4$)). For example, desirably, $Co_{40}Fe_{40}B_{20}/Fe_{80}Ga_{20}/Co_{40}Fe_{40}B_{20}$ is provided for the second magnetic layer 12 and the third magnetic layer 13. The thickness of $Co_{40}Fe_{40}B_{20}$ is 2 nm, for example. The thickness of $Fe_{80}Ga_{20}$ is 4 nm, for example. Materials similar to the materials described related to the first stacked body 10a can be used for the layers other than the second magnetic layer 12 and the third magnetic layer 13.

$Co_{40}Fe_{40}B_{20}/Fe_{80}Ga_{20}/Co_{40}Fe_{40}B_{20}$ is used for at least one of the second magnetic layer 12 and the third magnetic layer 13. The thickness of $Co_{40}Fe_{40}B_{20}$ is 2 nm. The thickness of $Fe_{80}Ga_{20}$ is 6 nm. The thickness of $Co_{40}Fe_{40}B_{20}$ is 2 nm.

Figure 21:
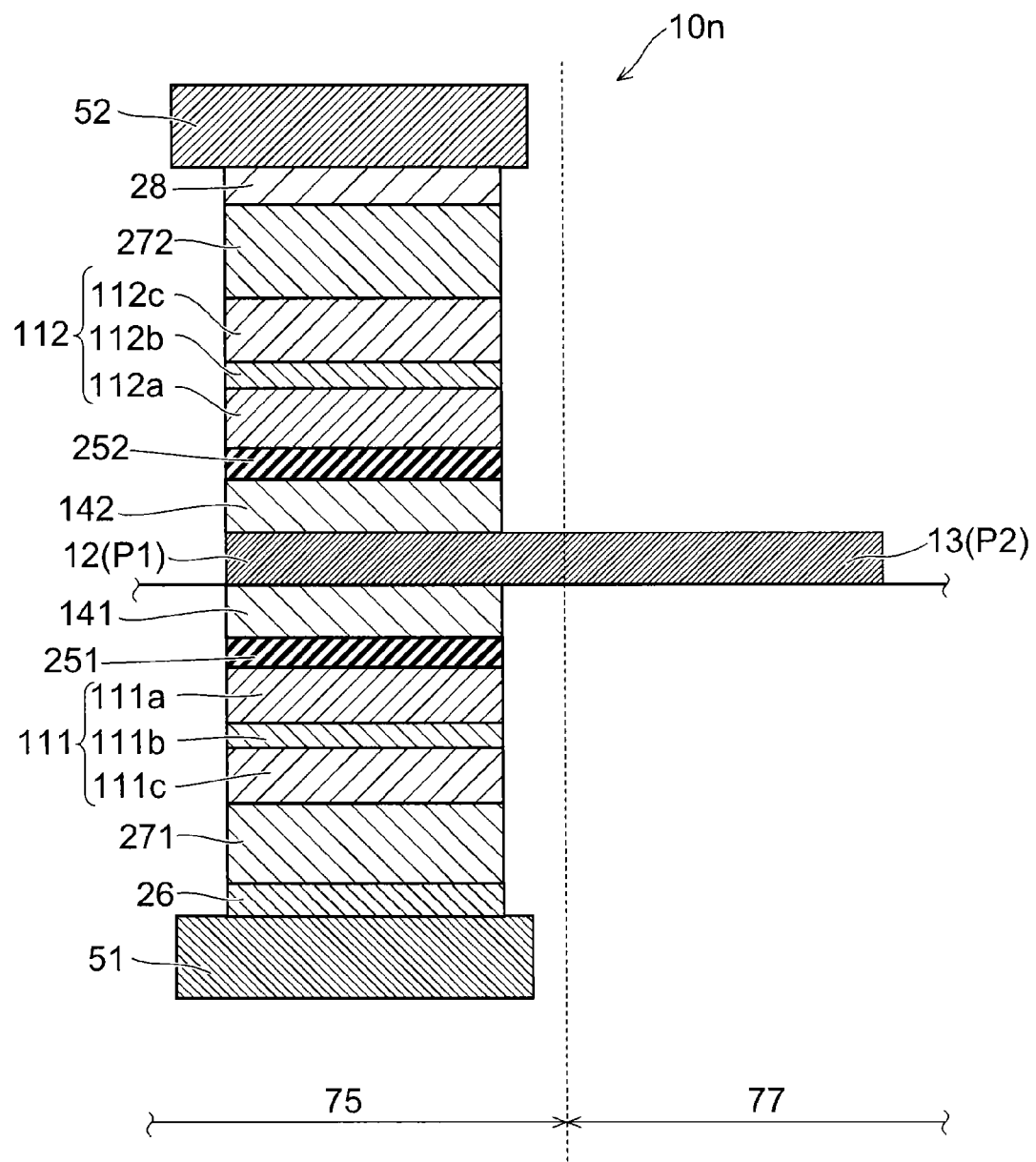
FIG. 21 is a schematic cross-sectional view illustrating a fourteenth stacked body.

FIG. 21 is a schematic cross-sectional view illustrating a fourteenth stacked body.

As compared with the thirteenth stacked body 10m shown in FIG. 20, a fourteenth stacked body 10n shown in FIG. 21 further includes a fourth magnetic layer 141 of a first stacked layer portion and a fourth magnetic layer 142 of a second stacked layer portion. The fourth magnetic layer 141 of the first stacked layer portion is provided between the first spacer layer 251 and the second magnetic layer 12. The fourth magnetic layer 142 of the second stacked layer portion is provided between the second magnetic layer 12 and the second spacer layer 252. The fourth magnetic layer 141 of the first stacked layer portion is filled on the first region 75.

A $Co_{40}Fe_{40}B_{20}$ layer having a thickness of 4 nm is used for the fourth magnetic layer 141 of the first stacked layer portion, for example. A $Fe_{80}Ga_{20}$ layer having a thickness of 10 nm is used for the second magnetic layer 12, for example. A $Fe_{80}Ga_{20}$ layer having a thickness of 10 nm is used for the third magnetic layer 13, for example. A $Co_{40}Fe_{40}B_{20}$ layer having a thickness of 4 nm is used for the fourth magnetic layer 142 of the second stacked layer portion, for example.

A material similar to the material of the fourth magnetic layer 14 described related to the second stacked body 10b can be used for the fourth magnetic layer 141 of the first stacked layer portion. A material similar to the material of the fourth magnetic layer 14 described related to the second stacked body 10b can be used for the fourth magnetic layer 142 of the second stacked layer portion. A material similar to the material of the second magnetic layer 12 described related to the second stacked body 10b can be used for the second magnetic layer 12. A material similar to the material of the third magnetic layer 13 described related to the second stacked body 10b can be used for the third magnetic layer 13.

Materials similar to the materials described related to the first stacked body 10a can be used for the layers other than the second magnetic layer 12, the third magnetic layer 13, the fourth magnetic layer 141 of the first stacked layer portion, and the fourth magnetic layer 142 of the second stacked layer portion.

Figure 22:
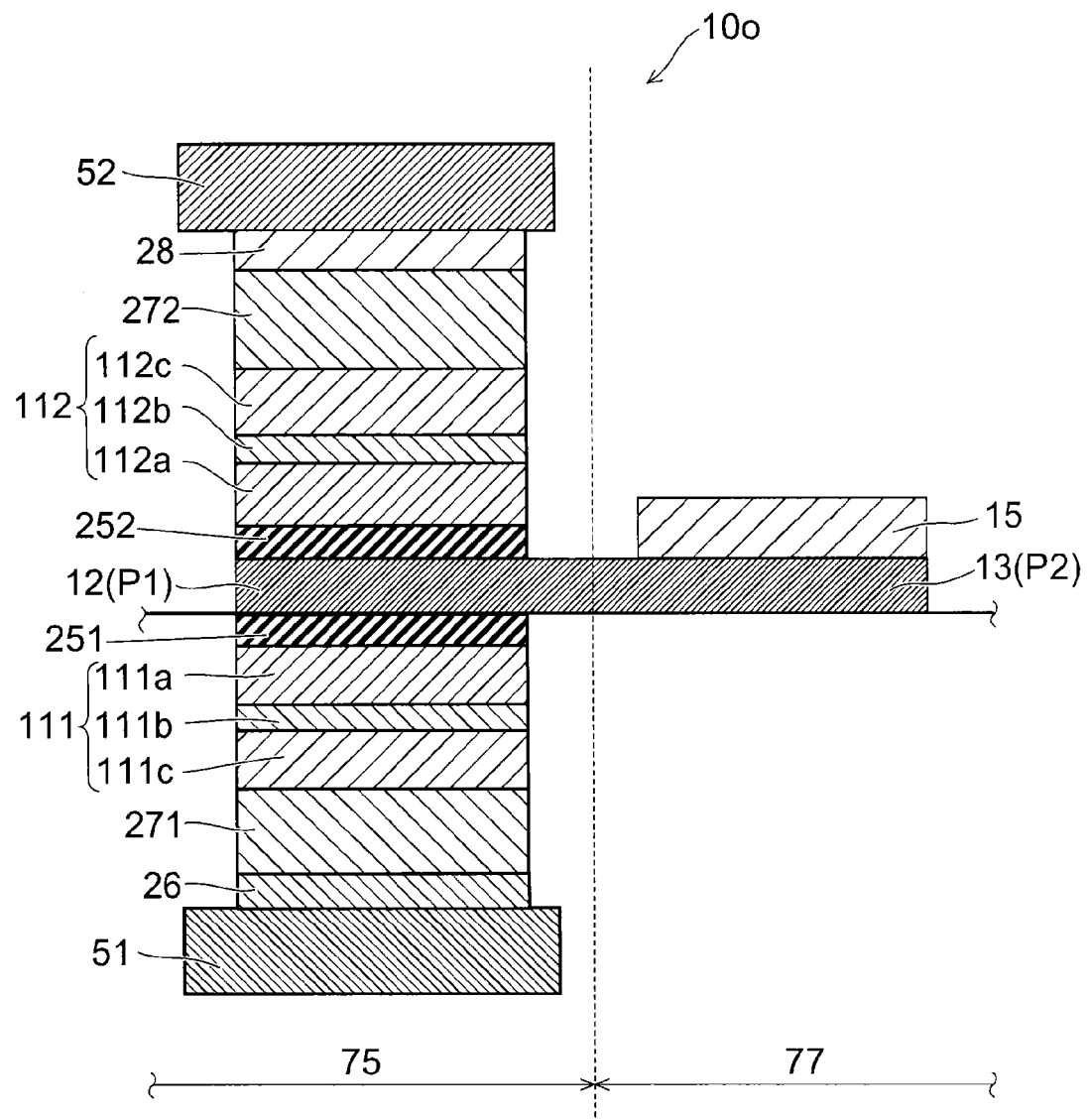
FIG. 22 is a schematic cross-sectional view illustrating a fifteenth stacked body.

FIG. 22 is a schematic cross-sectional view illustrating a fifteenth stacked body.

As compared with the thirteenth stacked body 10m shown in FIG. 20, a fifteenth stacked body 10o shown in FIG. 22 further includes the fifth magnetic layer 15. The fifth magnetic layer 15 is provided on the third magnetic layer 13. In other words, on the second region 77, the third magnetic layer 13 is provided between the diaphragm 74 and the fifth magnetic layer 15.

A $Co_{40}Fe_{40}B_{20}$ layer having a thickness of 4 nm is used for the second magnetic layer 12, for example. A $Co_{40}Fe_{40}B_{20}$ layer having a thickness of 4 nm is used for the third magnetic layer 13, for example. A $Fe_{80}Ga_{20}$ layer having a thickness of 10 nm is used for the fifth magnetic layer 15, for example.

A material similar to the material of the second magnetic layer 12 described related to the fourth stacked body 10d can be used for the material of the second magnetic layer 12. A material similar to the material of the third magnetic layer 13 described related to the fourth stacked body 10d can be used for the material of the third magnetic layer 13. A material similar to the material of the fifth magnetic layer 15 described related to the fourth stacked body 10d can be used for the material of the fifth magnetic layer 15. Materials similar to the materials described related to the first stacked body 10a can be used for the layers other than the second magnetic layer 12, the third magnetic layer 13, and the fifth magnetic layer 15.

Figure 23:
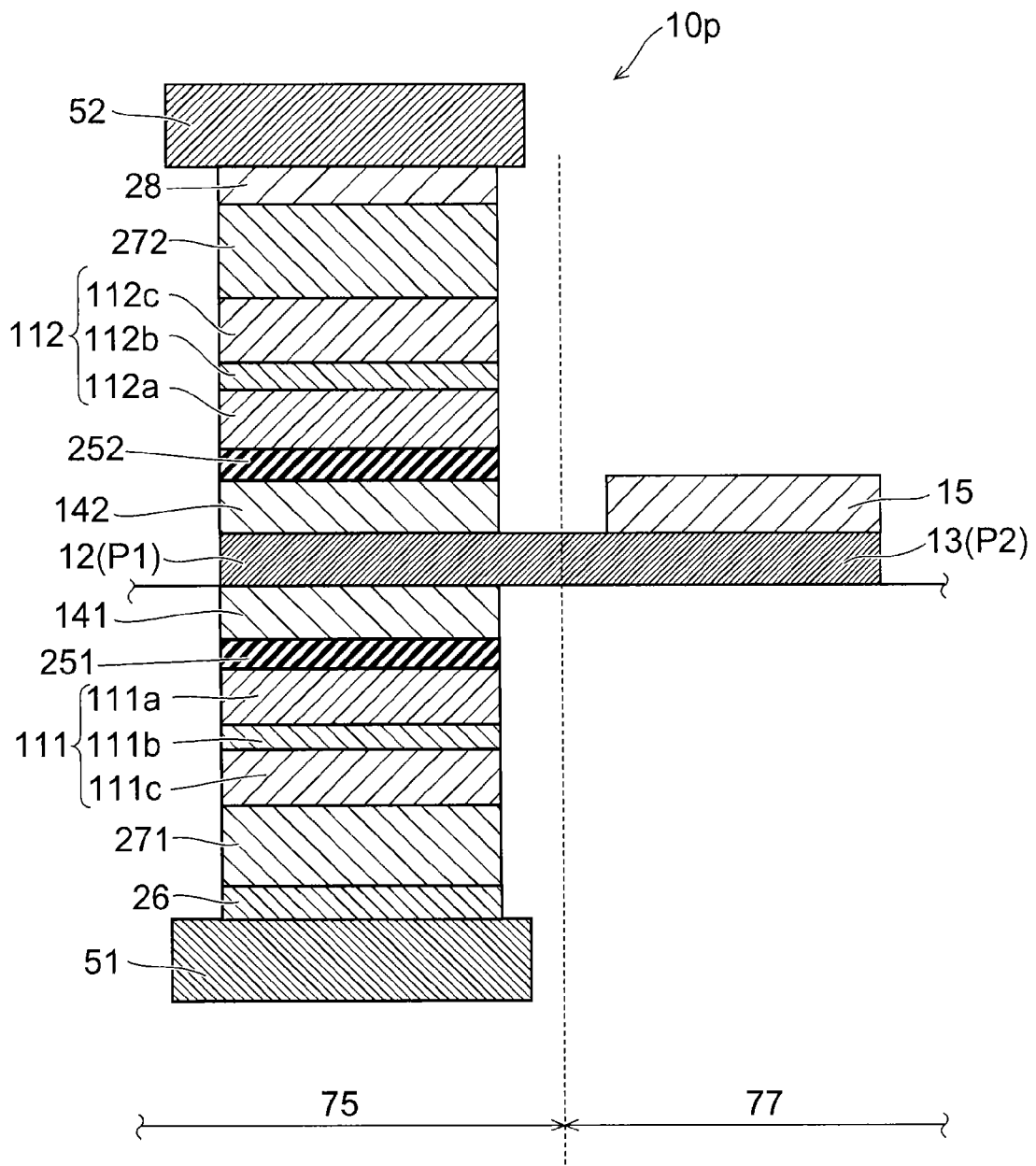
FIG. 23 is a schematic cross-sectional view illustrating a sixteenth stacked body.

FIG. 23 is a schematic cross-sectional view illustrating a sixteenth stacked body.

As compared with the fourteenth stacked body 10n shown in FIG. 21, a sixteenth stacked body 10p shown in FIG. 23 further includes the fifth magnetic layer 15. The fifth magnetic layer 15 is provided on the third magnetic layer 13. In other words, on the second region 77, the third magnetic layer 13 is provided between the diaphragm 74 and the fifth magnetic layer 15.

A $Co_{40}Fe_{40}B_{20}$ layer having a thickness of 4 nm is used for the fourth magnetic layer 141 of the first stacked layer portion, for example. A $Fe_{50}Co_{50}$ layer having a thickness of 5 nm is used for the second magnetic layer 12, for example. A $Fe_{50}Co_{50}$ layer having a thickness of 5 nm is used for the third magnetic layer 13, for example. A $Co_{40}Fe_{40}B_{20}$ layer having a thickness of 4 nm is used for the fourth magnetic layer 142 of the second stacked layer portion, for example. A $Fe_{80}Ga_{20}$ layer having a thickness of 10 nm is used for the fifth magnetic layer 15, for example.

A material similar to the material of the second magnetic layer 12 described related to the third stacked body 10c can be used for the material of the second magnetic layer 12. A material similar to the material of the third magnetic layer 13 described related to the third stacked body 10c can be used for the material of the third magnetic layer 13. A material similar to the material of the fourth magnetic layer 14 described related to the third stacked body 10c can be used for the fourth magnetic layer 141 of the first stacked layer portion. A material similar to the material of the fourth magnetic layer 14 described related to the third stacked body 10c can be used for the fourth magnetic layer 142 of the second stacked layer portion. A material similar to the material of the fifth magnetic layer 15 described related to the third stacked body 10c can be used for the material of the fifth magnetic layer 15.

Materials similar to the materials described related to the first stacked body 10a can be used for the layers other than the second magnetic layer 12, the third magnetic layer 13, the fourth magnetic layer 141 of the first stacked layer portion, the fourth magnetic layer 142 of the second stacked layer portion, and the fifth magnetic layer 15.

FIG. 24A to FIG. 24G are schematic cross-sectional views illustrating the process steps of a first manufacturing method for the stacked body according to the embodiment.

The drawings show an exemplary manufacturing method for the third stacked body 10c.

Figure 24A:
FIG. 24A to FIG. 24G are schematic cross-sectional views illustrating the process steps of a first manufacturing method for the stacked body according to the embodiment.

As shown in FIG. 24A, a thin film ($SiO_2$/Si, for example) 73f to be the diaphragm film 73 is formed on the support substrate (a Si substrate, for example) 71. Here, the detail of the manufacturing method for the stacked body will be described, and a manufacturing method for the diaphragm film 73 will be described later.

Figure 24B:
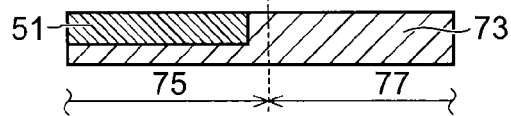

As shown in FIG. 24B, a part of the thin film 73f to be the diaphragm film 73 is etched. A metal to be the first electrode 51 is filled on the etched portion. A "lift-off" process is used for the process step, for example. In the lift-off process, a resist is formed in which the pattern of the metal to be the first electrode 51 is opened by photolithography. The metal to be the first electrode 51 is formed as the resist is left. After forming the metal, the resist is removed, and the metal on the resist other than the pattern of the first electrode 51 is simultaneously removed. Accordingly, such a structure can be formed in which the first electrode 51 is filled on a part of the diaphragm film 73.

In FIG. 24B to FIG. 24G, the support substrate 71 is omitted in the drawings.

In the process step, a process other than the lift-off process can be used. After the process step of removing the diaphragm film 73 on the portion of the pattern of the first electrode 51, the first electrode 51 is formed on throughout the surface. The metal of the first electrode 51 other than the portion of the pattern of the first electrode 51 is removed. The photolithography process may be performed for two times. A method such as physical milling and RIE (Reactive Ion Etching) can be used for etching the diaphragm film 73 and the first electrode 51. Sputtering, plating, CVD, or the like is used for forming a film of the first electrode 51. After preparing the structure illustrated in FIG. 24B, surface planarization may be performed on the surface by CMP (Chemical-Mechanical Polishing). Surface planarization is performed, so that a second magnetic film 12f, a fourth magnetic film 14f, a spacer film 25f, and a first reference film 11af, for example, can be flattened. Accordingly, a higher magnetoresistive effect is obtained.

Figure 24C:
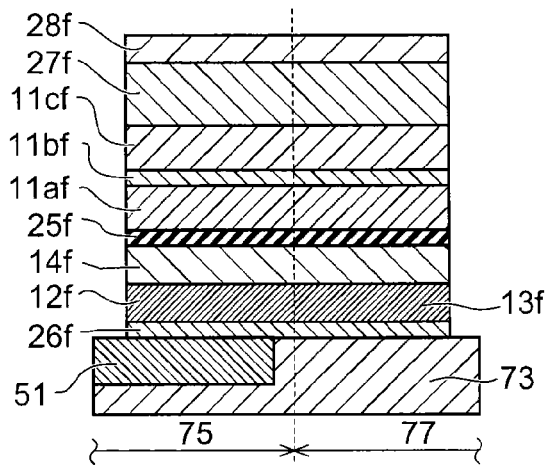

As shown in FIG. 24C, on the support substrate 71, a film to be the third stacked body 10c is formed on the first region 75 and the second region. In the process step, the film to be the third stacked body 10c is formed on throughout the surface on the support substrate 71. Sputtering is used to form the film to be the third stacked body 10c, for example. A under film 26f to be the under layer 26 is formed on the first electrode 51. The second magnetic film 12f to be the second magnetic layer 12 is formed on the under film 26f. A third magnetic film 13f to be the third magnetic layer 13 is formed on the under film 26f. The fourth magnetic film 14f to be the fourth magnetic layer 14 is formed on the second magnetic film 12f and the third magnetic film 13f. The spacer film 25f to be the spacer layer 25 is formed on the fourth magnetic film 14f. The first reference film 11af to be the first reference layer 11a is formed on the spacer film 25f. A magnetic coupling film 11bf to be the magnetic coupling layer 11b is formed on the first reference film 11af. A second reference film 11cf to be the second reference layer 11c is formed on the magnetic coupling film 11bf. A pinning film 27f to be the pinning layer 27 is formed on the second reference film 11cf. A first cap film 28f to be the first cap layer 28 is formed on the pinning film 27f.

In the embodiment, desirably, a multi-cathode sputtering device having about ten chambers is used for vacuum in-situ processing of multi-layer films. The films of the third stacked body 10c are removed other than the films on the first region 75 and the second region 77 at the edge of the diaphragm 74 by photolithography and etching.

Figure 24D:
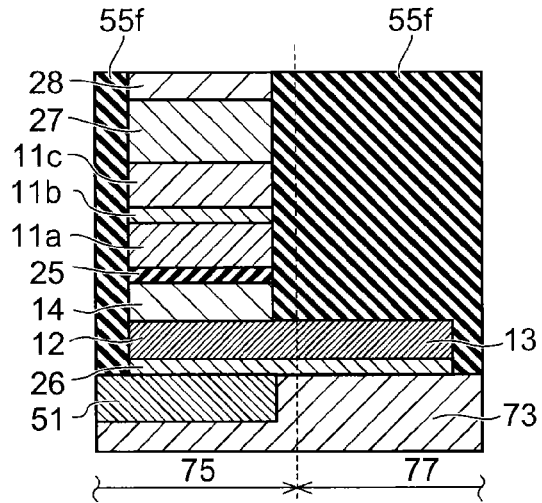

As shown in FIG. 24D, by photolithography and etching, the fourth magnetic film 14f, the spacer film 25f, the first reference film 11af, the magnetic coupling film 11bf, the second reference film 11cf, the pinning film 27f, and the first cap film 28f are removed by etching among the films of the third stacked body 10c on the second region 77. Accordingly, the under layer 26, the second magnetic layer 12, the fourth magnetic layer 14, the spacer layer 25, the first reference layer 11a, the magnetic coupling layer 11b, the second reference layer 11c, the pinning layer 27, and the first cap layer 28 are formed on the first region 75. The under layer 26 and the third magnetic layer 13 are formed on the first region 75 and on the second region 77. In the forming, the lift-off process is used to fill the portions around the films of the third stacked body 10c with an insulating film 55f.

Figure 24E:
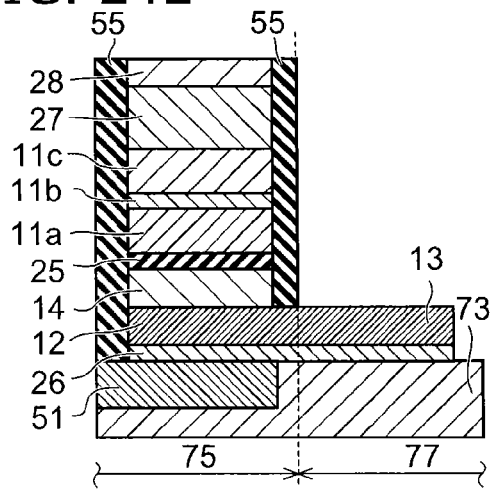

As shown in FIG. 24E, the insulating film 55f on the second region 77 is removed by photolithography and etching. Accordingly, the insulator 55 is formed around the films of the third stacked body 10c. In FIG. 24E, the insulating film 55f on the third magnetic layer 13 is filled on the second region 77 by photolithography and etching in the process step described related to FIG. 24D.

Figure 24F:
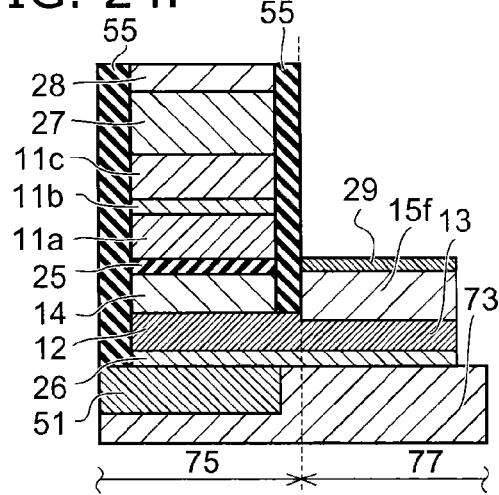

As shown in FIG. 24F, a fifth magnetic film 15f is formed on the third magnetic layer 13. The second cap layer 29 is formed on the fifth magnetic film 15f. In the process step, before forming the fifth magnetic film 15f, the surface of the third magnetic layer 13 is removed by etching, and oxides on the surface of the third magnetic layer 13 are removed. After forming the fifth magnetic film 15f on throughout the surface on the support substrate 71, the fifth magnetic film 15f formed on the portion other than the third magnetic layer 13 on the second region 77 is removed by photolithography and etching. Accordingly, the fifth magnetic layer 15 is formed on the third magnetic layer 13.

Figure 24G:
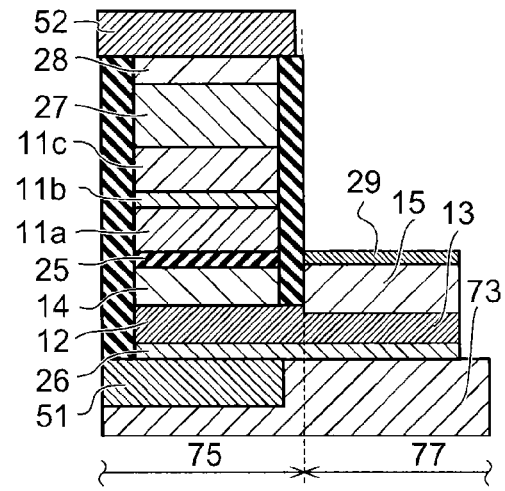

As shown in FIG. 24G, the second electrode 52 is formed on the third stacked body 10c on the first region 75. In the process step, the second electrode 52 can be formed in which the film of the second electrode 52 is formed and the pattern of the second electrode 52 is subjected to photolithography and etching.

In the process step shown in FIG. 24G, the manufacture of the third stacked body 10c is completed. After that, the diaphragm structure is formed.

The manufacturing method shown in FIG. 24A to FIG. 24G is an example. The order of patterning by photolithography and etching and the presence or absence of using the lift-off process may be changed in the technically feasible range. For example, after forming the second electrode 52 shown in FIG. 24G, a protective film may be formed on throughout the surface. An insulating layer and a resin may be used for the protective film, for example. The second cap layer 29 may be omitted.

FIG. 25A to FIG. 25G are schematic cross-sectional views illustrating the process steps of a second manufacturing method for the stacked body according to the embodiment.

The drawings show another example of a manufacturing method for the third stacked body 10c.

Figure 25A:
FIG. 25A to FIG. 25G are schematic cross-sectional views illustrating the process steps of a second manufacturing method for the stacked body according to the embodiment.
Figure 25B:
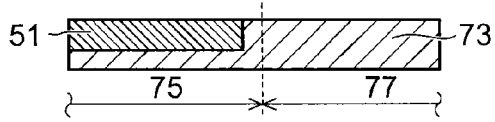

A process step shown in FIG. 25A is the same as the process step described related to FIG. 24A. The process step shown in FIG. 25B is the same as the process step described related to FIG. 24B.

Figure 25C:
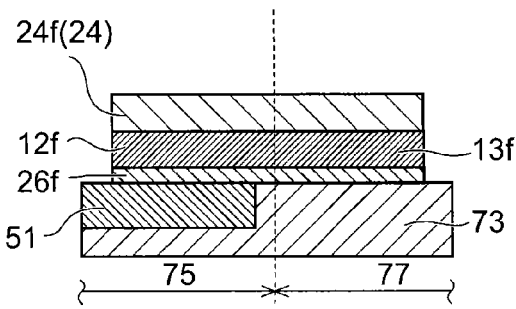

As shown in FIG. 25C, on the support substrate 71, a film to be the third stacked body 10c is formed on the first region 75 and the second region 77. In the process step, the film to be the third stacked body 10c is formed on throughout the surface on the support substrate 71. Sputtering is used to form the film to be the third stacked body 10c, for example. A under film 26f to be the under layer 26 is formed on the first electrode 51. The second magnetic film 12f to be the second magnetic layer 12 is formed on the under film 26f. The third magnetic film 13f to be the third magnetic layer 13 is formed on the under film 26f. A cap film 24f to be the cap layer is formed on the second magnetic film 12f and the third magnetic film 13f. The cap layer 24 is removed in the later process step.

In the embodiment, desirably, a multi-cathode sputtering device having about ten chambers is used for vacuum in-situ processing of multi-layer films. By photolithography and etching, the films of the third stacked body 10c are removed other than the films on the first region 75 and the second region 77 at the edge of the diaphragm 74.

Figure 25D:
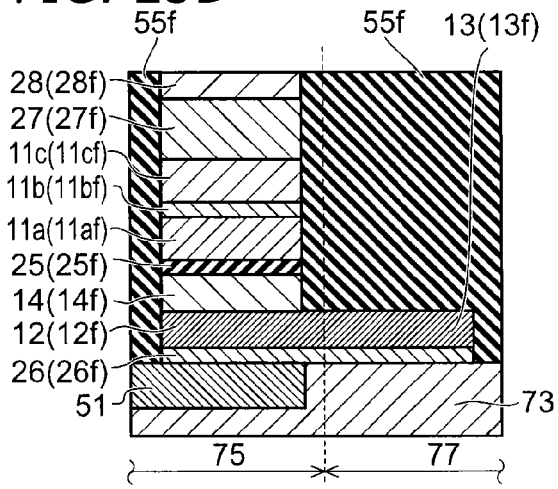

As shown in FIG. 25D, the fourth magnetic layer 14, the spacer layer 25, the first reference layer 11a, the magnetic coupling layer 11b, the second reference layer 11c, the pinning layer 27, and the first cap layer 28 are formed on the second magnetic layer 12 by photolithography and etching. In the process step, first, in FIG. 25C, the cap layer 24 formed on the second magnetic film 12f and the third magnetic film 13f is removed by milling or substrate bias sputtering. The fourth magnetic film 14f, the spacer film 25f, the first reference film 11af, the magnetic coupling film 11bf, the second reference film 11cf, the pinning film 27f, and the first cap film 28f are formed on throughout the surfaces of the second magnetic film 12f and the third magnetic film 13f.

Subsequently, the fourth magnetic film 14f, the spacer film 25f, the first reference film 11af, the magnetic coupling film 11bf, the second reference film 11cf, the pinning film 27f, and the first cap film 28f formed on the portions other than the second magnetic film 12f are removed by photolithography and etching. Accordingly, the under layer 26, the second magnetic layer 12, the fourth magnetic layer 14, the spacer layer 25, the first reference layer 11a, the magnetic coupling layer 11b, the second reference layer 11c, the pinning layer 27, and the first cap layer 28 are formed on the first region 75. The under layer 26 and the third magnetic layer 13 are formed on the first region 75 and on the second region 77. In the forming, the lift-off process is used, so that the portions around the films of the third stacked body 10c are filled with the insulating film 55f.

Figure 25E:
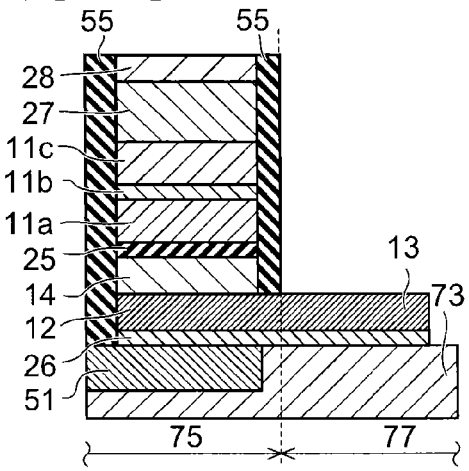
Figure 25F:
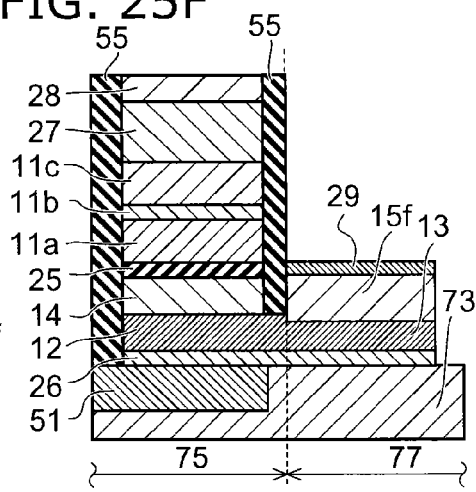
Figure 25G:
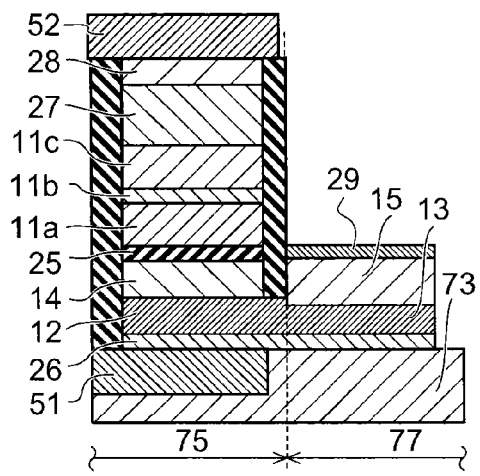

The process step shown in FIG. 25E is the same as the process step described related to FIG. 24E. The process step shown in FIG. 25F is the same as the process step described related to FIG. 24F. The process step shown in FIG. 25G is the same as the process step described related to FIG. 24G.

The manufacturing method shown in FIG. 25A to FIG. 25G is an example. The order of patterning by photolithography and etching and the presence or absence of using the lift-off process may be changed in the technically feasible range. For example, after forming the second electrode 52 shown in FIG. 25G, a protective film may be formed on throughout the surface. An insulating layer and a resin may be used for the protective film, for example. The second cap layer 29 may be omitted.

Figure 26:
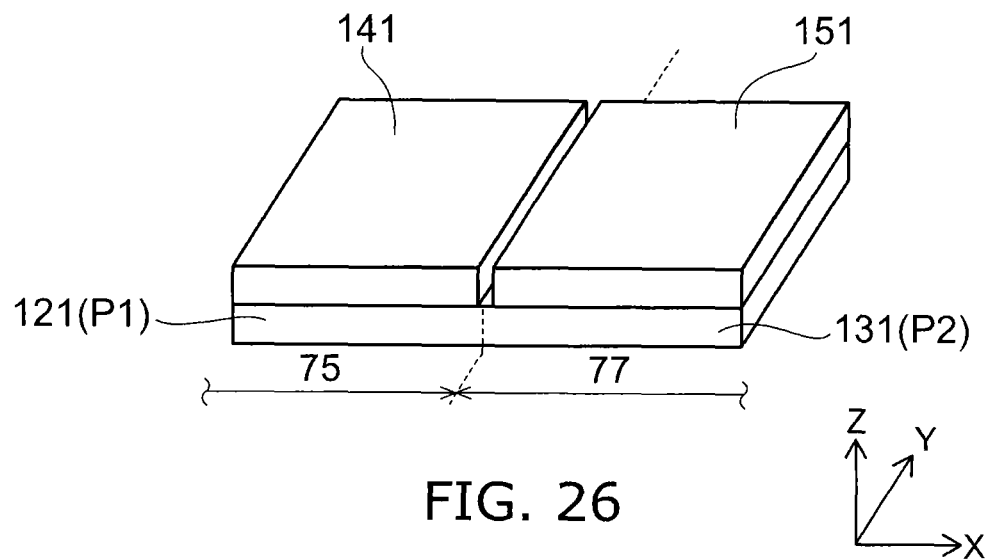
FIG. 26 is a perspective view schematically illustrating a first magnetization free layer according to the embodiment.

FIG. 26 is a perspective view schematically illustrating a first magnetization free layer according to the embodiment.

Figure 27:
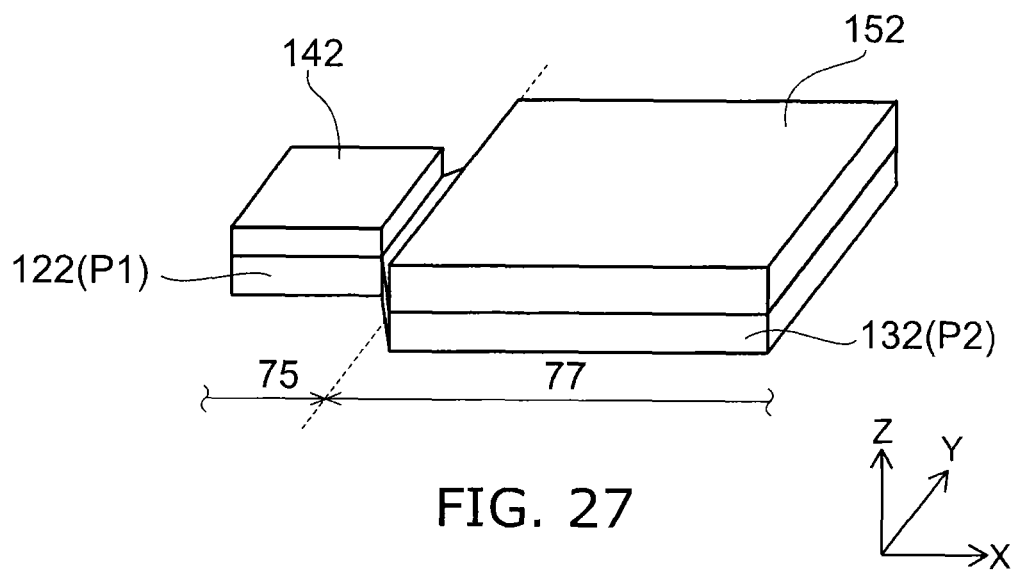
FIG. 27 is a perspective view schematically illustrating a second magnetization free layer according to the embodiment.

FIG. 27 is a perspective view schematically illustrating a second magnetization free layer according to the embodiment.

In FIG. 26 and FIG. 27, an exemplary configuration of the third stacked body 10c will be described. In the following, the description related to the third stacked body 10c is applicable to the first stacked body 10a, the second stacked body 10b, and the fourth stacked body 10d to the sixteenth stacked body 10p.

As shown in FIG. 26, the first magnetization free layer includes a second magnetic layer 121, a third magnetic layer 131, a fourth magnetic layer 141, and a fifth magnetic layer 151. The second magnetic layer 121, the third magnetic layer 131, the fourth magnetic layer 141, and the fifth magnetic layer 151 may have a two-dimensionally rectangular shape.

As shown in FIG. 27, the second magnetization free layer includes a second magnetic layer 122, a third magnetic layer 132, a fourth magnetic layer 142, and a fifth magnetic layer 152. The volume of the third magnetic layer 132 may be larger than the volume of the second magnetic layer 122. The volume of the third magnetic layer 132 may be larger than the volume of the fourth magnetic layer 142. The volume of the fifth magnetic layer 152 may be larger than the volume of the second magnetic layer 122. The volume of the fifth magnetic layer 152 may be larger than the volume of the fourth magnetic layer 142.

As shown in FIG. 27, the projected area of the third magnetic layer 132 to the plane orthogonal to the stacking direction of layers may be larger than the projected area of the second magnetic layer 122 to the plane orthogonal to the stacking direction of layers. The projected area of the third magnetic layer 132 to the plane orthogonal to the stacking direction of layers may be larger than the projected area of the fourth magnetic layer 142 to the plane orthogonal to the stacking direction of layers. The projected area of the fifth magnetic layer 152 to the plane orthogonal to the stacking direction of layers may be larger than the projected area of the second magnetic layer 122 to the plane orthogonal to the stacking direction of layers. The projected area of the fifth magnetic layer 152 to the plane orthogonal to the stacking direction of layers may be larger than the projected area of the fourth magnetic layer 142 to the plane orthogonal to the stacking direction of layers.

As shown in FIG. 27, the thickness of the third magnetic layer 132 (the length in the Z-axis direction) may be thicker than the thickness of the second magnetic layer 122 (the length in the Z-axis direction). The thickness of the third magnetic layer 132 may be thicker than the thickness of the fourth magnetic layer 142 (the length in the Z-axis direction). The thickness of the fifth magnetic layer 152 (the length in the Z-axis direction) may be thicker than the thickness of the second magnetic layer 122. The thickness of the fifth magnetic layer 152 (the length in the Z-axis direction) may be thicker than the thickness of the fourth magnetic layer 142.

As shown in FIG. 27, the sum of the thickness of the third magnetic layer 132 and the thickness of the fifth magnetic layer 152 may be greater than the sum of the thickness of the second magnetic layer 122 and the thickness of the fourth magnetic layer 142.

In the third stacked body 10c, the magnetization free layer where the strain of the diaphragm 74 causes a change in magnetization is the magnetization free layers formed on the second region 77 (the third magnetic layer 131 and the fifth magnetic layer 151, or the third magnetic layer 132 and the fifth magnetic layer 152). The third magnetic layer 131 is magnetically coupled to the second magnetic layer 121. The third magnetic layer 132 is magnetically coupled to the second magnetic layer 122. Thus, the magnetization of the second magnetic layer 121 is changed together with a change in the magnetization of the third magnetic layer 131. In other words, the magnetization direction of the second magnetic layer 121 is changed according to the magnetization direction of the third magnetic layer 131. The magnetization of the second magnetic layer 122 is changed together with a change in the magnetization of the third magnetic layer 132. In other words, the magnetization direction of the second magnetic layer 122 is changed according to the magnetization direction of the third magnetic layer 132.

The magnetization of the second magnetic layer 121 may not be fully changed together with a change in the magnetization of the third magnetic layer 131. The magnetization of the second magnetic layer 122 may not be fully changed together with a change in the magnetization of the third magnetic layer 132. In transducing magnetization, a slight loss occurs.

In the case of the second magnetization free layer shown in FIG. 27, the volume of the third magnetic layer 132 is larger than the volume of the second magnetic layer 122. In other words, the volume of the second magnetic layer 122 is smaller than the volume of the third magnetic layer 132. Thus, as compared with the case of the first magnetization free layer shown in FIG. 26, the magnetization of the second magnetic layer 122 is more easily changed together with the magnetization of the third magnetic layer 132. Accordingly, a loss in transducing magnetization can be suppressed at the minimum.

In order to obtain a higher pressure sensitivity, the structure of the second magnetization free layer is more favorable than the structure of the first magnetization free layer.

Figure 28:
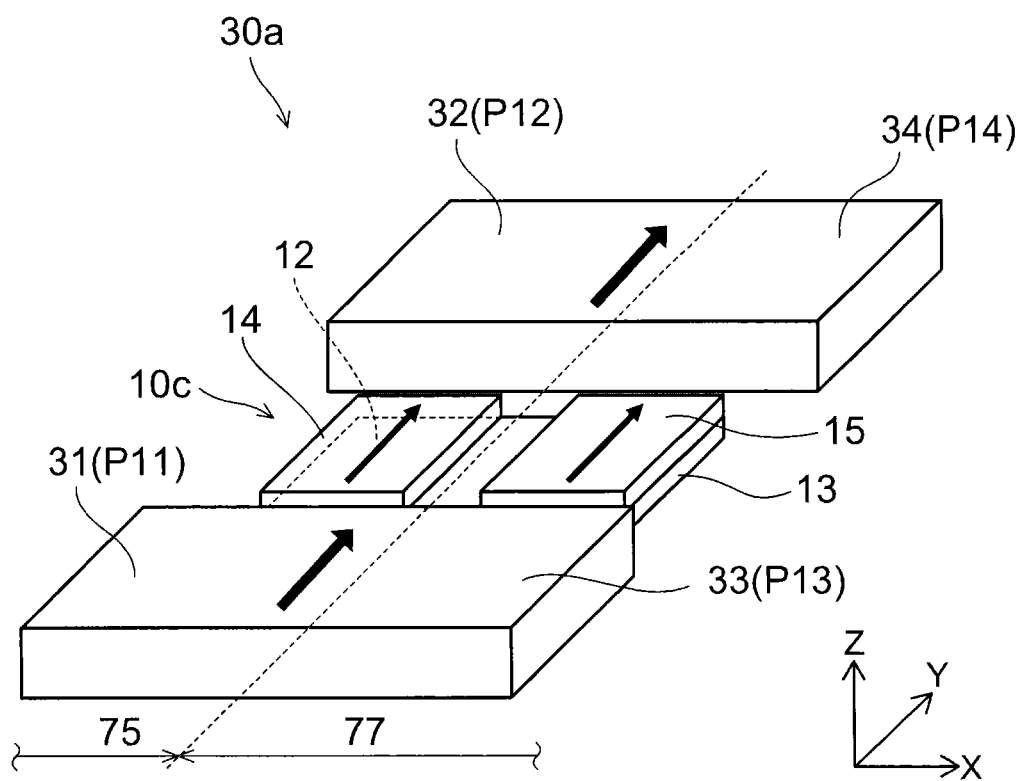
FIG. 28 is a perspective view schematically illustrating a first hard bias layer according to the embodiment.

FIG. 28 is a perspective view schematically illustrating a first hard bias layer according to the embodiment.

In the following, in FIG. 28 to FIG. 32, the embodiment will be described as the case is taken as an example where the sensor 310 according to the embodiment includes the third stacked body 10c. In the following, the description related to FIG. 28 to FIG. 32 is applicable to the case where the sensor 310 according to the embodiment includes any one of the first stacked body 10a, the second stacked body 10b, and the fourth stacked body 10d to the sixteenth stacked body 10p.

A pressure sensor shown in FIG. 28 includes a first hard bias layer 30a. The first hard bias layer 30a includes a first hard bias 31, a second hard bias 32, a third hard bias 33, and a fourth hard bias 34. The first hard bias 31 is provided on the first region 75. The second hard bias 32 is provided on the first region 75. The third hard bias 33 is provided on the second region 77. The fourth hard bias 34 is provided on the second region 77.

In the direction crossing the stacking direction of layers (in the Y-axis direction in the example), the second magnetic layer 12 and the fourth magnetic layer 14 are provided between the first hard bias 31 and the second hard bias 32. In the direction crossing the stacking direction of layers (in the Y-axis direction in the example), the third magnetic layer 13 and the fifth magnetic layer 15 are provided between the third hard bias 33 and the fourth hard bias 34.

In the example, the first hard bias 31 continues with the third hard bias 33. For example, the third hard bias 33 is formed as a hard bias integrated with the first hard bias 31. In this case, the first hard bias 31 is a first hard bias portion P11 of one hard bias, and is the first hard bias portion P11 provided on the first region 75. In this case, the third hard bias 33 is a third hard bias portion P13 of one hard bias, and is the third hard bias portion P13 provided on the second region 77.

Alternatively, the first hard bias 31 may be formed as a hard bias separately from the third hard bias 33. In this case, the third hard bias 33 contacts the first hard bias 31 in the direction crossing the stacking direction of layers (in the X-axis direction in the example).

In the example, the second hard bias 32 continues with the fourth hard bias 34. For example, the fourth hard bias 34 is formed as a hard bias integrated with the second hard bias 32. In this case, the second hard bias 32 is a second hard bias portion P12 of one hard bias, and is the second hard bias portion P12 provided on the first region 75. In this case, the fourth hard bias 34 is a fourth hard bias portion P14 of one hard bias, and is the fourth hard bias portion P14 provided on the second region 77.

Alternatively, the second hard bias 32 may be formed as a hard bias separately from the fourth hard bias 34. In this case, the fourth hard bias 34 contacts the second hard bias 32 in the direction crossing the stacking direction of layers (in the X-axis direction in the example).

The magnetization of the first hard bias 31 is directed to one direction. The magnetization of the second hard bias 32 is directed to one direction. The magnetization of the third hard bias 33 is directed to one direction. The magnetization of the fourth hard bias 34 is directed to one direction. In the example, the magnetizations of the first hard bias 31 to the fourth hard bias 34 are directed to the direction the same as the circumferential direction of the diaphragm 74.

The first hard bias 31 directs at least one of the magnetizations of the second magnetic layer 12 to the fifth magnetic layer 15 to a given direction by the magnetization of the first hard bias 31 itself. The second hard bias 32 directs at least one of the magnetizations of the second magnetic layer 12 to the fifth magnetic layer 15 to a given direction by the magnetization of the second hard bias 32 itself. The third hard bias 33 directs at least one of the magnetizations of the second magnetic layer 12 to the fifth magnetic layer 15 to a given direction by the magnetization of the third hard bias 33 itself. The fourth hard bias 34 directs at least one of the magnetizations of the second magnetic layer 12 to the fifth magnetic layer 15 to a given direction by the magnetization of the fourth hard bias 34 itself.

Accordingly, in the state in which no pressure is applied to the diaphragm 74, the magnetizations of the second magnetic layer 12 to the fifth magnetic layer 15 can be directed to a given direction. The magnetizations of the second magnetic layer 12 to the fifth magnetic layer 15 are biased by the first hard bias layer 30a, so that the generation of magnetic domains in the inside of the second magnetic layer 12 to the fifth magnetic layer 15 can be suppressed, and the pressure-electrical resistance characteristics of excellent reproducibility can be obtained.

A hard ferromagnetic material having a relatively high magnetic anisotropy such as CoPt, CoCrPt, and FePt is used for the first hard bias 31, for example. Such a material may be used for the first hard bias 31, other than a hard ferromagnetic material, in which a soft magnetic material such as FeCo and Fe is stacked on an antiferromagnetic layer and the magnetizations are aligned in one direction by exchange coupling. The thickness of the first hard bias 31 (the length in the Z-axis direction) is about 5 nm to 50 nm, for example. A material similar to the material of the first hard bias 31 is used for the second hard bias 32 to the fourth hard bias 34. The thicknesses of the second hard bias 32 to the fourth hard bias 34 are almost the same as the thickness of the first hard bias 31.

Figure 29:
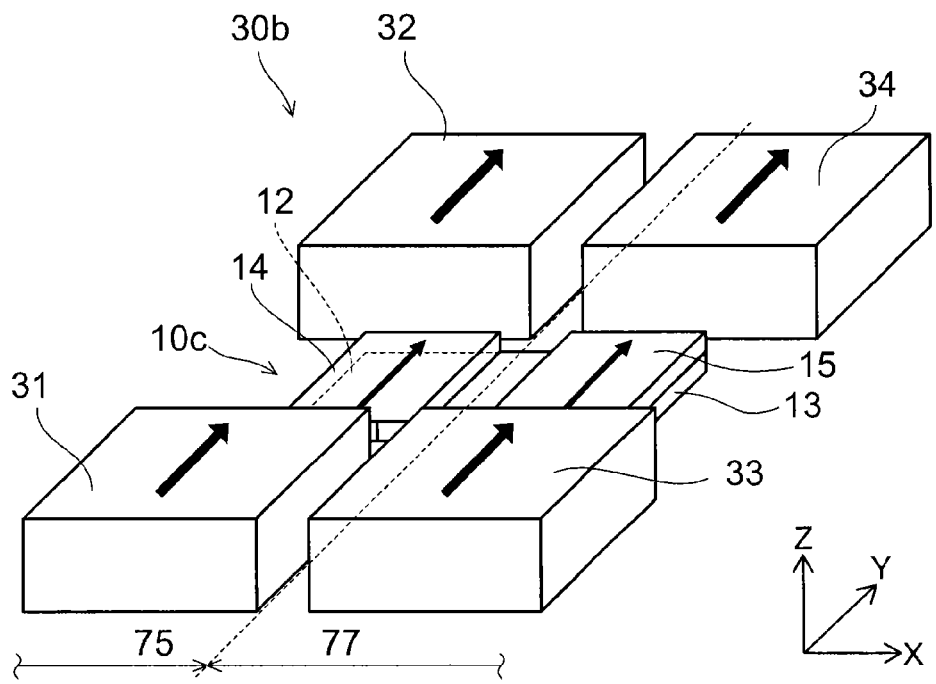
FIG. 29 is a perspective view schematically illustrating a second hard bias layer according to the embodiment.

FIG. 29 is a perspective view schematically illustrating a second hard bias layer according to the embodiment.

A pressure sensor shown in FIG. 29 includes a second hard bias layer 30b. The second hard bias layer 30b includes the first hard bias 31, the second hard bias 32, the third hard bias 33, and the fourth hard bias 34. The first hard bias 31 is provided on the first region 75. The second hard bias 32 is provided on the first region 75. The third hard bias 33 is provided on the second region 77. The fourth hard bias 34 is provided on the second region 77.

In the example, the first hard bias 31 is formed as a hard bias separately from the third hard bias 33. The third hard bias 33 is provided apart from the first hard bias 31 in the direction crossing the stacking direction of layers (in the X-axis direction in the example). The second hard bias 32 is formed as a hard bias separately from the fourth hard bias 34. The fourth hard bias 34 is provided apart from the second hard bias 32 in the direction crossing the stacking direction of layers (in the X-axis direction in the example).

The other structures of the second hard bias layer 30b are the same as the structures of the first hard bias layer 30a.

In the example, a more appropriate hard bias can be selected for use as matched with the material and shape of the fifth magnetic layer 15, for example. In the example, a more appropriate hard bias can be selected for use as matched with the material and shape of the fourth magnetic layer 14, for example. For example, in the case where the thickness of the fifth magnetic layer 15 is thicker than the thickness of the fourth magnetic layer 14, the magnetic thickness of the third hard bias 33 is made thicker than the magnetic thickness of the first hard bias 31 and the magnetic thickness of the second hard bias 32. Alternatively, the magnetic thickness of the fourth hard bias 34 is made thicker than the magnetic thickness of the first hard bias 31 and the magnetic thickness of the second hard bias 32. Alternatively, in the case where the sum of the thickness of the third magnetic layer 13 and the thickness of the fifth magnetic layer 15 is greater than the sum of the thickness of the second magnetic layer 12 and the thickness of the fourth magnetic layer 14, the magnetic thickness of the third hard bias 33 is made thicker than the magnetic thickness of the first hard bias 31 and the magnetic thickness of the second hard bias 32. Alternatively, the magnetic thickness of the fourth hard bias 34 is made thicker than the magnetic thickness of the first hard bias 31 and the magnetic thickness of the second hard bias 32. The magnetic field of the third hard bias 33 is larger than the magnetic field of the first hard bias 31 and the magnetic field of the second hard bias 32. The magnetic field of the fourth hard bias 34 is larger than the magnetic field of the first hard bias 31 and the magnetic field of the second hard bias 32. Accordingly, a more appropriate bias magnetic field can be applied to the second magnetic layer 12 to the fifth magnetic layer 15.

Figure 30:
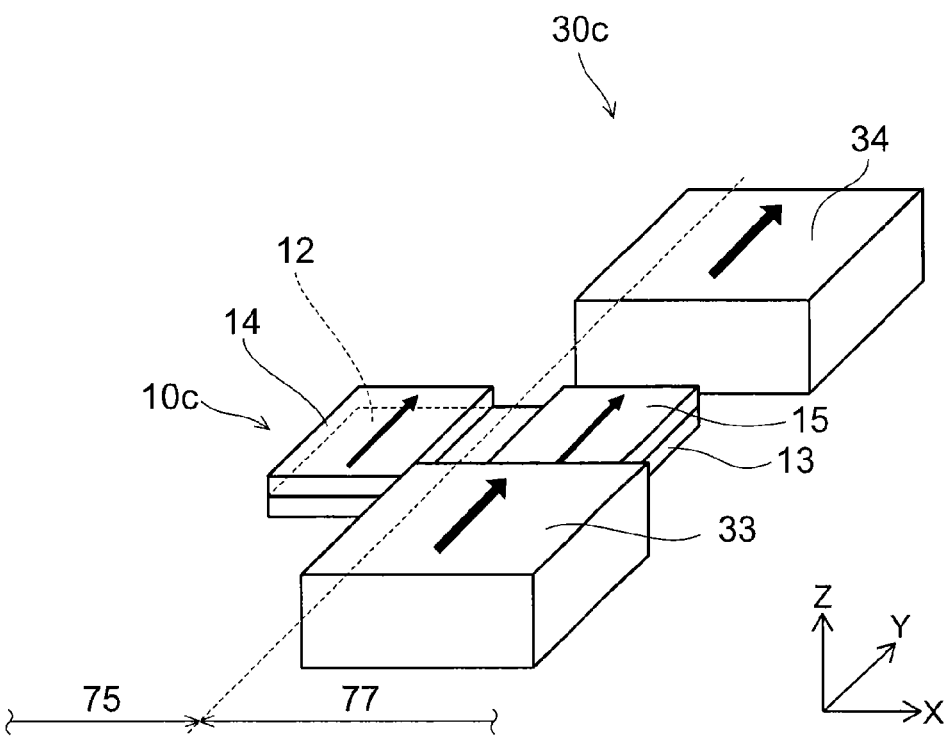
FIG. 30 is a perspective view schematically illustrating a third hard bias layer according to the embodiment.

FIG. 30 is a perspective view schematically illustrating a third hard bias layer according to the embodiment.

A pressure sensor shown in FIG. 30 includes a third hard bias layer 30c. The third hard bias layer 30c includes the third hard bias 33 and the fourth hard bias 34. In other words, as compared with the first hard bias layer 30a, the third hard bias layer 30c is not provided with the first hard bias 31 and the second hard bias 32.

The other structures of the third hard bias layer 30c are the same as the structures of the first hard bias layer 30a.

In the example, a magnetic field is applied from the third hard bias layer 30c to the third magnetic layer 13. In the example, a magnetic field is applied from the third hard bias layer 30c to the fifth magnetic layer 15. The second magnetic layer 12 is magnetically coupled to the third magnetic layer 13. Thus, the bias point of the second magnetic layer 12 and the bias point of the fourth magnetic layer 14 can be controlled.

Figure 31:
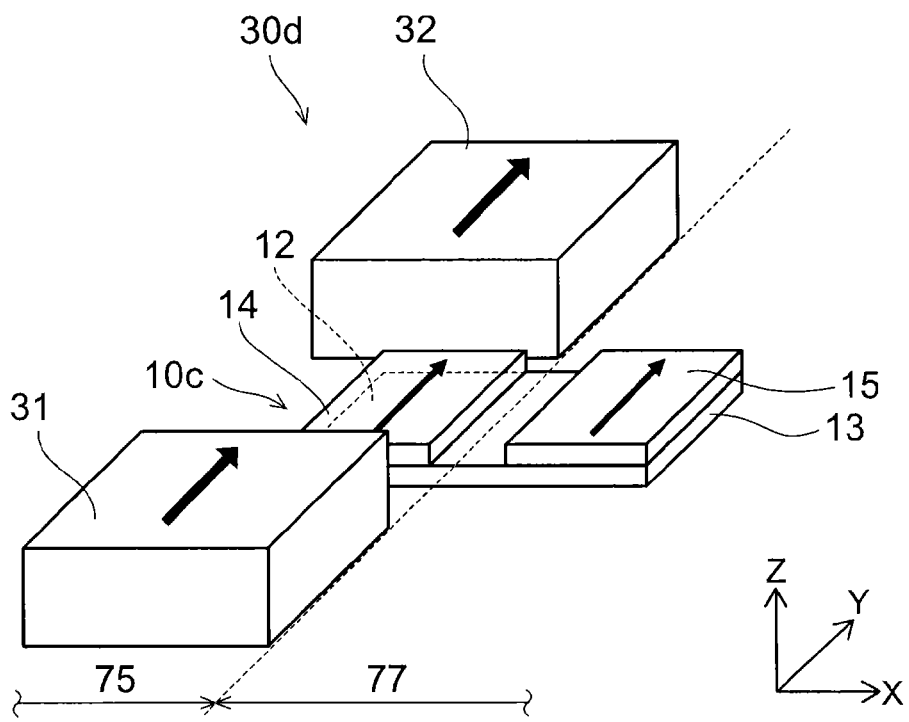
FIG. 31 is a perspective view schematically illustrating a fourth hard bias layer according to the embodiment.

FIG. 31 is a perspective view schematically illustrating a fourth hard bias layer according to the embodiment.

A pressure sensor shown in FIG. 31 includes a fourth hard bias layer 30d. The fourth hard bias layer 30d includes the first hard bias 31 and the second hard bias 32. In other words, as compared with the first hard bias layer 30a, the fourth hard bias layer 30d is not provided with the third hard bias 33 and the fourth hard bias 34.

The other structures of the fourth hard bias layer 30d are the same as the structures of the first hard bias layer 30a.

In the example, a magnetic field is applied from the fourth hard bias layer 30d to the second magnetic layer 12. In the example, a magnetic field is applied from the fourth hard bias layer 30d to the fourth magnetic layer 14. The third magnetic layer 13 is magnetically coupled to the second magnetic layer 12. Thus, the bias point of the third magnetic layer 13 and the bias point of the fifth magnetic layer 15 can be controlled.

Figure 32:
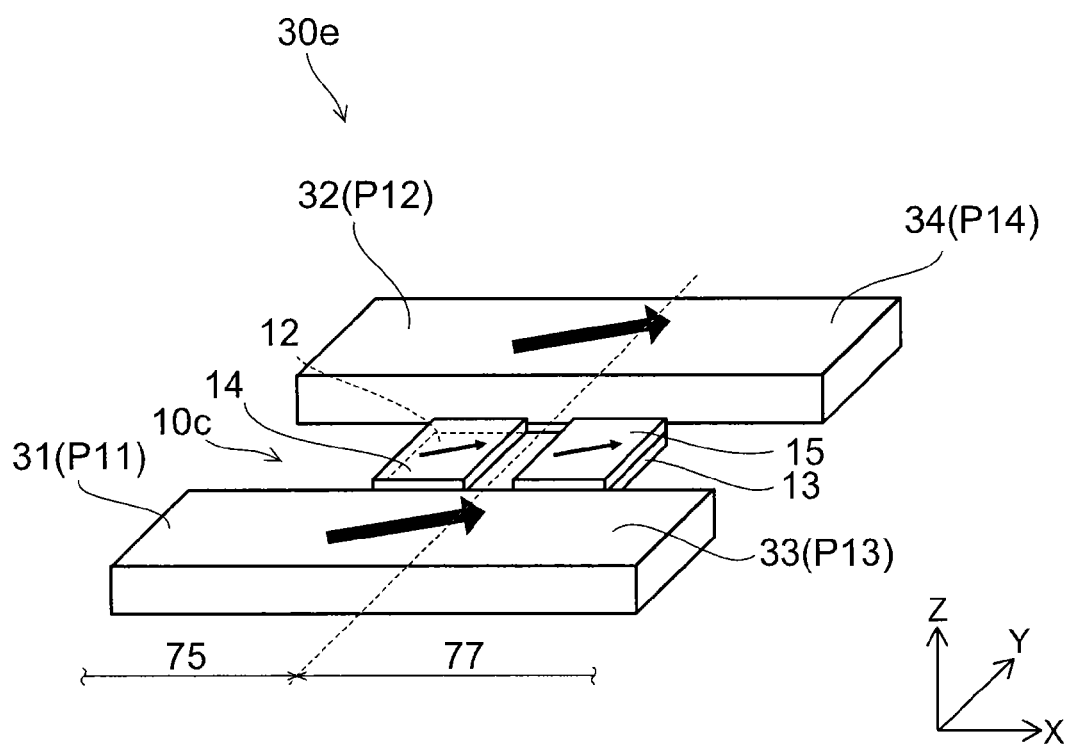
FIG. 32 is a perspective view schematically illustrating a fifth hard bias layer according to the embodiment.

FIG. 32 is a perspective view schematically illustrating a fifth hard bias layer according to the embodiment.

A pressure sensor shown in FIG. 32 includes a fifth hard bias layer 30e. The structure of the fifth hard bias layer 30e is the same as the structure of the first hard bias layer 30a except the magnetization direction. In the example, the magnetizations of the first hard bias 31 to the fourth hard bias 34 are directed to the direction tilted from the circumferential direction of the diaphragm 74 (in the direction tilted at an angle of 45°, for example).

As shown in FIG. 28 and FIG. 32, the magnetization directions of the first hard bias 31 to the fourth hard bias 34 are optional. The magnetization directions of the first hard bias 31 to the fourth hard bias 34 are determined by applying a magnetic field of 5 kOe (oersted, Oe), for example, to the first hard bias 31 to the fourth hard bias 34 for magnetization.

The value of a magnetic field applied in magnetization is the value greater than the coercivity of a hard ferromagnetic material used for the first hard bias 31 to the fourth hard bias 34. In the case where a stacked body of a soft magnetic material and an antiferromagnetic layer is used for the first hard bias 31 to the fourth hard bias 34, field annealing is performed. For example, in the case where a stacked body of FeCo and IrMn is used for the first hard bias 31 to the fourth hard bias 34, field annealing is performed at a temperature of 290° C. for one hour. Accordingly, the magnetization of FeCo can be directed to one direction.

Second Embodiment

Figure 33A:
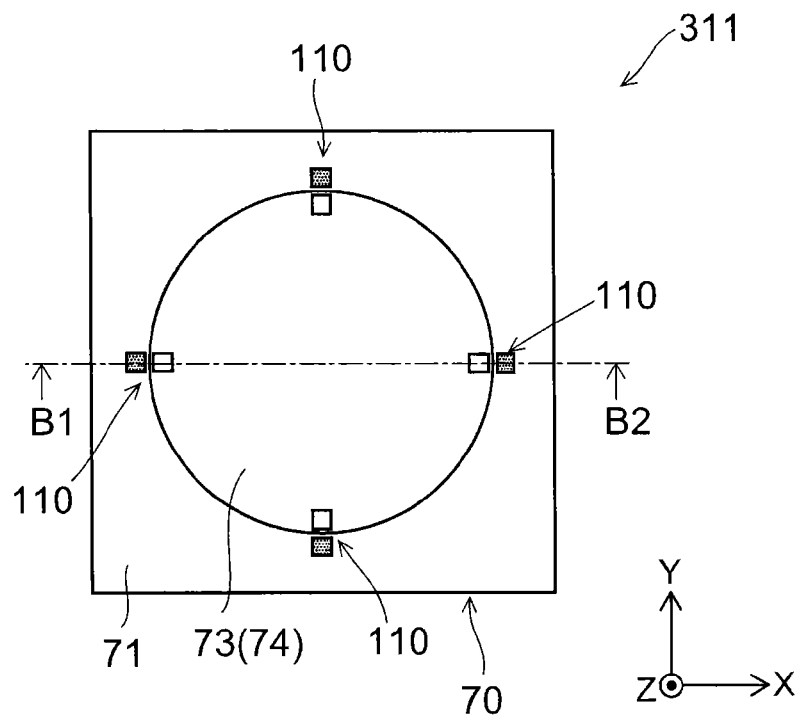
FIG. 33A and FIG. 33B are schematic views illustrating a pressure sensor according to a second embodiment.
Figure 33B:
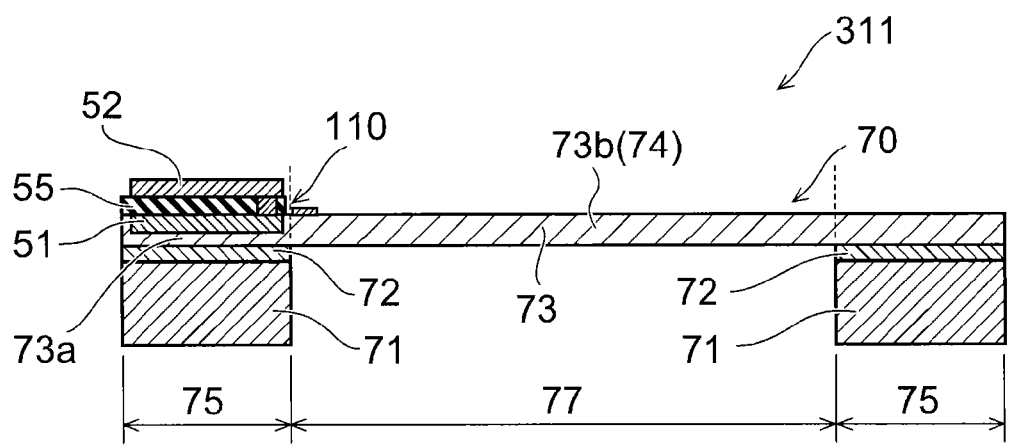

FIG. 33A and FIG. 33B are schematic views illustrating a pressure sensor according to a second embodiment.

FIG. 33A is a schematic plan view. FIG. 33B is a cross-sectional view along a line B1-B2 shown in FIG. 33A. In FIG. 33A and FIG. 33B, some layers are partially omitted for easily seeing the drawings.

As shown in FIG. 33A and FIG. 33B, a pressure sensor 311 according to the embodiment includes a substrate 70, a first electrode 51, a second electrode 52, an insulator 55, and a stacked body 110. The substrate 70 is the same as the substrate 70 described related to the first embodiment. The first electrode 51 is the same as the first electrode 51 described related to the first embodiment. The second electrode 52 is the same as the second electrode 52 described related to the first embodiment. The insulator 55 is the same as the insulator 55 described related to the first embodiment.

A part of the stacked body 110 is provided between the first electrode 51 and the second electrode 52. The other part of the stacked body 110 is provided on a second region 77. The stacked body 110 functions as a strain sensing device whose electrical resistance changes according to strain caused on the second region 77 (a diaphragm 74).

Figure 34A:
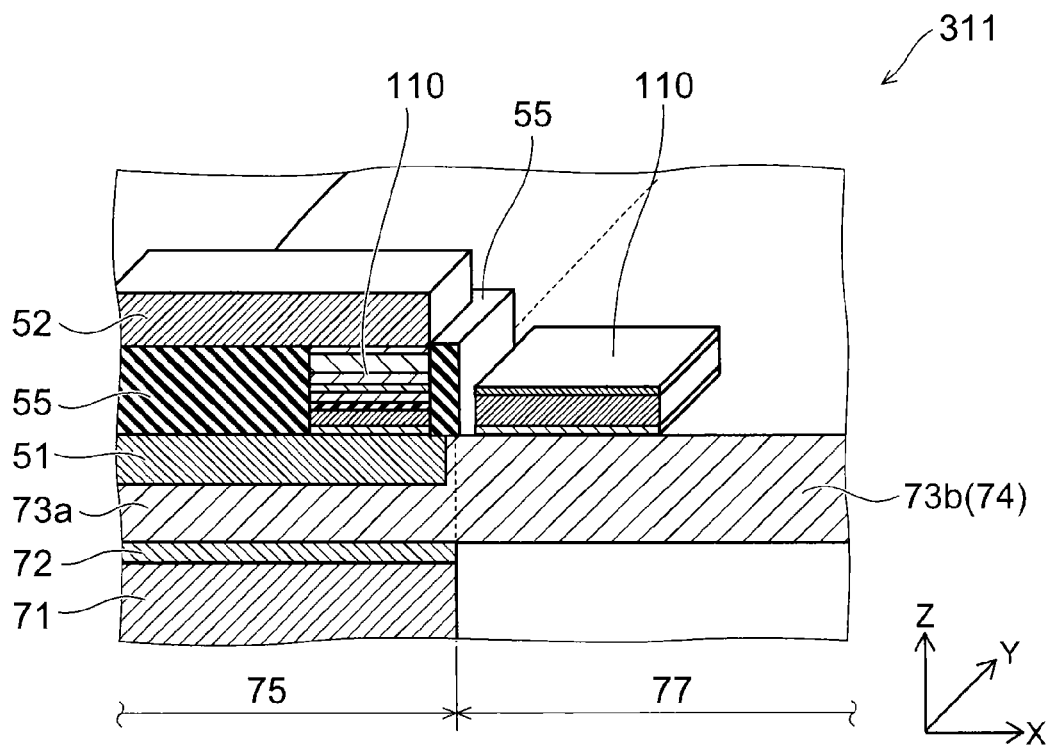
FIG. 34A and FIG. 34B are schematic views illustrating a part of the pressure sensor according to the second embodiment.
Figure 34B:
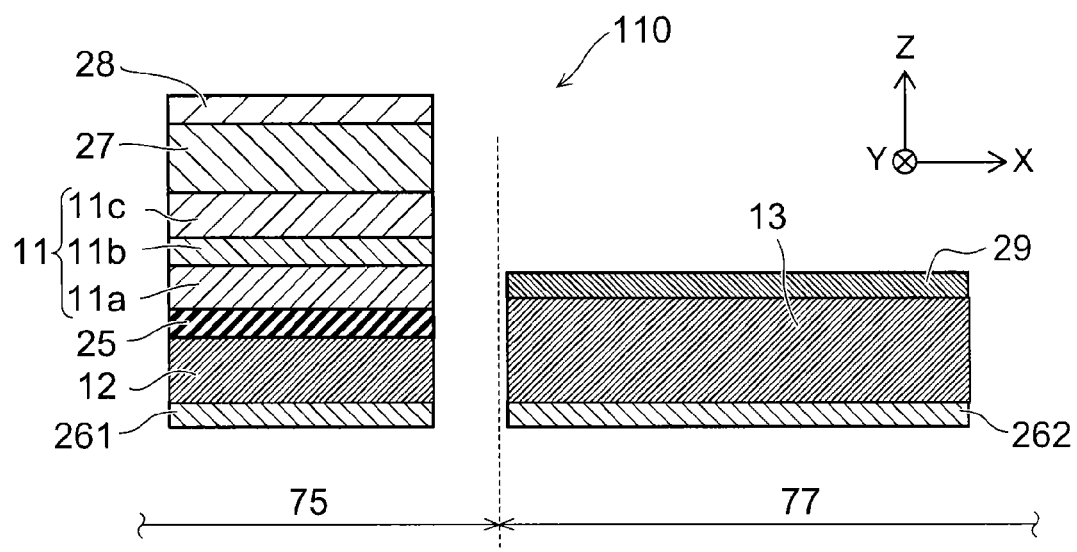

FIG. 34A and FIG. 34B are schematic views illustrating a part of the pressure sensor according to the second embodiment.

FIG. 34A is a perspective view schematically illustrating a part of the pressure sensor according to the second embodiment. FIG. 34B is a schematic plan view illustrating the stacked body provided on the pressure sensor according to the second embodiment.

The stacked body 110 includes a first magnetic layer 11, a second magnetic layer 12, and a spacer layer 25. The first magnetic layer 11 is provided between the first electrode 51 and the second electrode 52. The second magnetic layer 12 is provided between the first electrode 51 and the first magnetic layer 11 or between the first magnetic layer 11 and the second electrode 52. The magnetization direction of the second magnetic layer 12 is variable. The spacer layer 25 is provided between the first magnetic layer 11 and the second magnetic layer 12 in the stacking direction of layers from the first electrode 51 to the second electrode 52.

In the example, the stacked body 110 includes the first magnetic layer 11, the second magnetic layer 12, a third magnetic layer 13, the spacer layer 25, a first under layer 261, a second under layer 262, a pinning layer 27, a first cap layer 28, and a second cap layer 29. The first magnetic layer 11 includes a first reference layer 11a, a magnetic coupling layer 11b, and a second reference layer 11c. However, the first magnetic layer 11 may be formed of a single reference layer.

On a first region 75 in the example, the first under layer 261 is provided between the first electrode 51 and the second electrode 52. The second magnetic layer 12 is provided between the first under layer 261 and the second electrode 52. The spacer layer 25 is provided between the second magnetic layer 12 and the second electrode 52. The first reference layer 11a is provided between the spacer layer 25 and the second electrode 52. The magnetic coupling layer 11b is provided between the first reference layer 11a and the second electrode 52. The second reference layer 11c is provided between the magnetic coupling layer 11b and the second electrode 52. The pinning layer 27 is provided between the second reference layer 11c and the second electrode 52. The first cap layer 28 is provided between the pinning layer 27 and the second electrode 52.

In the example, the second cap layer 29 is provided on the second region 77. The second under layer 262 is provided between the diaphragm 74 and the second cap layer 29. The third magnetic layer 13 is provided between the second under layer 262 and the second cap layer 29.

In the example, the third magnetic layer 13 is formed as a magnetic layer separately from the second magnetic layer 12. The third magnetic layer 13 is provided apart from the second magnetic layer 12 in the direction crossing the stacking direction of layers (in the X-axis direction in the example). The second under layer 262 is formed as a under layer separately from the first under layer 261. The second under layer 262 is provided apart from the first under layer 261 in the direction crossing the stacking direction of layers (in the X-axis direction in the example).

Alternatively, the third magnetic layer 13 may contact the second magnetic layer 12 in the direction crossing the stacking direction of layers (in the X-axis direction in the example). The second under layer 262 may contact the first under layer 261 in the direction crossing the stacking direction of layers (in the X-axis direction in the example).

In any cases, in the direction crossing the stacking direction of layers (in the X-axis direction in the example), the third magnetic layer 13 includes a portion overlapping with the second magnetic layer 12. In other words, the third magnetic layer 13 is not apart from the second magnetic layer 12 in the stacking direction of layers.

In the following, the case will be described where the third magnetic layer 13 is provided apart from the second magnetic layer 12 in the direction crossing the stacking direction of layers (in the X-axis direction in the example). In the following, the case will be described where the second under layer 262 is provided apart from the first under layer 261 in the direction crossing the stacking direction of layers (in the X-axis direction in the example).

The other structures of the stacked body 110 are the same as the structures of the stacked body 10 according to the first embodiment. In other words, the disposition and functions of the other layers are the same as the disposition and functions of the layers described related to the stacked body 10 according to the first embodiment.

In the following, an exemplary operation of the pressure sensor according to the embodiment will be described.

Figure 35A:
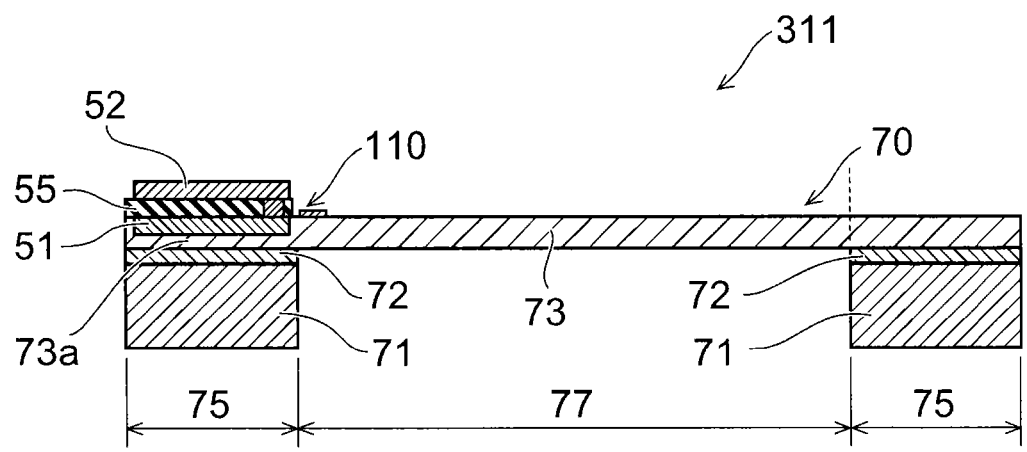
FIG. 35A and FIG. 35B are schematic views illustrating the operation of the pressure sensor according to the embodiment.
Figure 35B:
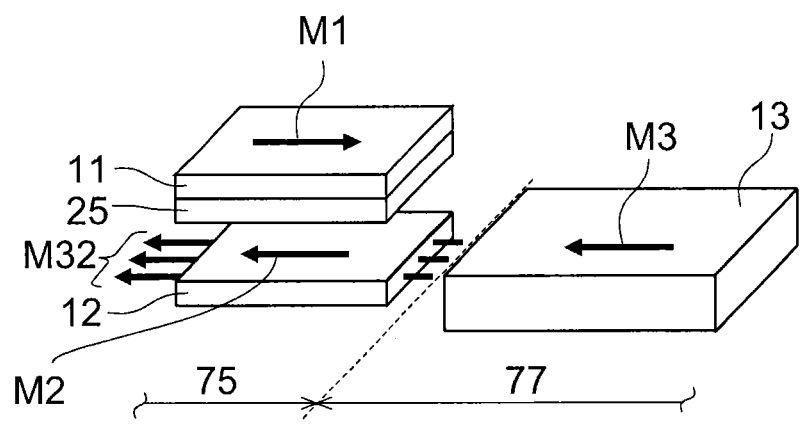

FIG. 35A and FIG. 35B are schematic views illustrating the operation of the pressure sensor according to the embodiment.

Figure 36A:
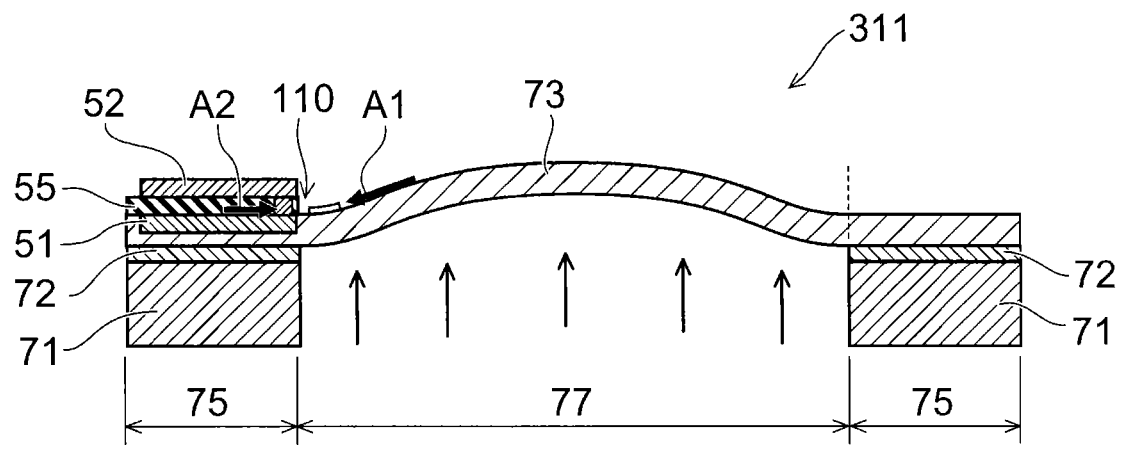
FIG. 36A and FIG. 36B are schematic views illustrating the operation of the pressure sensor according to the embodiment.
Figure 36B:
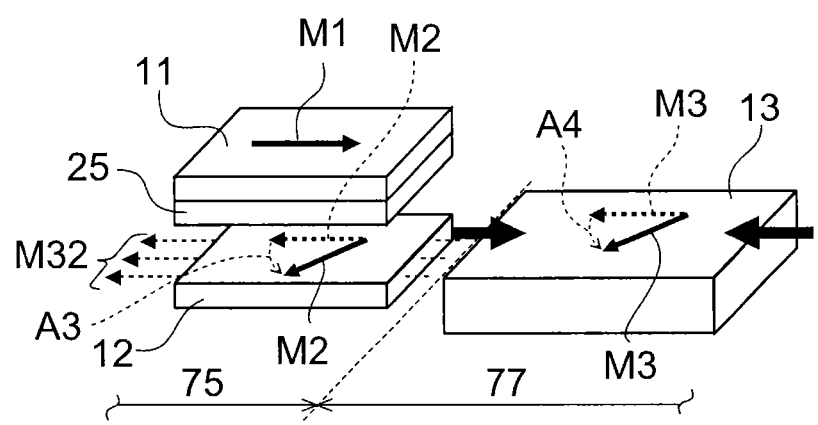

FIG. 36A and FIG. 36B are schematic views illustrating the operation of the pressure sensor according to the embodiment.

FIG. 35A is a schematic plan view illustrating the pressure sensor in the state in which no external pressure is applied. FIG. 35B is a perspective view schematically illustrating magnetization directions in the state in which no external pressure is applied.

FIG. 36A is a schematic plan view illustrating the pressure sensor in the state in which an external pressure is applied from the back surface (the lower surface) of the diaphragm. FIG. 36B is a perspective view schematically illustrating magnetization directions in the state in which an external pressure is applied from the back surface (the lower surface) of the diaphragm.

As described related to FIG. 4A and FIG. 4B, on the edge of the diaphragm 74, compressive strain occurs on the surface of the diaphragm 74 in the radial direction.

When the compressive strain occurs, compressive strain occurs on the third magnetic layer 13. Thus, in the case where the third magnetic layer 13 is formed of a ferromagnetic body having a positive magnetostriction constant, "the inverse magnetostrictive effect" acts on the magnetization of the third magnetic layer 13 in such a way that an angle between the magnetization and the direction to which compressive strain is applied is increased. Thus, as an arrow A4 shown in FIG. 36B, a relative angle between a magnetization M3 of the third magnetic layer and a magnetization M1 of the first magnetic layer is changed from an angle of 180° in the state in which the diaphragm 74 is not deformed.

On the other hand, no strain occurs on the second magnetic layer 12. Here, as shown in FIG. 36B, a leakage magnetic field M32 from the third magnetic layer 13 is applied to the second magnetic layer 12. Thus, a magnetization M2 of the second magnetic layer 12 is changed together with a change in the magnetization M3 of the third magnetic layer 13. In other words, the direction of the magnetization M2 of the second magnetic layer 12 is changed according to the direction of the magnetization M3 of the third magnetic layer 13. Namely, a change in the magnetization M3 of the third magnetic layer 13 provided on the second region 77 where strain occurs can be transduced to the magnetization M2 of the second magnetic layer 12 provided on the first region 75.

The transduction of a change in a physical quantity caused by strain between the third magnetic layer 13 on the second region 77 and the second magnetic layer 12 on the first region 75 does not exist in a silicon (Si) piezoresistive change element. The transduction is a phenomenon in a strain sensing device using a magnetic film. Also on the first region 75 where no strain occurs, an external pressure can cause a change in the magnetization M2 of the second magnetic layer. Accordingly, a change in electrical resistance against an external pressure can be obtained.

The other operations of the pressure sensor 311 are the same as the operations of the pressure sensor 310 described related to FIG. 3A to FIG. 7.

In the following, an exemplary configuration of the stacked body according to the embodiment will be described with reference to the drawings.

Figure 37:
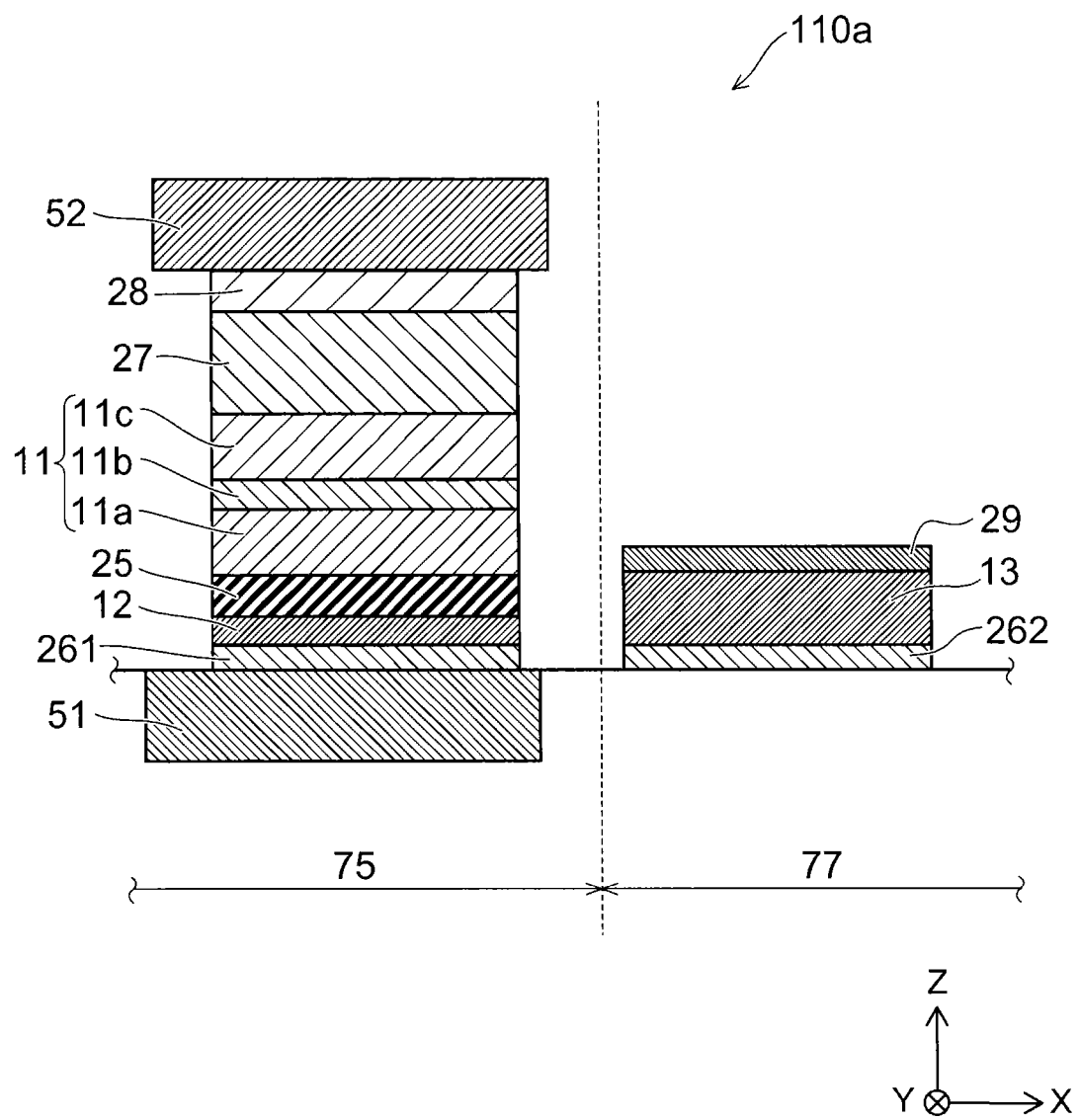
FIG. 37 is a schematic cross-sectional view illustrating a seventeenth stacked body.

FIG. 37 is a schematic cross-sectional view illustrating a seventeenth stacked body.

The structure of a seventeenth stacked body 110a is a top spin-valve structure in which a magnetization free layer is formed below a magnetization fixed layer.

The seventeenth stacked body 110a includes the first magnetic layer 11, the second magnetic layer 12, the third magnetic layer 13, the spacer layer 25, the first under layer 261, the second under layer 262, the pinning layer 27, the first cap layer 28, and the second cap layer 29. The first magnetic layer 11 includes the first reference layer 11a, the magnetic coupling layer 11b, and the second reference layer 11c.

On the first region 75, the first under layer 261 is provided between the first electrode 51 and the second electrode 52. The second magnetic layer 12 is provided between the first under layer 261 and the second electrode 52. The spacer layer 25 is provided between the second magnetic layer 12 and the second electrode 52. The first reference layer 11a is provided between the spacer layer 25 and the second electrode 52. The magnetic coupling layer 11b is provided between the first reference layer 11a and the second electrode 52. The second reference layer 11c is provided between the magnetic coupling layer 11b and the second electrode 52. The pinning layer 27 is provided between the second reference layer 11c and the second electrode 52. The first cap layer 28 is provided between the pinning layer 27 and the second electrode 52.

The second cap layer 29 is provided on the second region 77. The second under layer 262 is provided between the diaphragm 74 and the second cap layer 29. The third magnetic layer 13 is provided between the second under layer 262 and the second cap layer 29.

The third magnetic layer 13 is formed as a magnetic layer separately from the second magnetic layer 12. The third magnetic layer 13 is provided apart from the second magnetic layer 12 in the direction crossing the stacking direction of layers (in the X-axis direction). The second under layer 262 is formed as a under layer separately from the first under layer 261. The second under layer 262 is provided apart from the first under layer 261 in the direction crossing the stacking direction of layers (in the X-axis direction).

Alternatively, the third magnetic layer 13 may contact the second magnetic layer 12 in the direction crossing the stacking direction of layers (in the X-axis direction in the example). The second under layer 262 may contact the first under layer 261 in the direction crossing the stacking direction of layers (in the X-axis direction in the example).

In any cases, in the direction crossing the stacking direction of layers (in the X-axis direction), the third magnetic layer 13 includes a portion overlapping with the second magnetic layer 12. In other words, the third magnetic layer 13 is not apart from the second magnetic layer 12 in the stacking direction of layers. Preferably, the absolute value of the magnetostriction constant of the third magnetic layer 13 is greater than the absolute value of the magnetostriction constant of the second magnetic layer 12.

The seventeenth stacked body 110a has the following configuration, for example.

Silicon is used for the support substrate 71.

Tantalum (Ta)/copper (Cu)/tantalum (Ta) is used for the first electrode 51. The thickness of tantalum formed below copper is 10 nm. The thickness of copper is 200 nm. The thickness of tantalum formed on copper is 30 nm.

A Ta layer having a thickness of 5 nm is used for the first under layer 261.

A $Co_{40}Fe_{40}B_{20}$ layer having a thickness of 4 nm is used for the second magnetic layer 12.

An MgO layer having a thickness of 1.5 nm is used for the spacer layer 25.

A $Co_{40}Fe_{40}B_{20}$ layer having a thickness of 3 nm is used for the first reference layer 11a.

A Ru layer having a thickness of 0.9 nm is used for the magnetic coupling layer 11b.

A $Co_{75}Fe_{25}$ layer having a thickness of 2.5 nm is used for the second reference layer 11c.

An IrMn layer having a thickness of 7 nm is used for the pinning layer 27.

Ta/Ru is used for the first cap layer 28. The thickness of a Ta layer is 1 nm. The thickness of a Ru layer is 5 nm.

Tantalum (Ta)/copper (Cu)/tantalum (Ta) is used for the second electrode 52. The thickness of tantalum formed below copper is 10 nm. The thickness of copper is 200 nm. The thickness of tantalum formed on copper is 30 nm.

Ta/Cu is used for the second under layer 262. The thickness of Ta is 1 nm. The thickness of Cu is 2 nm.

A $Fe_{80}Ga_{20}$ layer having a thickness of 10 nm is used for the third magnetic layer 13.

Ta/Ru is used for the second cap layer 29. The thickness of Ta is 2 nm. The thickness of Ru is 5 nm.

The structure and material of the first electrode 51 described related to the first stacked body 10a can be used for the first electrode 51. The structure and material of the second electrode 52 described related to the first stacked body 10a can be used for the second electrode 52.

The structure and material of the under layer 26 described related to the first stacked body 10a can be used for the first under layer 261. The structure and material of the under layer 26 described related to the first stacked body 10a can be used for the second under layer 262.

A stacked structure of a first buffer layer (not shown) and a first seed layer (not shown) is used for the first under layer 261, for example. A Ta layer having a thickness of 5 nm is used for the first buffer layer, for example.

A stacked structure of a second buffer layer (not shown) and a second seed layer (not shown) is used for the second under layer 262. A Ta layer having a thickness of 1 nm is used for the second buffer layer, for example.

The second magnetic layer 12 is a magnetization free layer. The third magnetic layer 13 is a magnetization free layer. A ferromagnetic material is used for the second magnetic layer 12 and the third magnetic layer 13.

The third magnetic layer 13 obtains a change in magnetization caused by strain on the diaphragm 74 where strain occurs due to "the inverse magnetostrictive effect". The third magnetic layer 13 contributes to the responsiveness of magnetization to strain. Thus, desirably, a ferromagnetic material that higher magnetic strain occurs is used for the third magnetic layer 13.

The second magnetic layer 12 is provided as contacting the spacer layer 25, and contributes to the change rate of the electrical resistance to the magnetization response due to "the magnetoresistive effect". Thus, desirably, a ferromagnetic material that exhibits a higher magnetoresistive effect is used for the second magnetic layer. A ferromagnetic material that higher magnetic strain occurs is not always matched with a ferromagnetic material that exhibits a higher magnetoresistive effect. Thus, materials appropriate to the layers are used. Desirably, a ferromagnetic body whose absolute value of the magnetostriction constant is greater than the absolute value of the magnetostriction constant of the second magnetic layer 12 is used for the third magnetic layer 13.

The structure and material of the third magnetic layer 13 described related to the first stacked body 10a can be used for the third magnetic layer 13.

A $Co_{40}Fe_{40}B_{20}$ layer having a thickness of 4 nm is used for the second magnetic layer 12, for example. More specifically, a $(Co_xFe_{100-x})_{100-y}B_y$ alloy (x=0% to 100%, y=0% to 30%) is used for the second magnetic layer 12. In the case where an amorphous alloy of $(Co_xFe_{100-x})_{100-y}B_y$ is used for the second magnetic layer 12, variations between elements caused by crystal grains can be suppressed even though the size of the seventeenth stacked body 110a is reduced, for example. In the case where an amorphous alloy of $(Co_xFe_{100-x})_{100-y}B_y$ is used for the second magnetic layer 12, the second reference layer 11c can be made a flatter film. Therefore, a layer formed on the second reference layer 11c (a tunnel insulating layer (not shown), for example) can be flattened. The flattening of the tunnel insulating layer can reduce the defect density of the tunnel insulating layer. Thus, a greater MR change rate is obtained with a lower sheet resistivity. For example, in the case where MgO is used for the material of the tunnel insulating layer, an amorphous alloy of $(Co_xFe_{100-x})_{100-y}B_y$ is used to enhance the (100) orientation of the MgO layer formed on the tunnel insulating layer. The (100) orientation of the MgO layer is made enhanced, so that a greater MR change rate is obtained. A $(Co_xFe_{100-x})_{100-y}B_y$ alloy is crystallized in annealing as the (100) plane of the MgO layer is used as a template. Therefore, an excellent crystal conformation is obtained between MgO and a $(Co_xFe_{100-x})_{100-y}B_y$ alloy. An excellent crystal conformation is obtained, so that a greater MR change rate is obtained.

A Fe—Co alloy, for example, may be used for the second magnetic layer 12, other than a Co—Fe—B alloy.

When the thickness of the second magnetic layer 12 is thicker, a greater MR change rate is obtained. In order to obtain a larger fixed magnetic field, preferably, the thickness of the second magnetic layer 12 is thinner. The tradeoff relationship exists between the MR change rate and the fixed magnetic field in the thickness of the second magnetic layer 12. In the case where a Co—Fe—B alloy is used for the second magnetic layer 12, preferably, the thickness of the second magnetic layer 12 is 1.5 nm or more and 5 nm or less. More preferably, the thickness of the second magnetic layer 12 is 2.0 nm or more and 4 nm or less.

A $Co_{90}Fe_{10}$ alloy in the fcc structure or Co or a Co alloy in the hcp structure may be used for the second magnetic layer 12, in addition to the materials described above. At least one selected from a group consisting of Co, Fe, and Ni is used for the second magnetic layer 12. An alloy including at least one material selected from these materials is used for the second magnetic layer 12. A FeCo alloy material in the bcc structure, a Co alloy including 50% or more of cobalt composition, or a material including 50% or more of Ni composition is used for the second magnetic layer 12, for example, so that a greater MR change rate is obtained. A layer of a Heusler magnetic alloy such as $Co_2MnGe$, $Co_2FeGe$, $Co_2MnSi$, $Co_2FeSi$, $Co_2MnAl$, $Co_2FeAl$, $Co_2MnGa_{0.5}Ge_{0.5}$, and $Co_2FeGa_{0.5}Ge_{0.5}$ may be used for the second magnetic layer 12.

The structure and material of the spacer layer 25 described related to the first stacked body 10a can be used for the spacer layer 25.

The structure and material of the first reference layer 11a described related to the first stacked body 10a can be used for the first reference layer 11a. A $Co_{40}Fe_{40}B_{20}$ layer having a thickness of 4 nm is used for the first reference layer 11a, for example.

The structure and material of the magnetic coupling layer 11b described related to the first stacked body 10a can be used for the magnetic coupling layer 11b.

The structure and material of the second reference layer 11c described related to the first stacked body 10a can be used for the second reference layer 11c.

The structure and material of the pinning layer 27 described related to the first stacked body 10a can be used for the pinning layer 27.

The structure and material of the first cap layer 28 described related to the first stacked body 10a can be used for the first cap layer 28. The structure and material of the first cap layer 28 described related to the first stacked body 10a can be used for the second cap layer 29.

Figure 38:
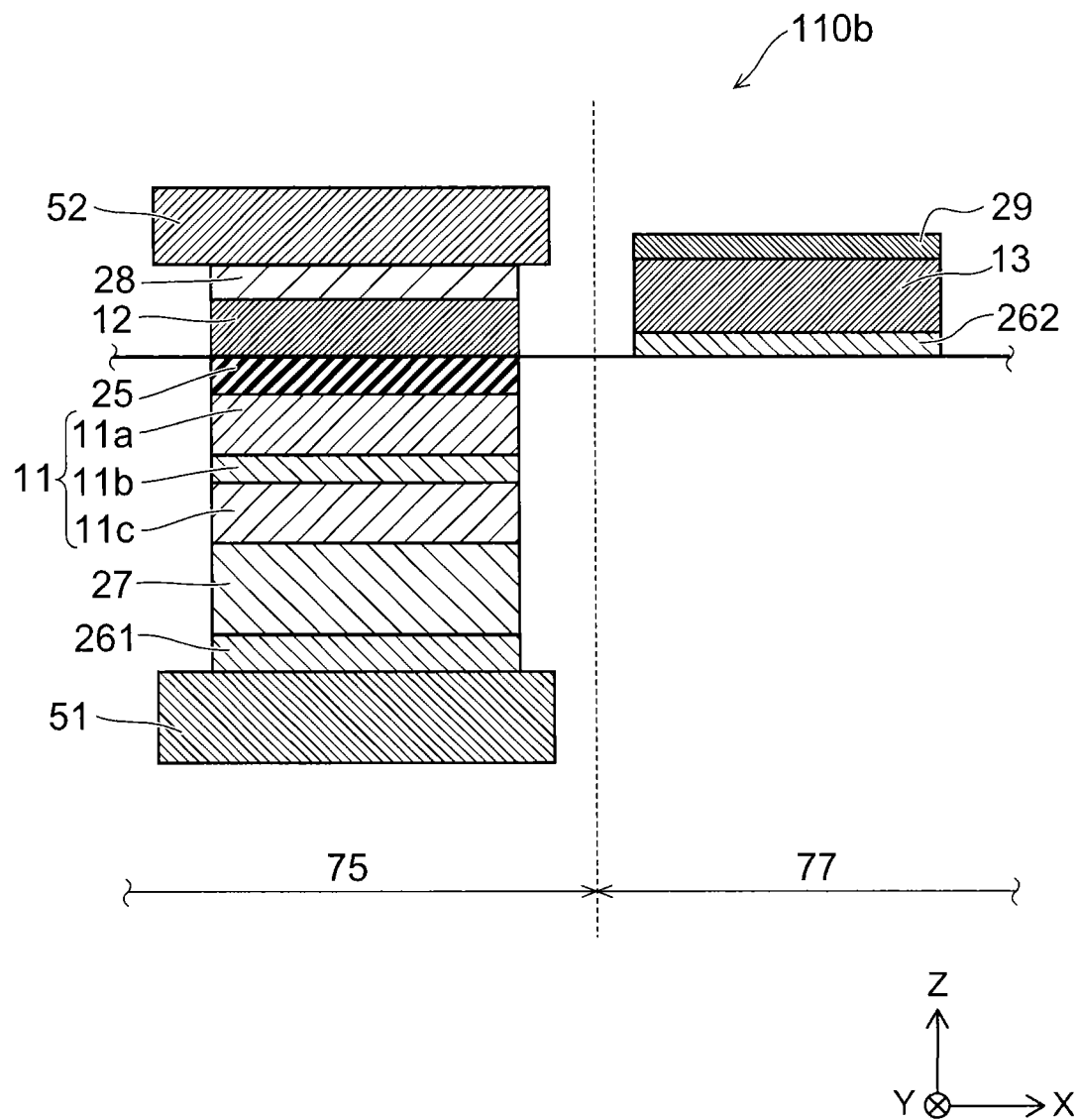
FIG. 38 is a schematic cross-sectional view illustrating an eighteenth stacked body.

FIG. 38 is a schematic cross-sectional view illustrating an eighteenth stacked body.

The structure of an eighteenth stacked body 110b is a bottom spin-valve structure in which a magnetization free layer is formed above a magnetization fixed layer.

The eighteenth stacked body 110b includes the first magnetic layer 11, the second magnetic layer 12, the third magnetic layer 13, the spacer layer 25, the first under layer 261, the second under layer 262, the pinning layer 27, the first cap layer 28, and the second cap layer 29. The first magnetic layer 11 includes the first reference layer 11a, the magnetic coupling layer 11b, and the second reference layer 11c.

On the first region 75, the first under layer 261 is provided between the first electrode 51 and the second electrode 52. The pinning layer 27 is provided between the first under layer 261 and the second electrode 52. The second reference layer 11c is provided between the pinning layer 27 and the second electrode 52. The magnetic coupling layer 11b is provided between the second reference layer 11c and the second electrode 52. The first reference layer 11a is provided between the magnetic coupling layer 11b and the second electrode 52. The spacer layer 25 is provided between the first reference layer 11a and the second electrode 52. The second magnetic layer 12 is provided between the spacer layer 25 and the second electrode 52. The first cap layer 28 is provided between the second magnetic layer 12 and the second electrode 52.

The first under layer 261, the pinning layer 27, the first magnetic layer 11, and the spacer layer 25 are filled on the first region 75.

The second cap layer 29 is provided on the second region 77. The second under layer 262 is provided between the diaphragm 74 and the second cap layer 29. The third magnetic layer 13 is provided between the second under layer 262 and the second cap layer 29.

The third magnetic layer 13 is formed as a magnetic layer separately from the second magnetic layer 12. The third magnetic layer 13 is provided apart from the second magnetic layer 12 in the direction crossing the stacking direction of layers (in the X-axis direction). The second under layer 262 is formed as a under layer separately from the first under layer 261. The second under layer 262 is provided apart from the first under layer 261 in the direction crossing the stacking direction of layers (in the X-axis direction).

Alternatively, the third magnetic layer 13 may contact the second magnetic layer 12 in the direction crossing the stacking direction of layers (in the X-axis direction in the example). The second under layer 262 may contact the first under layer 261 in the direction crossing the stacking direction of layers (in the X-axis direction in the example).

In any cases, in the direction crossing the stacking direction of layers (in the X-axis direction), the third magnetic layer 13 includes a portion overlapping with the second magnetic layer 12. In other words, the third magnetic layer 13 is not apart from the second magnetic layer 12 in the stacking direction of layers. Preferably, the absolute value of the magnetostriction constant of the third magnetic layer 13 is greater than the absolute value of the magnetostriction constant of the second magnetic layer 12.

The structure and material of the first under layer 261 described related to the seventeenth stacked body 110a can be used for the first under layer 261. The structure and material of the pinning layer 27 described related to the seventeenth stacked body 110a can be used for the pinning layer 27. The structure and material of the second reference layer 11c described related to the seventeenth stacked body 110a can be used for the second reference layer 11c. The structure and material of the magnetic coupling layer 11b described related to the seventeenth stacked body 110a can be used for the magnetic coupling layer 11b. The structure and material of the first reference layer 11a described related to the seventeenth stacked body 110a can be used for the first reference layer 11a. The structure and material of the spacer layer 25 described related to the seventeenth stacked body 110a can be used for the spacer layer 25. The structure and material of the second magnetic layer 12 described related to the seventeenth stacked body 110a can be used for the second magnetic layer 12. The structure and material of the first cap layer 28 described related to the seventeenth stacked body 110a can be used for the first cap layer 28. The structure and material of the second under layer 262 described related to the seventeenth stacked body 110a can be used for the second under layer 262. The structure and material of the third magnetic layer 13 described related to the seventeenth stacked body 110a can be used for the third magnetic layer 13. The structure and material of the second cap layer 29 described related to the seventeenth stacked body 110a can be used for the second cap layer 29.

Figure 39:
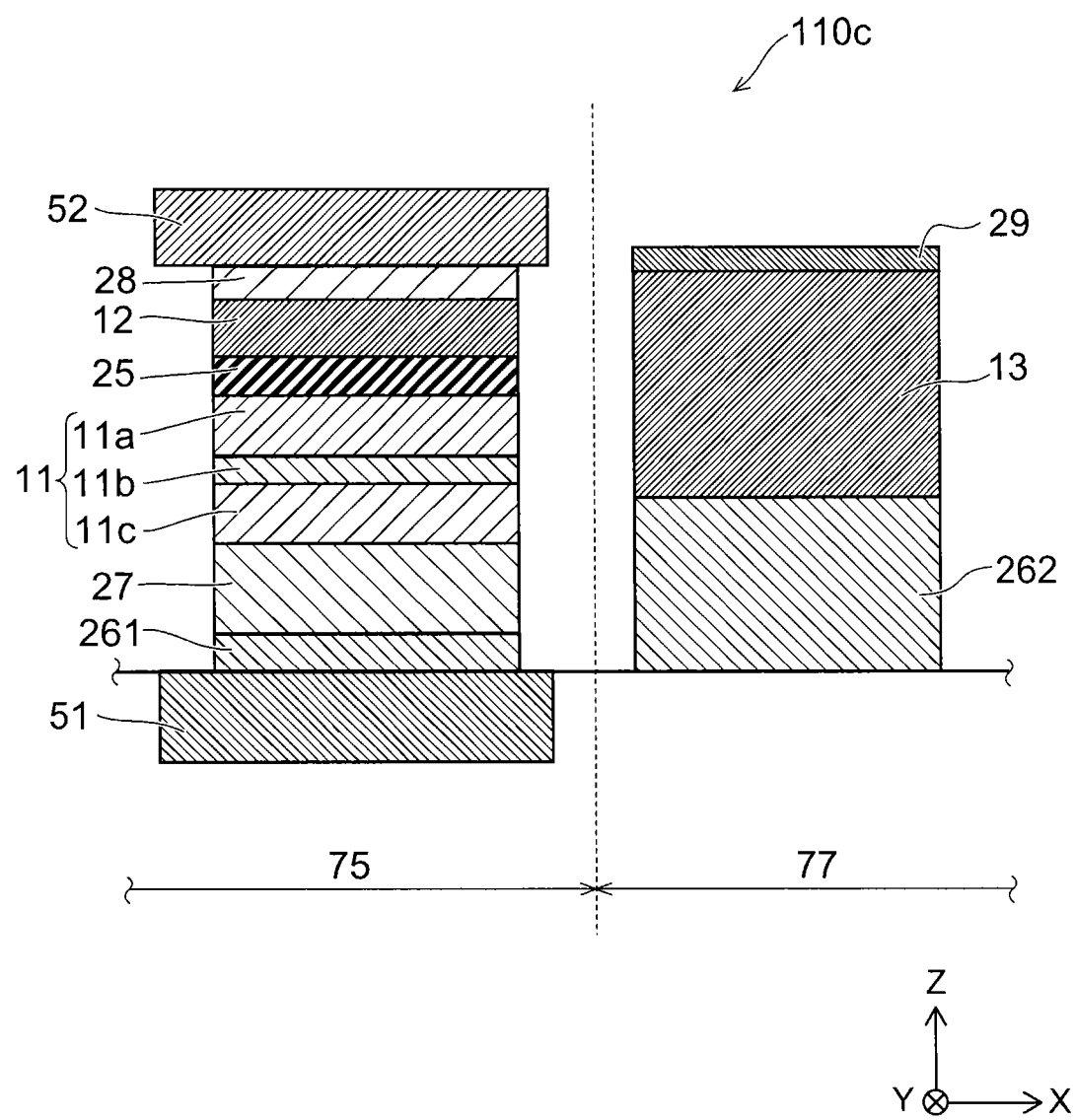
FIG. 39 is a schematic cross-sectional view illustrating a nineteenth stacked body.

FIG. 39 is a schematic cross-sectional view illustrating a nineteenth stacked body.

The structure of a nineteenth stacked body 110c is a bottom spin-valve structure in which a magnetization free layer is formed above a magnetization fixed layer.

As compared with the eighteenth stacked body 110b shown in FIG. 38, in the nineteenth stacked body 110c shown in FIG. 39, the first under layer 261, the pinning layer 27, and the first magnetic layer 11 are provided on the first region 75. The configurations of the other layers are the same as the configurations of the layers of the eighteenth stacked body 110b.

The structure and material of the first under layer 261 described related to the seventeenth stacked body 110a can be used for the first under layer 261. The structure and material of the pinning layer 27 described related to the seventeenth stacked body 110a can be used for the pinning layer 27. The structure and material of the second reference layer 11c described related to the seventeenth stacked body 110a can be used for the second reference layer 11c. The structure and material of the magnetic coupling layer 11b described related to the seventeenth stacked body 110a can be used for the magnetic coupling layer 11b. The structure and material of the first reference layer 11a described related to the seventeenth stacked body 110a can be used for the first reference layer 11a. The structure and material of the spacer layer 25 described related to the seventeenth stacked body 110a can be used for the spacer layer 25. The structure and material of the second magnetic layer 12 described related to the seventeenth stacked body 110a can be used for the second magnetic layer 12. The structure and material of the first cap layer 28 described related to the seventeenth stacked body 110a can be used for the first cap layer 28. The structure and material of the second under layer 262 described related to the seventeenth stacked body 110a can be used for the second under layer 262. The structure and material of the third magnetic layer 13 described related to the seventeenth stacked body 110a can be used for the third magnetic layer 13. The structure and material of the second cap layer 29 described related to the seventeenth stacked body 110a can be used for the second cap layer 29.

In the direction crossing the stacking direction of layers (in the X-axis direction), the third magnetic layer 13 includes a portion overlapping with the second magnetic layer 12. In other words, the third magnetic layer 13 is not apart from the second magnetic layer 12 in the stacking direction of layers. Desirably, the third magnetic layer 13 is provided on the same location (the same height) as the location (the height) of the second magnetic layer 12 in the stacking direction of layers.

Ta/Cu is used for the second under layer 262, for example. The thickness of Ta is 10 nm. The thickness of Cu is 10 nm. A $Fe_{80}Ga_{20}$ layer having a thickness of 20 nm is used for the third magnetic layer 13, for example. Ta/Ru is used for the second cap layer 29, for example. The thickness of Ta is 2 nm. The thickness of Ru is 5 nm.

Figure 40:
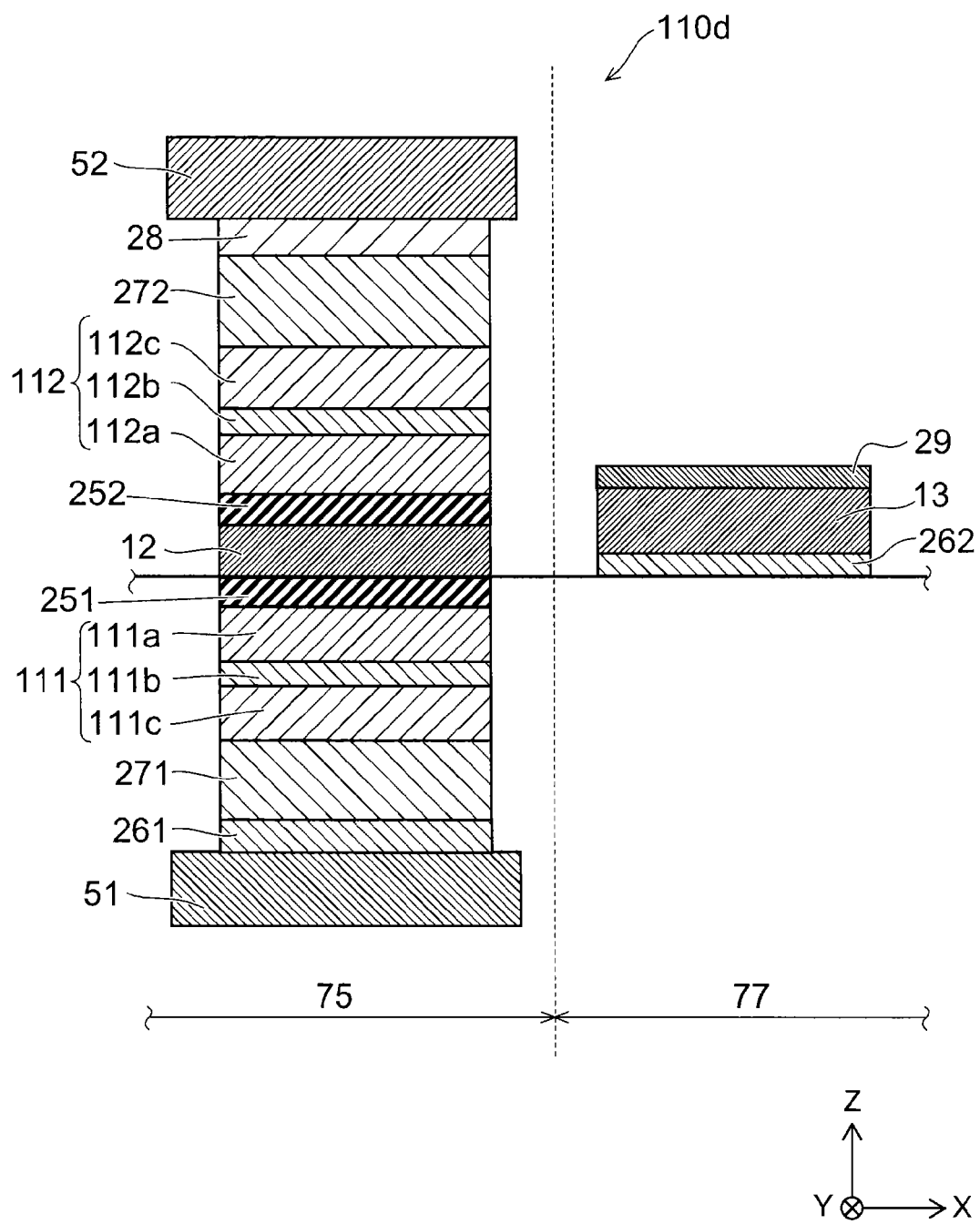
FIG. 40 is a schematic cross-sectional view illustrating a twentieth stacked body.

FIG. 40 is a schematic cross-sectional view illustrating a twentieth stacked body.

The structure of a twentieth stacked body 110d has a dual spin-valve structure in which a magnetization fixed layer is formed above and below a magnetization free layer. In the case where the structure of the stacked body is a dual spin-valve structure, when a tunnel insulating layer is used for the spacer layer, for example, the insulating layer includes two layers. In the case where a constant voltage is applied to the twentieth stacked body 110d, a voltage applied to each insulating layer is lower than a voltage applied to an insulating layer formed of a single layer. Thus, a higher magnetoresistive effect is obtained at a higher voltage. A higher device current carrying reliability is obtained at a higher voltage.

The twentieth stacked body 110d includes a first magnetic layer 111 of a first stacked layer portion, a first magnetic layer 112 of a second stacked layer portion, the second magnetic layer 12, the third magnetic layer 13, a first spacer layer 251, a second spacer layer 252, the first under layer 261, the second under layer 262, a first pinning layer 271, a second pinning layer 272, the first cap layer 28, and the second cap layer 29. The first magnetic layer 111 of the first stacked layer portion includes the first reference layer 111a of the first stacked layer portion, the magnetic coupling layer 111b of the first stacked layer portion, and the second reference layer 111c of the first stacked layer portion. The first magnetic layer 112 of the second stacked layer portion includes a first reference layer 112a of the second stacked layer portion, a magnetic coupling layer 112b of the second stacked layer portion, and a second reference layer 112c of the second stacked layer portion.

On the first region 75, the first under layer 261 is provided between the first electrode 51 and the second electrode 52. The first pinning layer 271 is provided between the first under layer 261 and the second electrode 52. The second reference layer 111c of the first stacked layer portion is provided between the first pinning layer 271 and the second electrode 52. The magnetic coupling layer 111b of the first stacked layer portion is provided between the second reference layer 111c of the first stacked layer portion and the second electrode 52. The first reference layer 111a of the first stacked layer portion is provided between the magnetic coupling layer 111b of the first stacked layer portion and the second electrode 52. The first spacer layer 251 is provided between the first reference layer 111a of the first stacked layer portion and the second electrode 52. The second magnetic layer 12 is provided between the first spacer layer 251 and the second electrode 52. The second spacer layer 252 is provided between the second magnetic layer 12 and the second electrode 52. The first reference layer 112a of the second stacked layer portion is provided between the second spacer layer 252 and the second electrode 52. The magnetic coupling layer 112b of the second stacked layer portion is provided between the first reference layer 112a of the second stacked layer portion and the second electrode 52. The second reference layer 112c of the second stacked layer portion is provided between the magnetic coupling layer 112b of the second stacked layer portion and the second electrode 52. The second pinning layer 272 is provided between the second reference layer 112c of the second stacked layer portion and the second electrode 52. The first cap layer 28 is provided between the second pinning layer 272 and the second electrode 52.

The first under layer 261, the first pinning layer 271, the first magnetic layer 111 of the first stacked layer portion, and the first spacer layer 251 are filled on the first region 75.

The second cap layer 29 is provided on the second region 77. The second under layer 262 is provided between the diaphragm 74 and the second cap layer 29. The third magnetic layer 13 is provided between the second under layer 262 and the second cap layer 29.

The third magnetic layer 13 is formed as a magnetic layer separately from the second magnetic layer 12. The third magnetic layer 13 is provided apart from the second magnetic layer 12 in the direction crossing the stacking direction of layers (in the X-axis direction). The second under layer 262 is formed as a under layer separately from the first under layer 261. The second under layer 262 is provided apart from the first under layer 261 in the direction crossing the stacking direction of layers (in the X-axis direction).

Alternatively, the third magnetic layer 13 may contact the second magnetic layer 12 in the direction crossing the stacking direction of layers (in the X-axis direction in the example). The second under layer 262 may contact the first under layer 261 in the direction crossing the stacking direction of layers (in the X-axis direction in the example).

In any cases, in the direction crossing the stacking direction of layers (in the X-axis direction), the third magnetic layer 13 includes a portion overlapping with the second magnetic layer 12. In other words, the third magnetic layer 13 is not apart from the second magnetic layer 12 in the stacking direction of layers. Preferably, the absolute value of the magnetostriction constant of the third magnetic layer 13 is greater than the absolute value of the magnetostriction constant of the second magnetic layer 12.

The structure and material of the first under layer 261 described related to the seventeenth stacked body 110a can be used for the first under layer 261. The structure and material of the pinning layer 27 described related to the seventeenth stacked body 110a can be used for the first pinning layer 271. The structure and material of the second reference layer 11c described related to the seventeenth stacked body 110a can be used for the second reference layer 111c of the first stacked layer portion. The structure and material of the magnetic coupling layer 11b described related to the seventeenth stacked body 110a can be used for the magnetic coupling layer 111b of the first stacked layer portion. The structure and material of the first reference layer 11a described related to the seventeenth stacked body 110a can be used for the first reference layer 111a of the first stacked layer portion. The structure and material of the spacer layer 25 described related to the seventeenth stacked body 110a can be used for the first spacer layer 251. The structure and material of the second magnetic layer 12 described related to the seventeenth stacked body 110a can be used for the second magnetic layer 12. The structure and material of the spacer layer 25 described related to the seventeenth stacked body 110a can be used for the second spacer layer 252. The structure and material of the first reference layer 11a described related to the seventeenth stacked body 110a can be used for the first reference layer 112a of the second stacked layer portion. The structure and material of the magnetic coupling layer 11b described related to the seventeenth stacked body 110a can be used for the magnetic coupling layer 112b of the second stacked layer portion. The structure and material of the second reference layer 11c described related to the seventeenth stacked body 110a can be used for the second reference layer 112c of the second stacked layer portion. The structure and material of the pinning layer 27 described related to the seventeenth stacked body 110a can be used for the second pinning layer 272. The structure and material of the first cap layer 28 described related to the seventeenth stacked body 110a can be used for the first cap layer 28. The structure and material of the second under layer 262 described related to the seventeenth stacked body 110a can be used for the second under layer 262. The structure and material of the third magnetic layer 13 described related to the seventeenth stacked body 110a can be used for the third magnetic layer 13. The structure and material of the second cap layer 29 described related to the seventeenth stacked body 110a can be used for the second cap layer 29.

Figure 41:
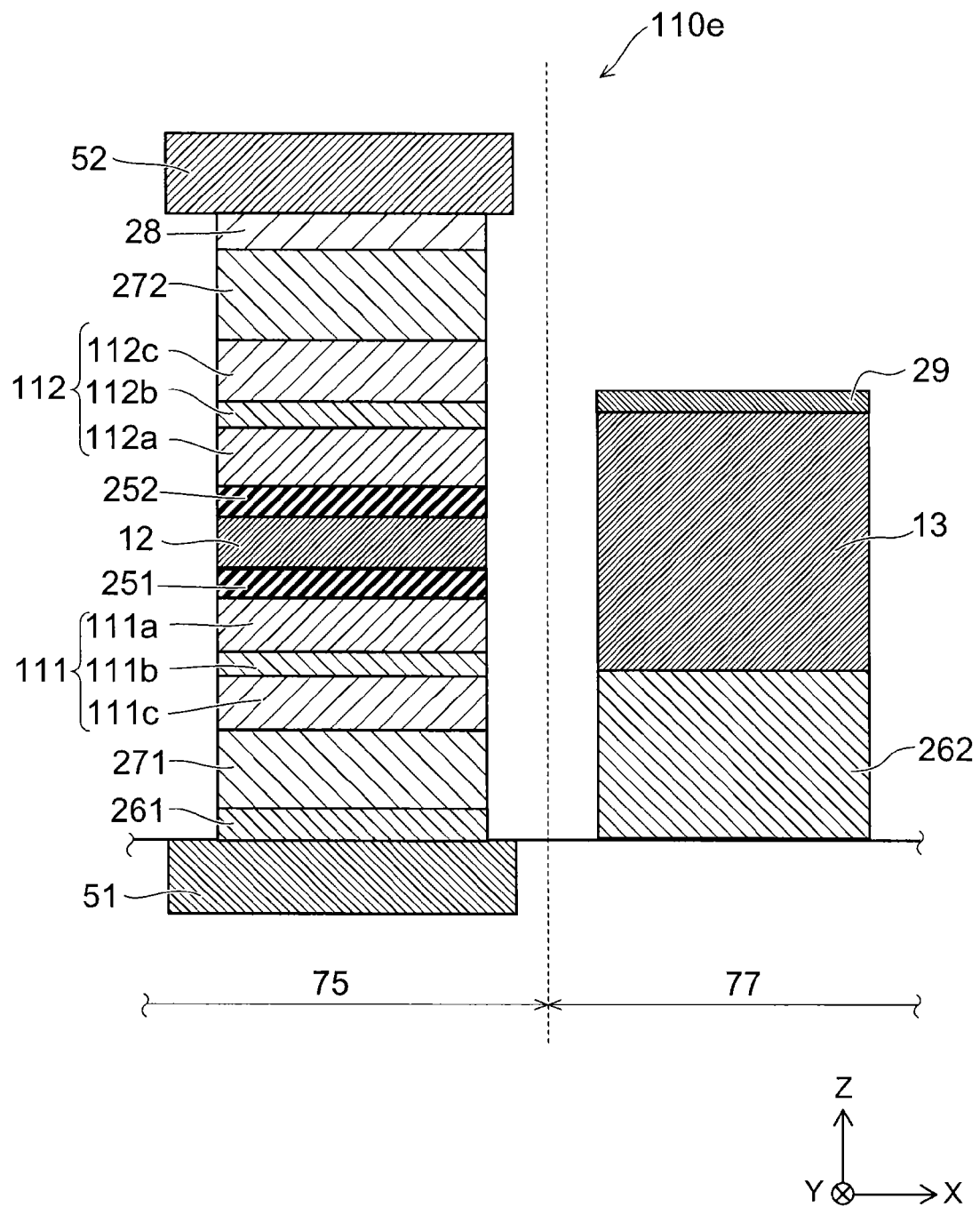
FIG. 41 is a schematic cross-sectional view illustrating a twenty-first stacked body.

FIG. 41 is a schematic cross-sectional view illustrating a twenty-first stacked body.

The structure of a twenty-first stacked body 110e has a dual spin-valve structure in which a magnetization fixed layer is formed above and below a magnetization free layer.

As compared with the twentieth stacked body 110d shown in FIG. 40, in the twenty-first stacked body 110e shown in FIG. 41, the first under layer 261, the first pinning layer 271, the first magnetic layer 111 of the first stacked layer portion, and the first spacer layer 251 are provided on the first region 75. The configurations of the other layers are the same as the configurations of the layers of the twentieth stacked body 110d.

The structure and material of the first under layer 261 described related to the seventeenth stacked body 110a can be used for the first under layer 261. The structure and material of the pinning layer 27 described related to the seventeenth stacked body 110a can be used for the first pinning layer 271. The structure and material of the second reference layer 11c described related to the seventeenth stacked body 110a can be used for the second reference layer 111c of the first stacked layer portion. The structure and material of the magnetic coupling layer 11b described related to the seventeenth stacked body 110a can be used for the magnetic coupling layer 111b of the first stacked layer portion. The structure and material of the first reference layer 11a described related to the seventeenth stacked body 110a can be used for the first reference layer 111a of the first stacked layer portion. The structure and material of the spacer layer 25 described related to the seventeenth stacked body 110a can be used for the first spacer layer 251. The structure and material of the second magnetic layer 12 described related to the seventeenth stacked body 110a can be used for the second magnetic layer 12. The structure and material of the spacer layer 25 described related to the seventeenth stacked body 110a can be used for the second spacer layer 252. The structure and material of the first reference layer 11a described related to the seventeenth stacked body 110a can be used for the first reference layer 112a of the second stacked layer portion. The structure and material of the magnetic coupling layer 11b described related to the seventeenth stacked body 110a can be used for the magnetic coupling layer 112b of the second stacked layer portion. The structure and material of the second reference layer 11c described related to the seventeenth stacked body 110a can be used for the second reference layer 112c of the second stacked layer portion. The structure and material of the pinning layer 27 described related to the seventeenth stacked body 110a can be used for the second pinning layer 272. The structure and material of the first cap layer 28 described related to the seventeenth stacked body 110a can be used for the first cap layer 28. The structure and material of the second under layer 262 described related to the seventeenth stacked body 110a can be used for the second under layer 262. The structure and material of the third magnetic layer 13 described related to the seventeenth stacked body 110a can be used for the third magnetic layer 13. The structure and material of the second cap layer 29 described related to the seventeenth stacked body 110a can be used for the second cap layer 29.

In the direction crossing the stacking direction of layers (in the X-axis direction), the third magnetic layer 13 includes a portion overlapping with the second magnetic layer 12. In other words, the third magnetic layer 13 is not apart from the second magnetic layer 12 in the stacking direction of layers. Desirably, the third magnetic layer 13 is provided at the location (the height) the same as the location (the height) of the second magnetic layer 12 in the stacking direction of layers.

Ta/Cu is used for the second under layer 262, for example. The thickness of Ta is 10 nm. The thickness of Cu is 10 nm. A $Fe_{80}Ga_{20}$ layer having a thickness of 20 nm is used for the third magnetic layer 13, for example. Ta/Ru is used for the second cap layer 29, for example. The thickness of Ta is 2 nm. The thickness of Ru is 5 nm.

Figure 42:
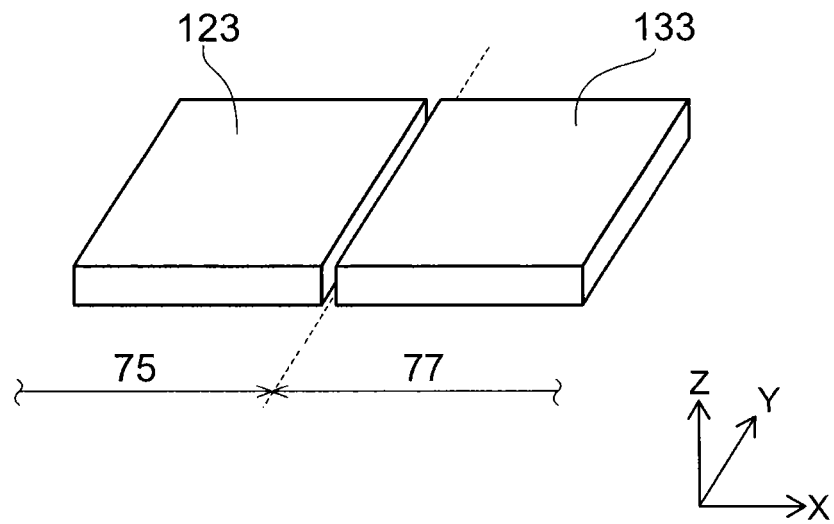
FIG. 42 is a perspective view schematically illustrating a third magnetization free layer according to the embodiment.

FIG. 42 is a perspective view schematically illustrating a third magnetization free layer according to the embodiment.

Figure 43:
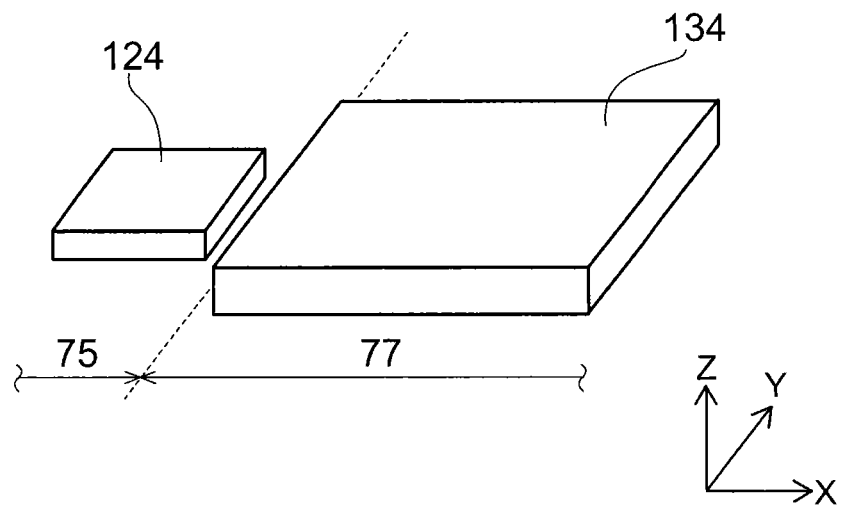
FIG. 43 is a perspective view schematically illustrating a fourth magnetization free layer according to the embodiment.

FIG. 43 is a perspective view schematically illustrating a fourth magnetization free layer according to the embodiment.

In FIG. 42 and FIG. 43, the embodiment will be described as the seventeenth stacked body 110a is taken as an example. In the following, the description related to the seventeenth stacked body 110a is applicable to the eighteenth stacked body 110b, the nineteenth stacked body 110c, the twentieth stacked body 110d, and the twenty-first stacked body 110e.

As shown in FIG. 42, the third magnetization free layer includes a second magnetic layer 123 and a third magnetic layer 133. The second magnetic layer 123 and the third magnetic layer 133 can be in a cube or a rectangular parallelepiped.

As shown in FIG. 43, the fourth magnetization free layer includes a third magnetic layer 134 and a second magnetic layer 124. The volume of the third magnetic layer 134 may be larger than the volume of the second magnetic layer 124.

As shown in FIG. 43, the projected area of the third magnetic layer 134 to the plane orthogonal to the stacking direction of layers may be larger than the projected area of the second magnetic layer 124 to the plane orthogonal to the stacking direction of layers.

As shown in FIG. 43, the thickness of the third magnetic layer 134 (the length in the Z-axis direction) may be thicker than the thickness of the second magnetic layer 124 (the length in the Z-axis direction).

In the seventeenth stacked body 110e, the magnetization free layer where the strain of the diaphragm 74 causes a change in magnetization is the magnetization free layers formed on the second region 77 (the third magnetic layer 133 or the third magnetic layer 134). A leakage magnetic field from the third magnetic layer 133 is applied to the second magnetic layer 123. A leakage magnetic field from the third magnetic layer 134 is applied to the second magnetic layer 124. Thus, the magnetization of the second magnetic layer 123 is changed together with a change in the magnetization of the third magnetic layer 133. In other words, the magnetization direction of the second magnetic layer 123 is changed according to the magnetization direction of the third magnetic layer 133. The magnetization of the second magnetic layer 124 is changed together with a change in the magnetization of the third magnetic layer 134. In other words, the magnetization direction of the second magnetic layer 124 is changed according to the magnetization direction of the third magnetic layer 134.

However, the magnetization of the second magnetic layer 123 is not fully changed together with a change in the magnetization of the third magnetic layer 133. The magnetization of the second magnetic layer 124 is not fully changed together with a change in the magnetization of the third magnetic layer 134. In transducing magnetization, a slight loss occurs.

In the case of the fourth magnetization free layer shown in FIG. 43, the volume of the third magnetic layer 134 is larger than the volume of the second magnetic layer 124. In other words, the volume of the second magnetic layer 124 is smaller than the volume of the third magnetic layer 134. Thus, as compared with the case of the third magnetization free layer shown in FIG. 42, the magnetization of the second magnetic layer 124 is more easily changed together with the magnetization of the third magnetic layer 134. Accordingly, a loss in transducing magnetization can be suppressed at the minimum.

In order to obtain a higher pressure sensitivity, preferably, the structure of the fourth magnetization free layer is more favorable than the structure of the third magnetization free layer.

Figure 44:
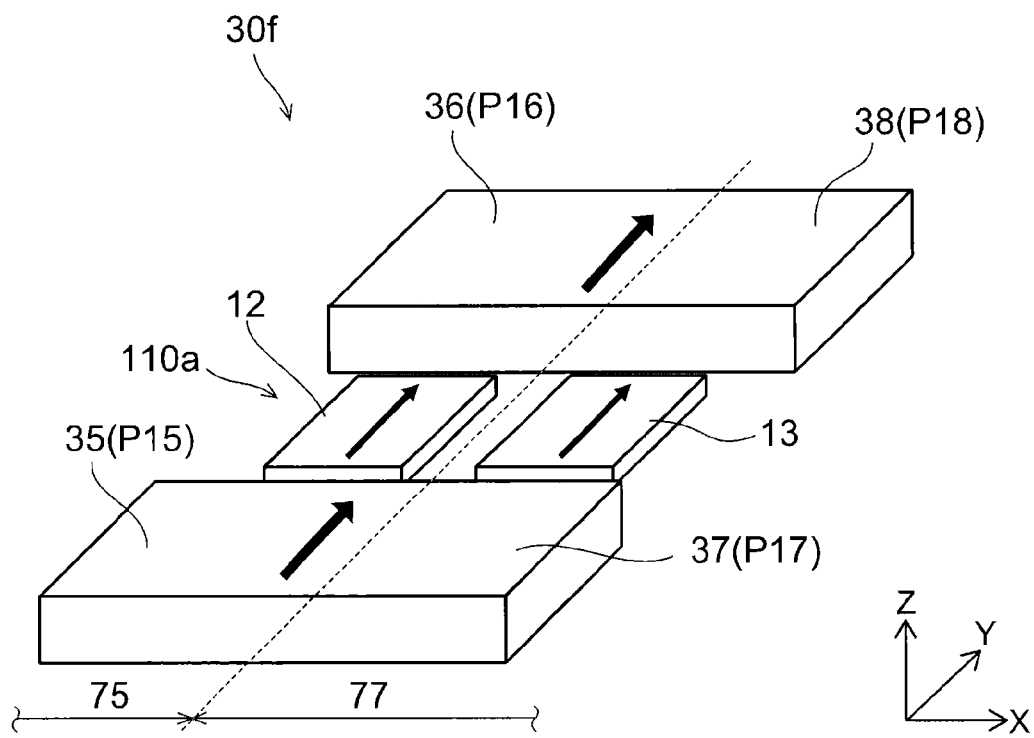
FIG. 44 is a perspective view schematically illustrating a sixth hard bias layer according to the embodiment.

FIG. 44 is a perspective view schematically illustrating a sixth hard bias layer according to the embodiment.

In the following, in FIG. 44 to FIG. 48, the embodiment will be described as the case is taken as an example where the pressure sensor 311 according to the embodiment includes the seventeenth stacked body 110a. In the following, the description related to FIG. 44 to FIG. 48 is applicable to the case where the pressure sensor 311 according to the embodiment includes any one of the eighteenth stacked body 110b to the twenty-first stacked body 110e.

A pressure sensor shown in FIG. 44 includes a sixth hard bias layer 30f. The sixth hard bias layer 30f includes a fifth hard bias 35, a sixth hard bias 36, a seventh hard bias 37, and an eighth hard bias 38. The fifth hard bias 35 is provided on the first region 75. The sixth hard bias 36 is provided on the first region 75. The seventh hard bias 37 is provided on the second region 77. The eighth hard bias 38 is provided on the second region 77.

In the direction crossing the stacking direction of layers (in the Y-axis direction in the example), the second magnetic layer 12 is provided between the fifth hard bias 35 and the sixth hard bias 36. In the direction crossing the stacking direction of layers (in the Y-axis direction in the example), the third magnetic layer 13 is provided between the seventh hard bias 37 and the eighth hard bias 38.

In the example, the fifth hard bias 35 continues with the seventh hard bias 37. For example, the seventh hard bias 37 is formed as a hard bias integrated with the fifth hard bias 35. In this case, the fifth hard bias 35 is a fifth hard bias portion P15 of one hard bias, and is the fifth hard bias portion P15 provided on the first region 75. In this case, the seventh hard bias 37 is a seventh hard bias portion P17 of one hard bias, and is the seventh hard bias portion P17 provided on the second region 77.

Alternatively, the fifth hard bias 35 may be formed as a hard bias separately from the seventh hard bias 37. In this case, the seventh hard bias 37 contacts the fifth hard bias 35 in the direction crossing the stacking direction of layers (in the X-axis direction in the example).

In the example, the sixth hard bias 36 continues with the eighth hard bias 38. For example, the eighth hard bias 38 is formed as a hard bias integrated with the sixth hard bias 36. In this case, the sixth hard bias 36 is a sixth hard bias portion P16 of one hard bias, and is the sixth hard bias portion P16 provided on the first region 75. In this case, the eighth hard bias 38 is an eighth hard bias portion P18 of one hard bias, and is the eighth hard bias portion P18 provided on the second region 77.

Alternatively, the sixth hard bias 36 may be formed as a hard bias separately from the eighth hard bias 38. In this case, the eighth hard bias 38 contacts the sixth hard bias 36 in the direction crossing the stacking direction of layers (in the X-axis direction in the example).

The magnetization of the fifth hard bias 35 is directed to one direction. The magnetization of the sixth hard bias 36 is directed to one direction. The magnetization of the seventh hard bias 37 is directed to one direction. The magnetization of the eighth hard bias 38 is directed to one direction. In the example, the magnetizations of the fifth hard bias 35 to the eighth hard bias 38 are directed to the direction the same as the circumferential direction of the diaphragm 74.

The fifth hard bias 35 directs at least one of the magnetizations of the second magnetic layer 12 and the third magnetic layer 13 to a given direction by the magnetization of the fifth hard bias 35 itself. The sixth hard bias 36 directs at least one of the magnetizations of the second magnetic layer 12 and the third magnetic layer 13 to a given direction by the magnetization of the sixth hard bias 36 itself. The seventh hard bias 37 directs at least one of the magnetizations of the second magnetic layer 12 and the third magnetic layer 13 to a given direction by the magnetization of the seventh hard bias 37 itself. The eighth hard bias 38 directs at least one of the magnetizations of the second magnetic layer 12 and the third magnetic layer 13 to a given direction by the magnetization of the eighth hard bias 38 itself.

Accordingly, in the state in which no pressure is applied to the diaphragm 74, the magnetizations of the second magnetic layer 12 and the third magnetic layer 13 can be directed to a given direction. The magnetizations of the second magnetic layer 12 and the third magnetic layer 13 are biased by the sixth hard bias layer 30$f$, so that the generation of magnetic domains in the inside of the second magnetic layer 12 and the third magnetic layer 13 can be suppressed, and the pressure-electrical resistance characteristics of excellent reproducibility can be obtained.

A hard ferromagnetic material having a relatively high magnetic anisotropy such as CoPt, CoCrPt, and FePt is used for the fifth hard bias 35, for example. Such a material is used for the fifth hard bias 35, other than a hard ferromagnetic material, in which a soft magnetic material such as FeCo and Fe is stacked on an antiferromagnetic layer and the magnetizations are aligned in one direction by exchange coupling. The thickness of the fifth hard bias 35 (the length in the Z-axis direction) is about 5 nm to 50 nm, for example. A material similar to the material of the fifth hard bias 35 is used for the sixth hard bias 36 to the eighth hard bias 38. The thicknesses of the sixth hard bias 36 to the eighth hard bias 38 are almost the same as the thickness of the fifth hard bias 35.

Figure 45:
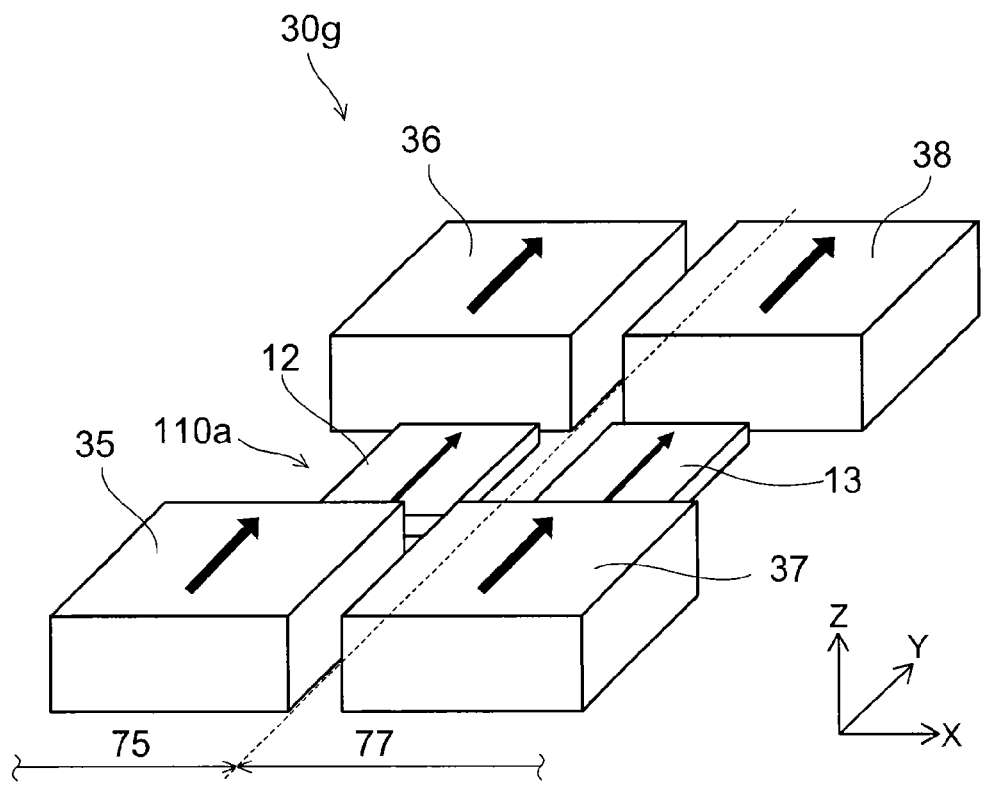
FIG. 45 is a perspective view schematically illustrating a seventh hard bias layer according to the embodiment.

FIG. 45 is a perspective view schematically illustrating a seventh hard bias layer according to the embodiment.

A pressure sensor shown in FIG. 45 includes a seventh hard bias layer 30$g$. The seventh hard bias layer 30$g$ includes the fifth hard bias 35, the sixth hard bias 36, the seventh hard bias 37, and the eighth hard bias 38. The fifth hard bias 35 is provided on the first region 75. The sixth hard bias 36 is provided on the first region 75. The seventh hard bias 37 is provided on the second region 77. The eighth hard bias 38 is provided on the second region 77.

In the example, the fifth hard bias 35 is formed as a hard bias separately from the seventh hard bias 37. The seventh hard bias 37 is provided apart from the fifth hard bias 35 in the direction crossing the stacking direction of layers (in the X-axis direction in the example). The sixth hard bias 36 is formed as a hard bias separately from the eighth hard bias 38. The eighth hard bias 38 is provided apart from the sixth hard bias 36 in the direction crossing the stacking direction of layers (in the X-axis direction in the example).

The other structures of the seventh hard bias layer 30$g$ are the same as the structure of the sixth hard bias layer 30$f$.

In the example, a more appropriate hard bias can be selected for use as matched with the material and shape of the third magnetic layer 13, for example. In the example, a more appropriate hard bias can be selected for use as matched with the material and shape of the second magnetic layer 12, for example. For example, in the case where the thickness of the third magnetic layer 13 is thicker than the thickness of the second magnetic layer 12, the magnetic thickness of the seventh hard bias 37 is made thicker than the magnetic thickness of the fifth hard bias 35 and the magnetic thickness of the sixth hard bias 36. Alternatively, the magnetic thickness of the eighth hard bias 38 is made thicker than the magnetic thickness of the fifth hard bias 35 and the magnetic thickness of the sixth hard bias 36. The magnetic field of the seventh hard bias 37 is larger than the magnetic field of the fifth hard bias 35 and the magnetic field of the sixth hard bias 36. The magnetic field of the eighth hard bias 38 is larger than the magnetic field of the fifth hard bias 35 and the magnetic field of the sixth hard bias 36. Accordingly, a more appropriate bias magnetic field can be applied to the second magnetic layer 12 and the third magnetic layer 13.

Figure 46:
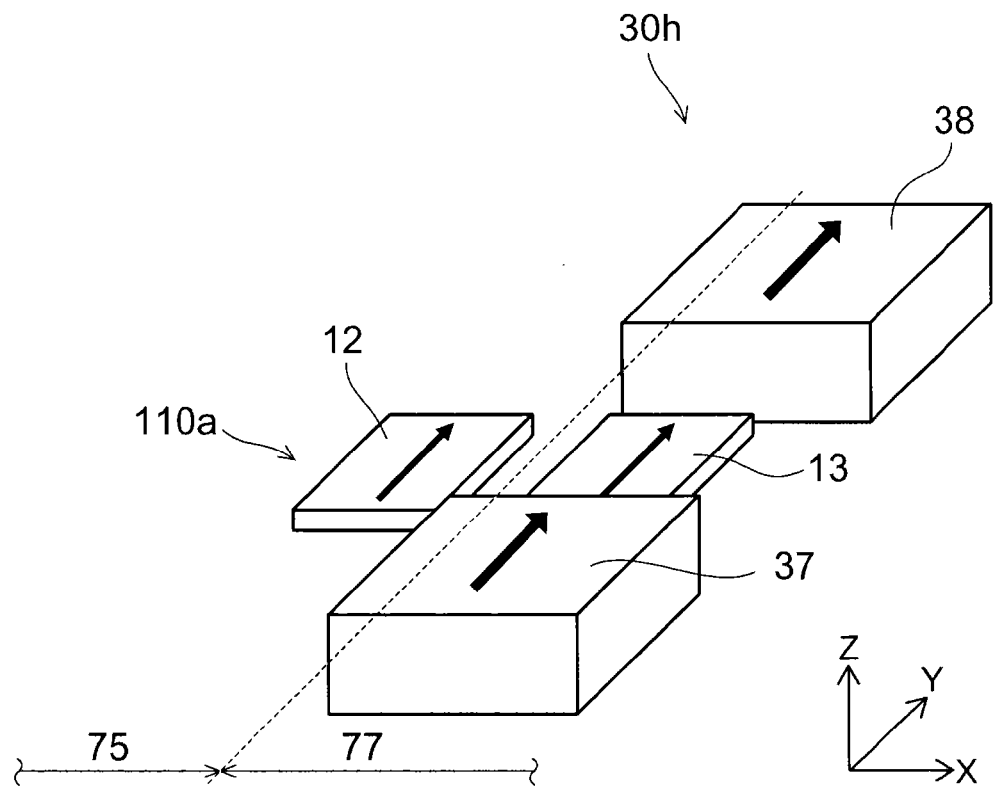
FIG. 46 is a perspective view schematically illustrating an eighth hard bias layer according to the embodiment.

FIG. 46 is a perspective view schematically illustrating an eighth hard bias layer according to the embodiment.

A pressure sensor shown in FIG. 46 includes an eighth hard bias layer 30$h$. The eighth hard bias layer 30$h$ includes the seventh hard bias 37 and the eighth hard bias 38. In other words, as compared with the sixth hard bias layer 30$f$, the eighth hard bias layer 30$h$ is not provided with the fifth hard bias 35 and the sixth hard bias 36.

The other structures of the eighth hard bias layer 30$h$ are the same as the structures of the sixth hard bias layer 30$f$.

In the example, a magnetic field is applied from the eighth hard bias layer 30$h$ to the third magnetic layer 13. In the example, a leakage magnetic field from the third magnetic layer 13 is applied to the second magnetic layer 12. Thus, the bias point of the second magnetic layer 12 can be controlled.

Figure 47:
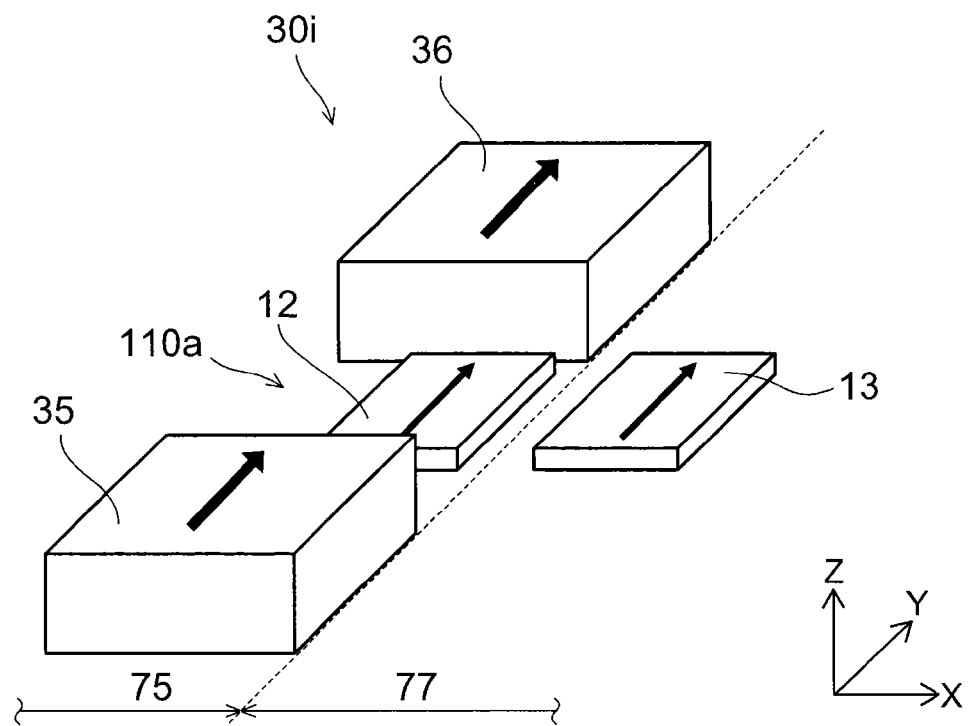
FIG. 47 is a perspective view schematically illustrating a ninth hard bias layer according to the embodiment.

FIG. 47 is a perspective view schematically illustrating a ninth hard bias layer according to the embodiment.

A pressure sensor shown in FIG. 47 includes a ninth hard bias layer 30$i$. The ninth hard bias layer 30$i$ includes the fifth hard bias 35 and the sixth hard bias 36. In other words, as compared with the sixth hard bias layer 30$f$, the ninth hard bias layer 30$i$ is not provided with the seventh hard bias 37 and the eighth hard bias 38.

The other structures of the ninth hard bias layer 30$i$ are the same as the structures of the fifth hard bias layer 30$f$.

In the example, a magnetic field is applied from the ninth hard bias layer 30$i$ to the second magnetic layer 12. In the example, a leakage magnetic field from the second magnetic layer 12 is applied to the third magnetic layer 13. Thus, the bias point of the third magnetic layer 13 can be controlled.

Figure 48:
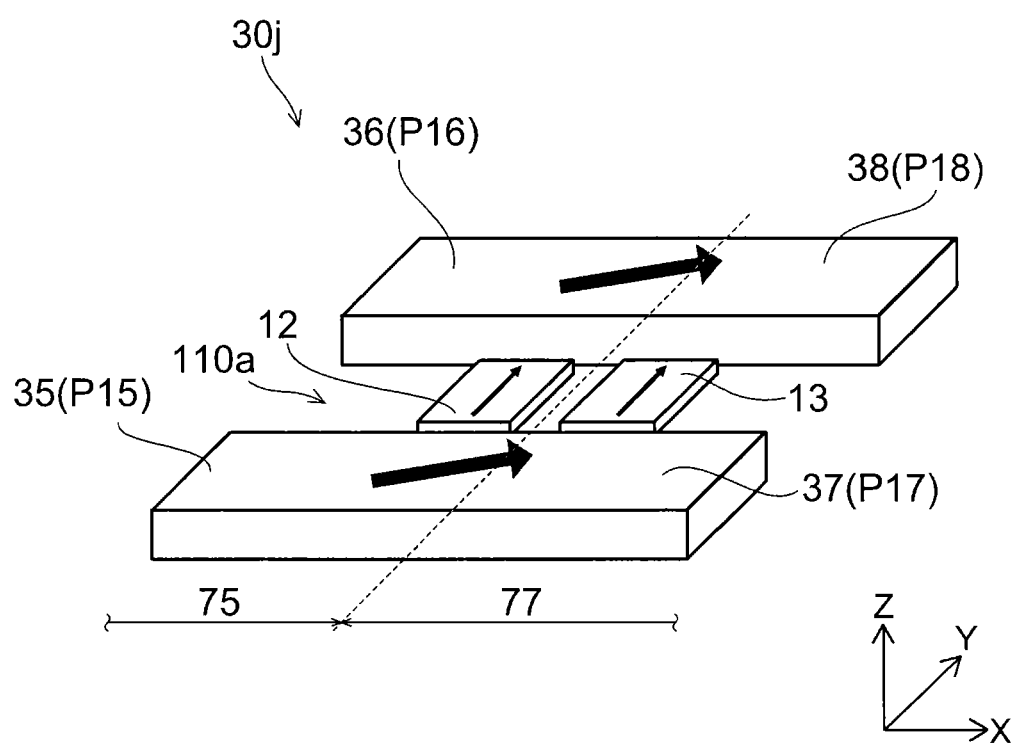
FIG. 48 is a perspective view schematically illustrating a tenth hard bias layer according to the embodiment.

FIG. 48 is a perspective view schematically illustrating a tenth hard bias layer according to the embodiment.

A pressure sensor shown in FIG. 48 includes a tenth hard bias layer 30$j$. The structure of the tenth hard bias layer 30$j$ is the same as the structure of the sixth hard bias layer 30$f$, except the magnetization direction. In the example, the magnetizations of the fifth hard bias 35 to the eighth hard bias 38 are directed to the direction tilted from the circumferential direction of the diaphragm 74 (in the direction tilted at an angle of 45°, for example).

As shown in FIG. 44 and FIG. 48, the magnetization directions of the fifth hard bias 35 to the eighth hard bias 38 are optional. The magnetization directions of the fifth hard bias 35 to the eighth hard bias 38 can be determined by adding a magnetic field of 5 kOe (oersted, Oe), for example, to the fifth hard bias 35 to the eighth hard bias 38 for magnetization.

The value of a magnetic field applied in magnetization is a value greater than the coercivity of a hard ferromagnetic material used for the fifth hard bias 35 to the eighth hard bias 38. In the case where a stacked body of a soft magnetic material and an antiferromagnetic layer is used for the fifth hard bias 35 to the eighth hard bias 38, field annealing is performed. For example, in the case where a stacked body of FeCo and IrMn is used for the fifth hard bias 35 to the eighth hard bias 38, field annealing is performed at a temperature of 290° C. for one hour. Accordingly, the magnetization of FeCo can be directed to one direction.

Structure of the Diaphragm

In the following, an exemplary structure of the diaphragm according to the embodiment will be described.

Figure 49A:
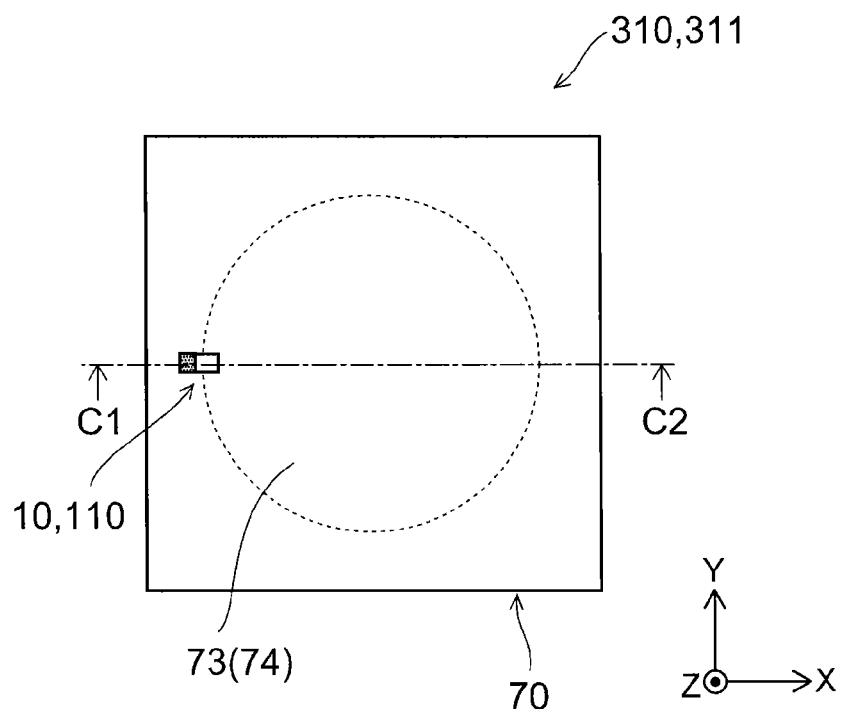
FIG. 49A and FIG. 49B are schematic views illustrating the pressure sensors according to the first embodiment and the second embodiment.
Figure 49B:
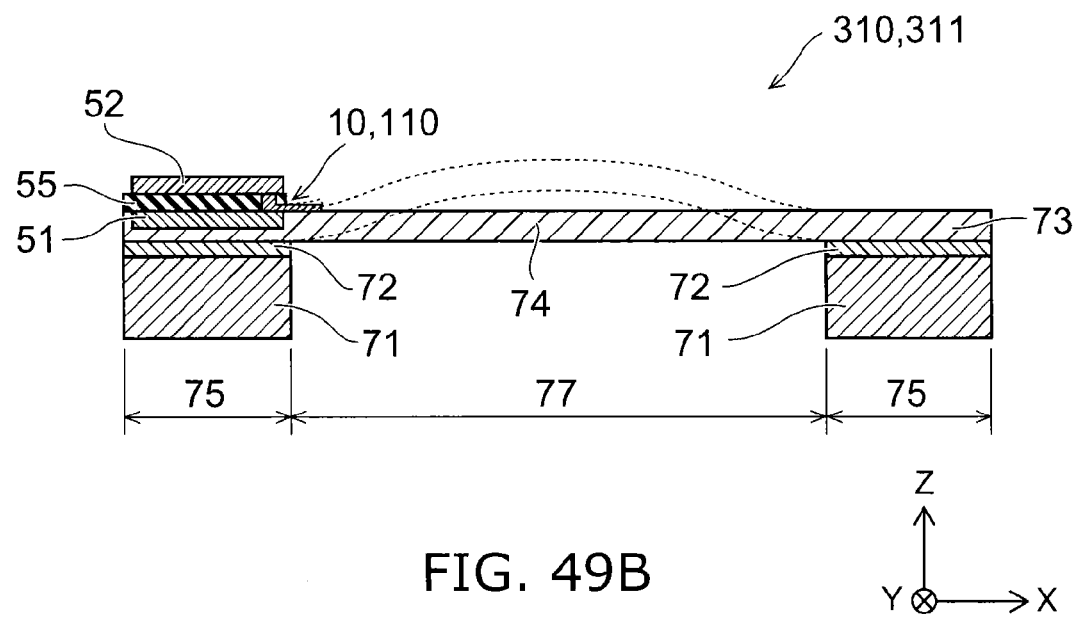

FIG. 49A and FIG. 49B are schematic views illustrating the pressure sensors according to the first embodiment and the second embodiment.

FIG. 49A is a schematic plan view. FIG. 49B is a cross-sectional view along a line C1-C2 shown in FIG. 49A. In FIG. 49A and FIG. 49B, some layers are partially omitted for easily seeing the drawings.

As shown in FIG. 49A and FIG. 49B, the diaphragm 74 in a circular shape is used for the diaphragm 74 of the pressure sensor 310 according to the first embodiment and the pressure sensor 311 according to the second embodiment.

For a manufacturing method for the diaphragm 74 in a circular shape, first, the diaphragm film 73 is formed on the support substrate 71. For example, a SiOx/Si stacked film is formed on a Si substrate by sputtering. In addition to this, a metal film such as a SiOx single layer, a SiN single layer, and Al may be formed as the diaphragm film 73. A flexible plastic material such as polyimide and parylene may be used for the diaphragm film 73. A SOI (Si-On-Insulator) substrate in which SiO2/Si is formed on a Si substrate by bonding the substrates may be used for the diaphragm film 73.

In the following, the embodiment will be described as the case is taken as an example where a SiOx/Si stacked film is formed on a Si substrate for the diaphragm film 73. The surface on which the diaphragm film 73 is formed is a substrate surface.

Subsequently, the stacked body 10 or the stacked body 110 is formed on the diaphragm film 73 on the substrate surface. The method for forming the stacked body 10 and the stacked body 110 is illustrated in FIG. 24, for example.

Subsequently, the substrate is milled from the back surface (the lower surface) to the surface (the upper surface) of the diaphragm film 73, and the hole (the diaphragm 74) of the diaphragm film 73 is then formed. For a mask for forming the hole of the diaphragm film 73, a double-side aligner exposure device is used, for example. Accordingly, the hole pattern of a resist is patterned on the back surface as matched with the location of the stacked body 10 (or the stacked body 110) on the surface.

Subsequently, the Si substrate is etched. For the etching method, a Bosch process using RIE is used, for example. In the Bosch process, an etching process step using a $SF_6$ gas and a film forming process step using a $C_4F_8$ gas are repeated. Accordingly, etching is selectively performed in the depth direction (in the Z-axis direction) of the support substrate 71 while suppressing the etching of the sidewall of the support substrate 71. A point at which a SiOx layer is provided is used for an etching end point, for example. In other words, etching is stopped at the SiOx layer having a selection ratio greater than the selection ratio of Si. Here, the SiOx layer functioning as the etching stopper layer may be used for a part of the diaphragm 74 as it is. Alternatively, the SiOx layer may be removed in a process such as anhydrous hydrofluoric acid and alcohol after etching is stopped.

Third Embodiment

Figure 50A:
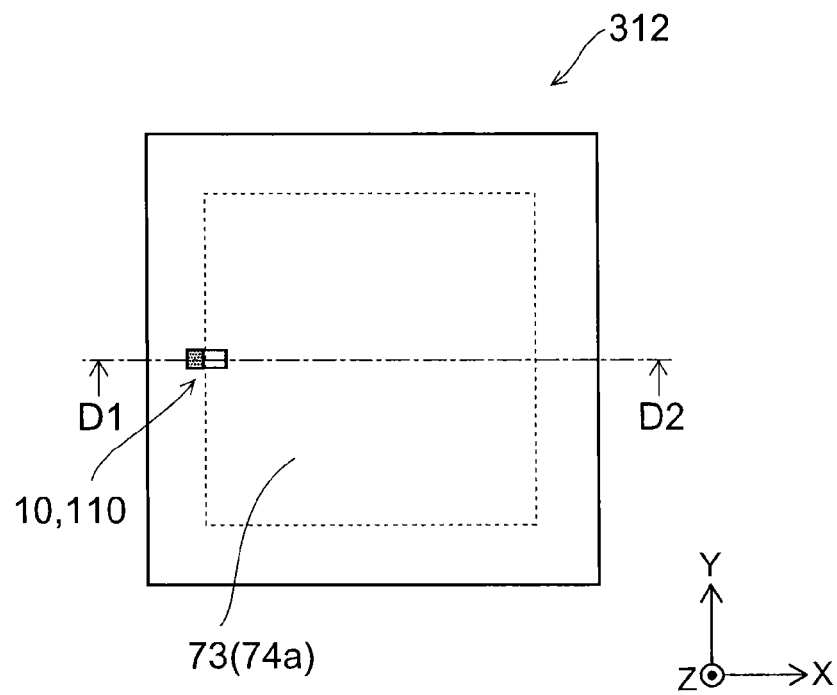
FIG. 50A and FIG. 50B are schematic views illustrating a pressure sensor according to a third embodiment.
Figure 50B:
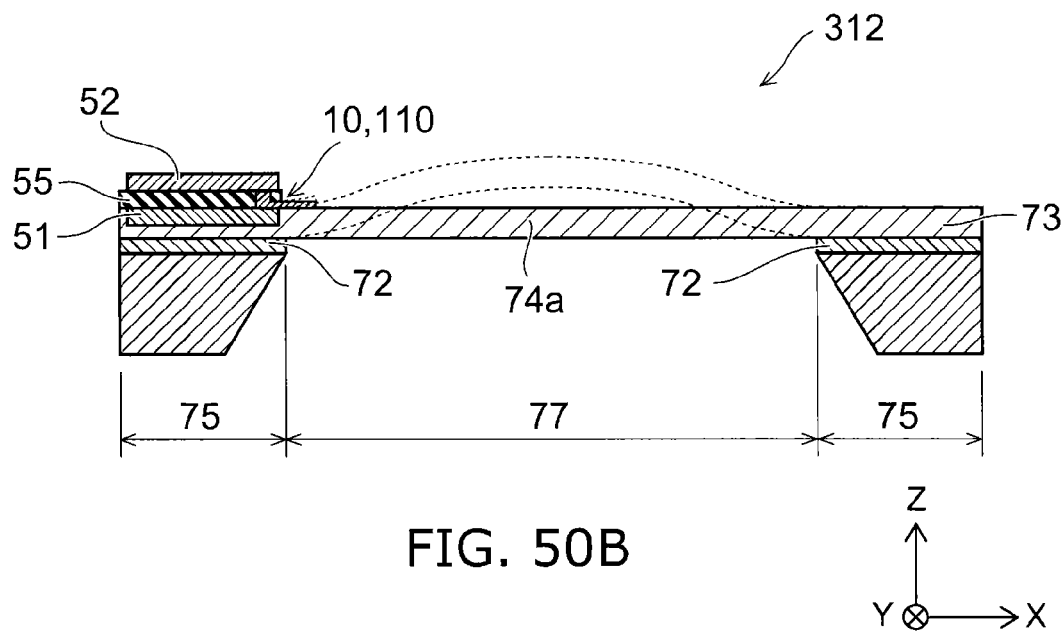

FIG. 50A and FIG. 50B are schematic views illustrating a pressure sensor according to a third embodiment.

FIG. 50A is a schematic plan view. FIG. 50B is a cross-sectional view along a line D1-D2 shown in FIG. 50A. In FIG. 50A and FIG. 50B, some layers are partially omitted for easily seeing the drawings.

As shown in FIG. 50A and FIG. 50B, a rectangular diaphragm 74a is used for a diaphragm 74a of a pressure sensor 312 according to the third embodiment.

For a manufacturing method for the rectangular diaphragm 74a, a method similar to the manufacturing method for the diaphragm 74 in a circular shape is used. In the rectangular diaphragm 74a, in the process step of etching a Si substrate, Si anisotropic etching may be performed using an etching solution (a KOH aqueous solution, for example). In the case where such etching is performed, as shown in FIG. 50B, the structure of a hole pattern has a structure tilted as corresponding to the crystal plane of the Si substrate.

Fourth Embodiment

Figure 51A:
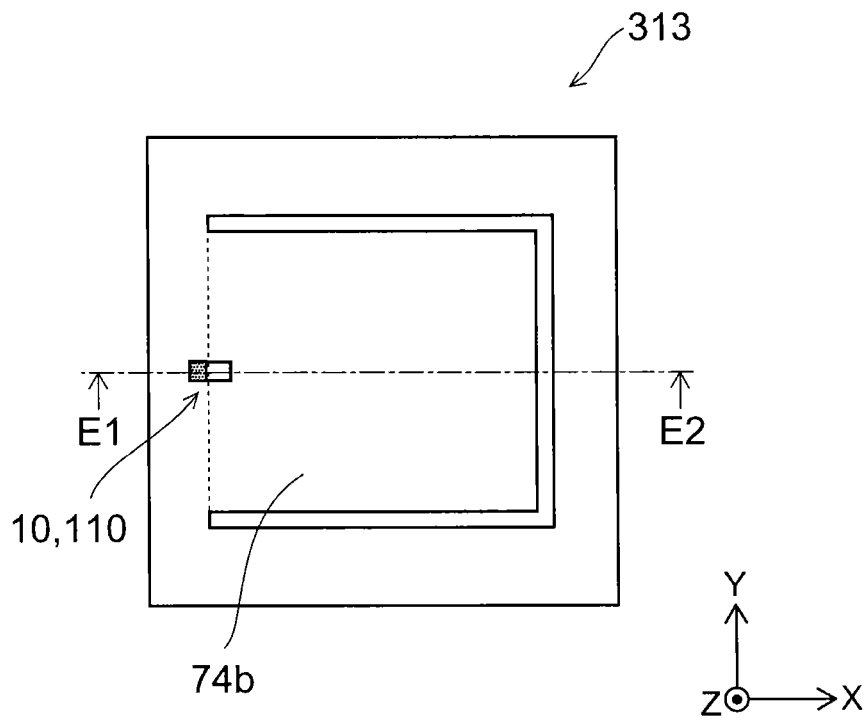
FIG. 51A and FIG. 51B are schematic views illustrating a pressure sensor according to a fourth embodiment.
Figure 51B:
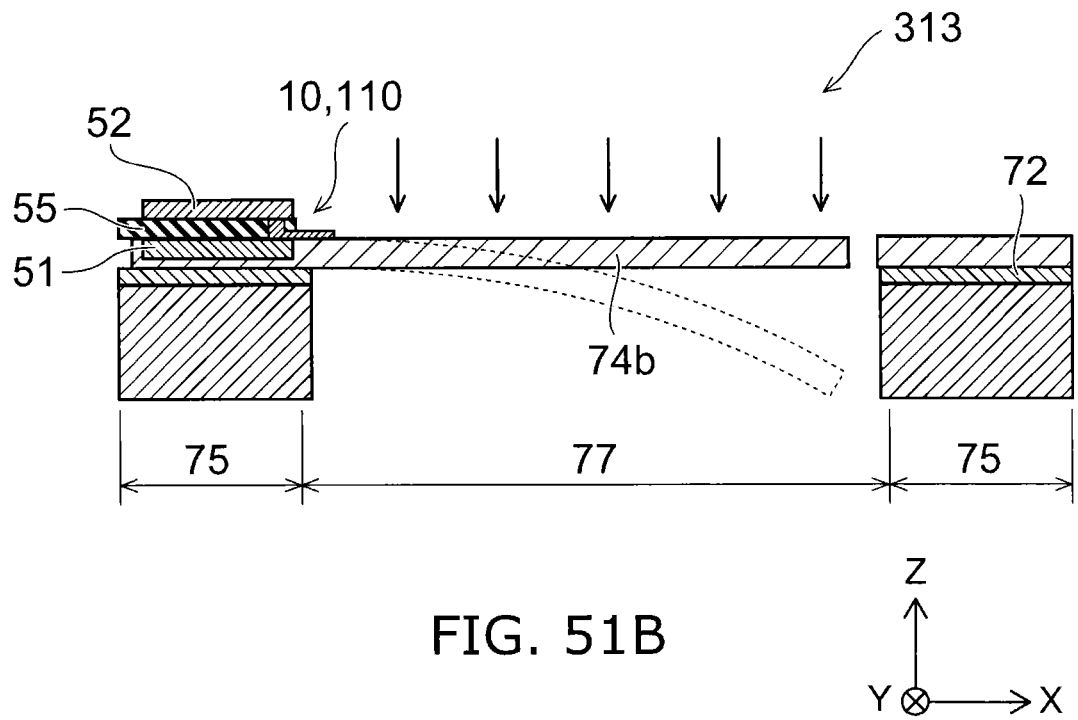

FIG. 51A and FIG. 51B are schematic views illustrating a pressure sensor according to a fourth embodiment.

FIG. 51A is a schematic plan view. FIG. 51B is a cross-sectional view along a line E1-E2 shown in FIG. 51A. In FIG. 51A and FIG. 51B, some layers are partially omitted for easily seeing the drawings.

As shown in FIG. 51A and FIG. 51B, for the structure of a structure unit 74b that is deformed to a pressure of a pressure sensor 313 according to the fourth embodiment, a cantilever structure can be used. The cantilever structure can be formed in which a cantilever is formed on a patterned sacrificial layer (not shown) and the sacrificial layer is then removed, for example.

Fifth Embodiment

Figure 52A:
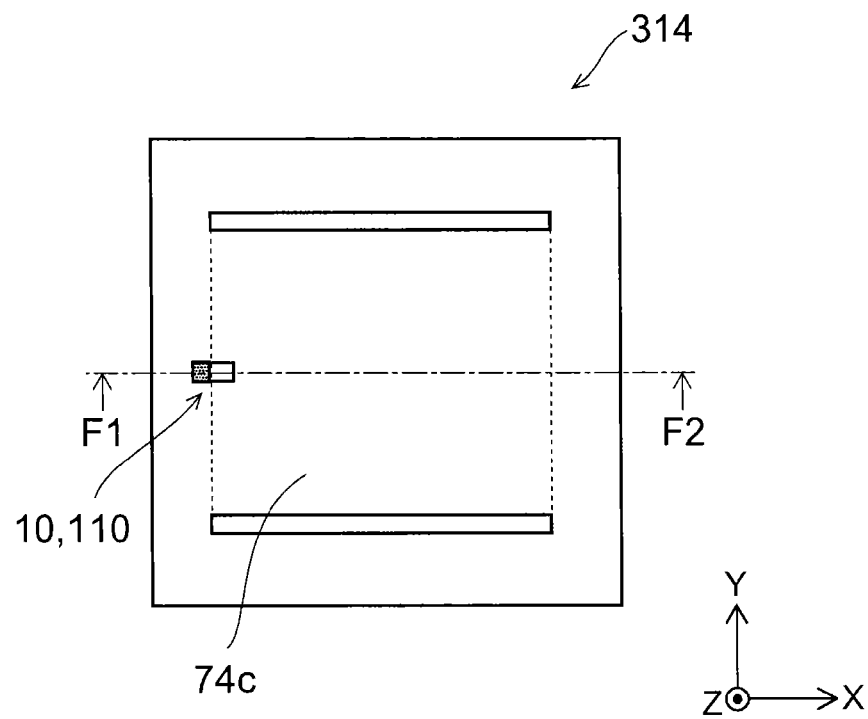
FIG. 52A and FIG. 52B are schematic views illustrating a pressure sensor according to a fifth embodiment.
Figure 52B:
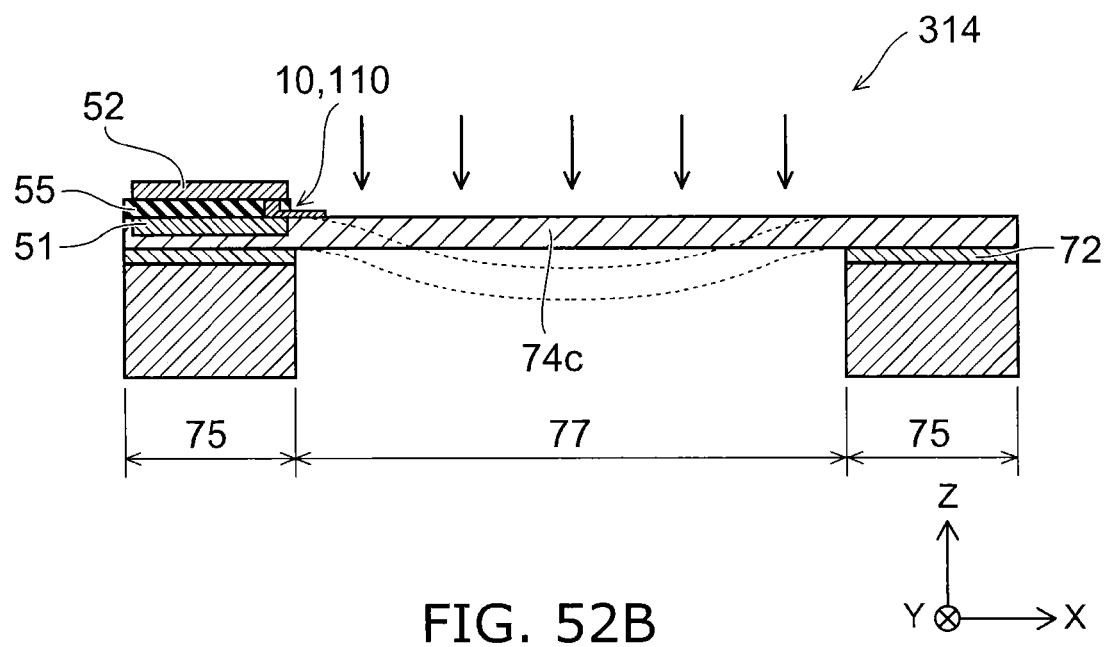

FIG. 52A and FIG. 52B are schematic views illustrating a pressure sensor according to a fifth embodiment.

FIG. 52A is a schematic plan view. FIG. 52B is a cross-sectional view along a line F1-F2 shown in FIG. 52A. In FIG. 52A and FIG. 52B, some layers are partially omitted for easily seeing the drawings.

As shown in FIG. 52A and FIG. 52B, for the structure of a structure unit 74c that is deformed to a pressure of a pressure sensor 314 according to the fifth embodiment, a double-supported beam structure can be used.

Sixth Embodiment

Figure 53A:
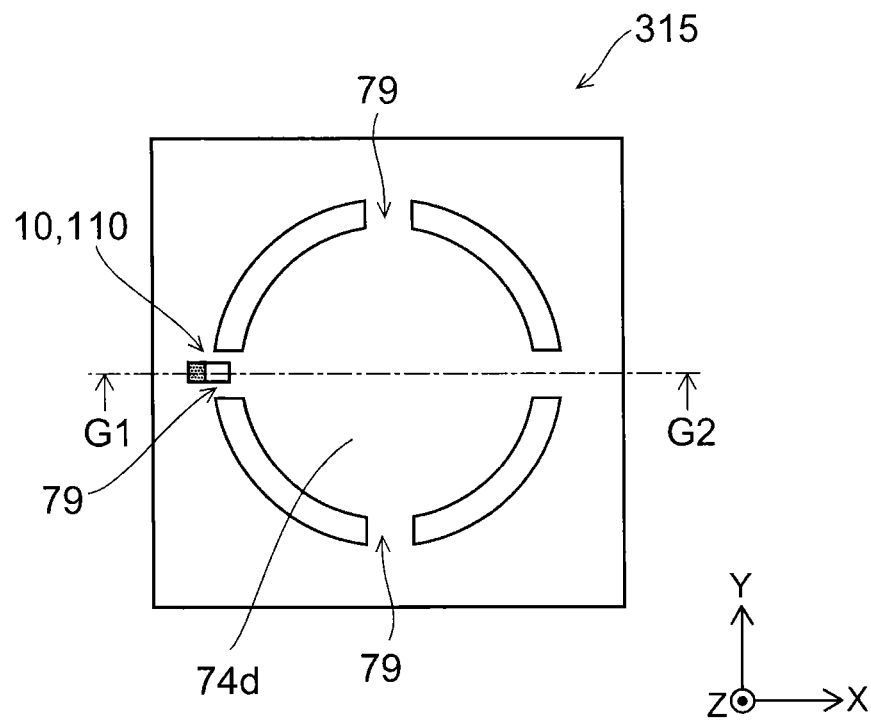
FIG. 53A and FIG. 53B are schematic views illustrating a pressure sensor according to a sixth embodiment.
Figure 53B:
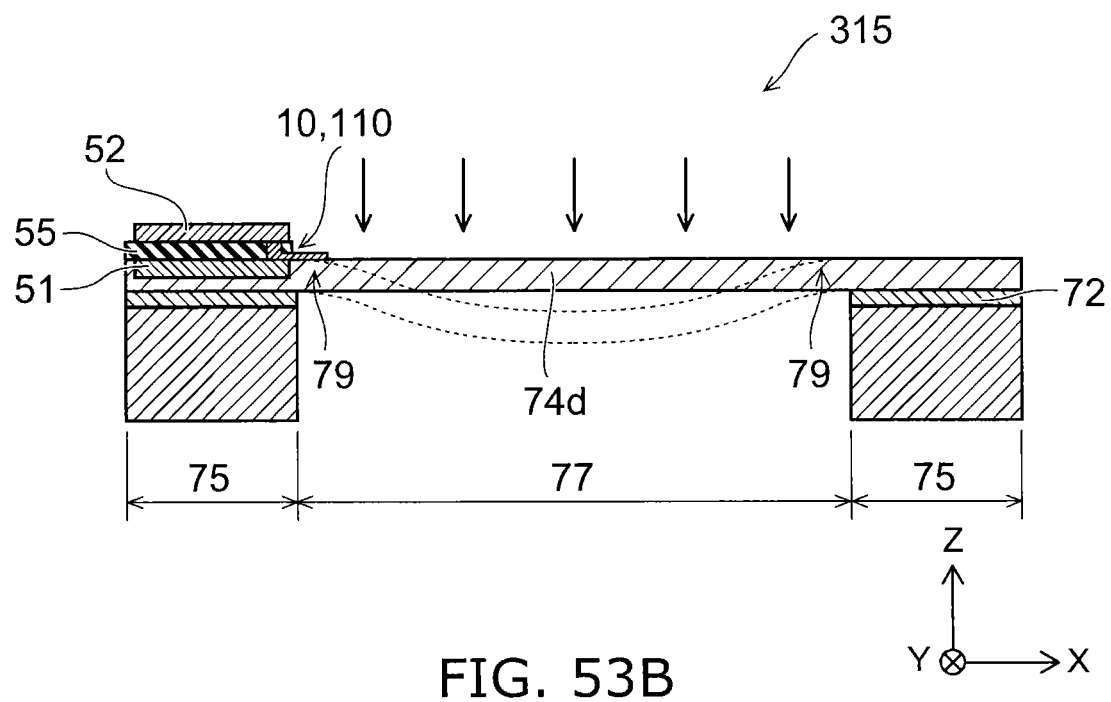

FIG. 53A and FIG. 53B are schematic views illustrating a pressure sensor according to a sixth embodiment.

FIG. 53A is a schematic plan view. FIG. 53B is a cross-sectional view along a line G1-G2 shown in FIG. 53A. In FIG. 53A and FIG. 53B, some layers are partially omitted for easily seeing the drawings.

As shown in FIG. 53A and FIG. 53B, in a pressure sensor 315, for a structure unit (a diaphragm 74d) that is deformed to a pressure, the diaphragm 74d provided with a beam 79 can be used. The diaphragm 74d provided with the beam 79 is formed as below, for example. A double-supported beam is formed on a patterned sacrificial layer (not shown), and the sacrificial layer is then removed. Accordingly, the diaphragm 74d provided with the beam 79 can be formed.

As described above, the structures of the diaphragms according to the embodiment are described with reference to FIG. 49A to FIG. 53B. The structures of the diaphragms according to the embodiments are not limited to these structures. In the embodiments, there is provided the stacked body (the stacked body 10 or the stacked body 110, for example) including the magnetization free layer (the second magnetic layer 12, for example) formed on the support substrate (that is a portion not deformed to a pressure, the first region 75), and there is provided the magnetization free layer (the third magnetic layer 13, for example) formed on the diaphragm (that is a portion deformed to a pressure, the second region 77). In the pressure sensor, the structure of a portion that is deformed to a pressure is optional.

Circuit Configuration of the Pressure Sensor

In the following, an exemplary circuit configuration of the pressure sensor according to the embodiment will be described.

Figure 54A:
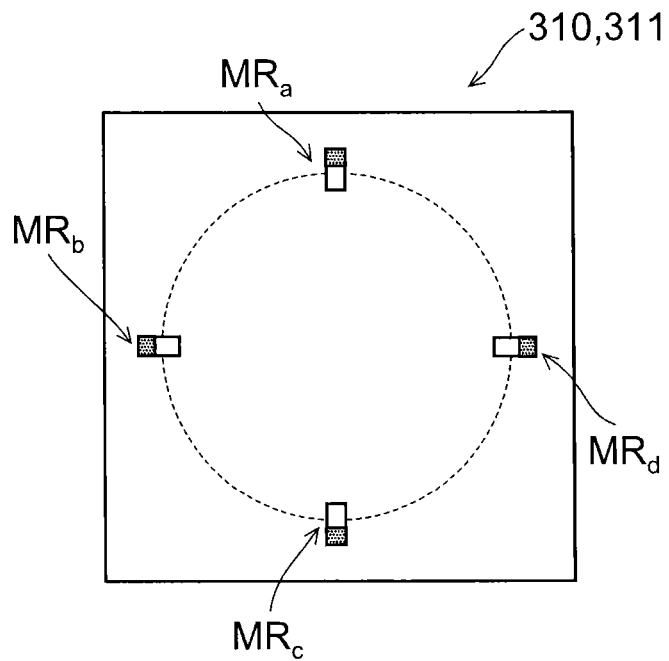
FIG. 54A and FIG. 54B are schematic views illustrating the pressure sensor according to the first embodiment.
Figure 54B:
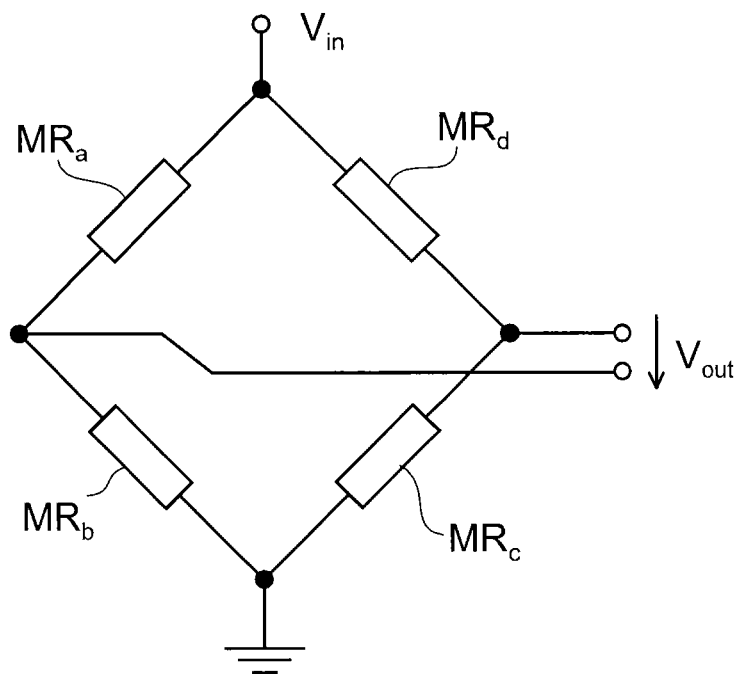

FIG. 54A and FIG. 54B are schematic views illustrating the pressure sensor according to the first embodiment.

FIG. 54A is a schematic plan view. FIG. 54B is a block diagram illustrating the circuit of the pressure sensor.

Here, the extraction of the electrical resistance of the pressure sensor 310 according to the first embodiment will be described. The extraction of the electrical resistance of the pressure sensor 311 according to the second embodiment is the same as the extraction of the electrical resistance of the pressure sensor 310 according to the first embodiment.

In the pressure sensor 310 according to the first embodiment, a voltage terminal and a current terminal are mounted at two terminals or four terminals on the stacked body 10 formed on the diaphragm 74 (on the second region 77). Accordingly, an electrical resistance can be measured under bias at a constant voltage or a constant current.

As shown in FIG. 54A, for example, a first stacked body MRa and a third stacked body MRc are arranged in one direction (in a first direction) perpendicular to the stacking direction of layers. A second stacked body MRb and a fourth stacked body MRd are arranged in a second direction perpendicular to the first direction and perpendicular to the stacking direction of layers. A line segment connecting the first stacked body MRa to the third stacked body MRc is orthogonal to a line segment connecting the second stacked body MRb to the fourth stacked body MRd.

As shown in FIG. 54B, in the pressure sensor 310 according to the first embodiment, a bridge circuit is formed by a plurality of the stacked bodies (the first to the fourth stacked bodies MRa, MRb, MRc, and MRd) formed on the diaphragm 74. A Wheatstone bridge as shown in FIG. 54B is formed by the first to the fourth stacked bodies MRa, MRb, MRc, and MRd disposed at four locations on the diaphragm 74.

In the pressure sensor 310, the directions of strain caused on the diaphragm 74 at locations at which the first stacked body MRa and the third stacked body MRc are disposed are different at an angle of 90° to the directions of strain caused on the diaphragm 74 at locations at which the second stacked body MRb and the fourth stacked body MRd are disposed. The orientation of the initial magnetization of the magnetization free layer of the stacked body is appropriately adjusted using the differences. Accordingly, the polarity of a change in electrical resistance to a pressure in the first stacked body MRa and the third stacked body MRc can be reversed to the polarity of a change in electrical resistance to a pressure in the second stacked body MRb and the fourth stacked body MRd.

The stacked bodies having the pressure and electrical resistance characteristics in reverse polarities are combined and the Wheatstone bridge shown in FIG. 54B is used, so that a pressure sensitivity finally obtained can be amplified four times at the maximum. Temperature can be compensated using the Wheatstone bridge shown in FIG. 54B. Accordingly, a temperature compensation device provided outside the diaphragm 74 can be omitted.

Seventh Embodiment

Figure 55:
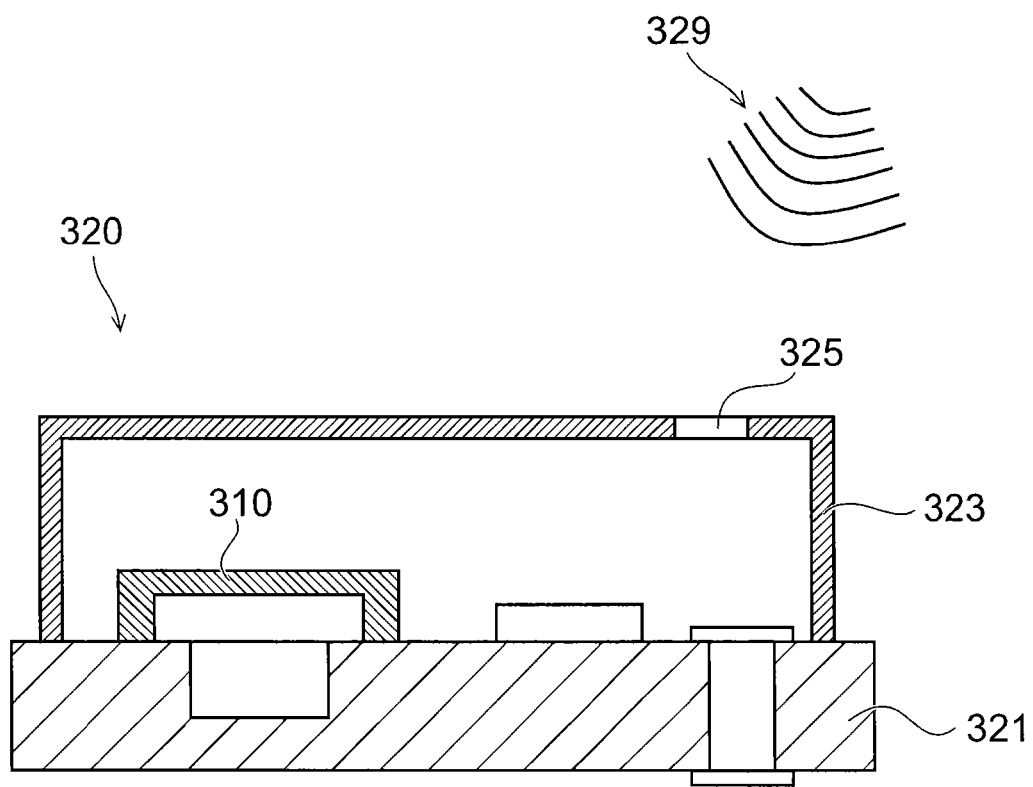
FIG. 55 is a schematic cross-sectional view illustrating an audio microphone according to a seventh embodiment.

FIG. 55 is a schematic cross-sectional view illustrating an audio microphone according to a seventh embodiment.

In the following, the embodiment will be described as the case is taken as an example where an audio microphone 320 according to the embodiment includes the pressure sensor 310 according to the first embodiment. The audio microphone 320 according to the embodiment includes any one of the pressure sensors according to the first embodiment to the sixth embodiment and the pressure sensors of the modifications.

The audio microphone 320 according to the embodiment includes a printed wiring board 321, a cover 323, and the pressure sensor 310. The printed wiring board 321 includes a circuit such as an amplifier, for example. An acoustic hole 325 is provided on the cover 323. A sound 329 passes through the acoustic hole 325, and enters the inside of the cover 323.

The pressure sensor 310 according to the first embodiment is applied as the audio microphone 320. The audio microphone 320 is a pressure sensor that responds to an acoustic pressure. Thus, the pressure sensor 310 of high sensitivity can be used as the audio microphone 320 of high sensitivity. As shown in FIG. 55, in the case where the pressure sensor 310 is used as the audio microphone 320, the pressure sensor 310 is mounted on the printed wiring board 321, and an electrical signal line is lead out. The cover 323 is provided on the printed wiring board 321 so as to cover the pressure sensor 310.

The pressure sensor 310 according to the first embodiment is used, so that the audio microphone 320 of high sensitivity can be provided.

Eighth Embodiment

Figure 56A:
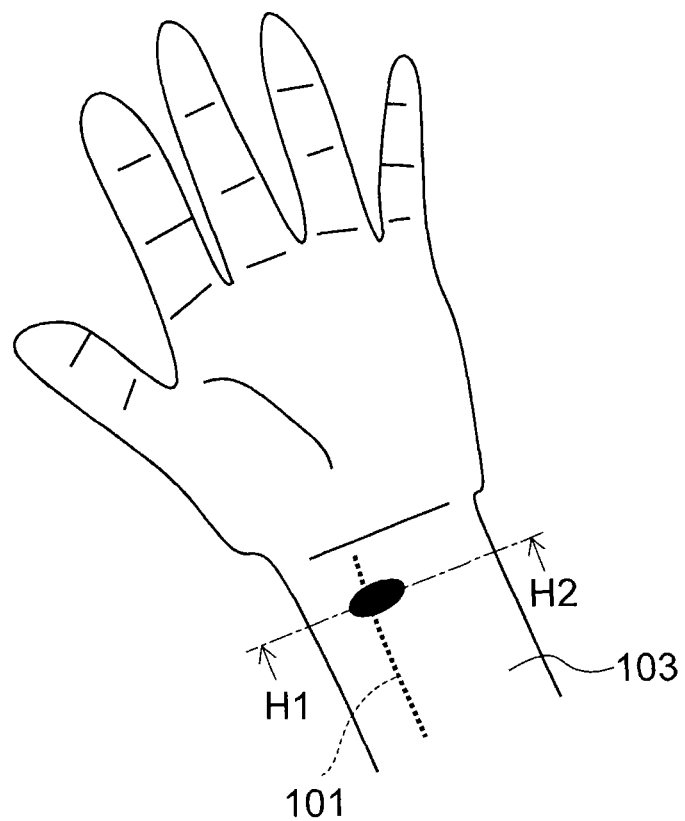
FIG. 56A and FIG. 56B are schematic views illustrating a blood pressure sensor according to an eighth embodiment.
Figure 56B:
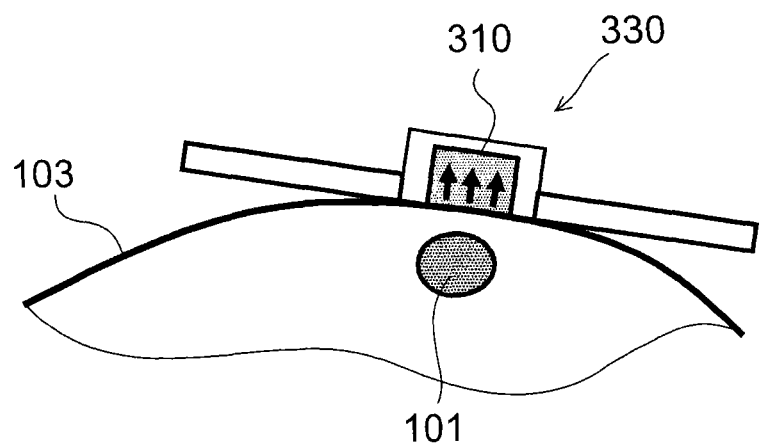

FIG. 56A and FIG. 56B are schematic views illustrating a blood pressure sensor according to an eighth embodiment.

FIG. 56A is a schematic plan view illustrating the skin on a human artery blood vessel. FIG. 56B is a cross-sectional view along a line H1-H2 shown in FIG. 56A.

In the following, the embodiment will be described as the case is taken as an example where a blood pressure sensor 330 according to the embodiment includes the pressure sensor 310 according to the first embodiment. The blood pressure sensor 330 according to the embodiment includes any one of the pressure sensors according to the first embodiment to the sixth embodiment and the pressure sensors of the modifications.

The pressure sensor 310 according to the first embodiment is applied as the blood pressure sensor 330. The pressure sensor 310 according to the first embodiment is used, so that highly sensitive pressure sensing is made possible using a small-sized pressure sensor. Thus, as shown in FIG. 56B, the pressure sensor 310 is pressed against a skin 103 on an artery blood vessel 101, so that the blood pressure sensor 330 can continuously measure blood pressures.

Ninth Embodiment

Figure 57:
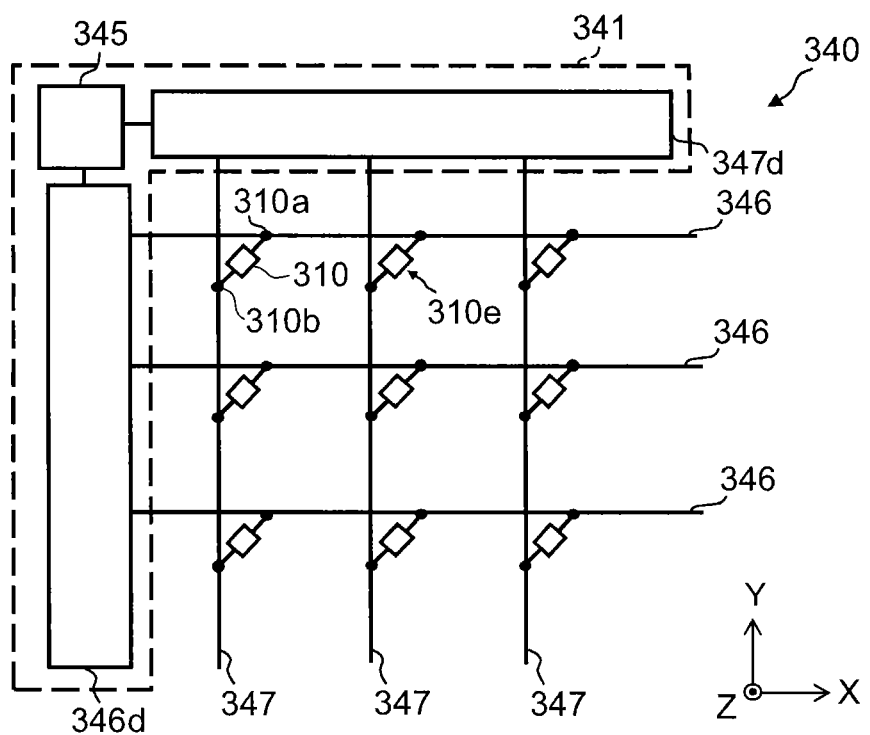
FIG. 57 is a schematic view illustrating a touch panel according to a ninth embodiment.

FIG. 57 is a schematic view illustrating a touch panel according to a ninth embodiment.

In the following, the embodiment will be described as the case is taken as an example where a touch panel 340 according to the embodiment includes the pressure sensor 310 according to the first embodiment. The touch panel 340 according to the embodiment includes any one of the pressure sensors according to the first embodiment to the sixth embodiment and the pressure sensors of the modifications.

The pressure sensor 310 according to the first embodiment is used in the touch panel 340. In the touch panel 340, the pressure sensor 310 is mounted on at least one of the inside and the ousted of the display.

For example, the touch panel 340 includes a plurality of first interconnections 346, a plurality of second interconnections 347, a plurality of the pressure sensors 310, and a control unit 341.

The first interconnections 346 are arranged along a first direction (the Y-axis direction in the example). The first interconnections 346 individually extend along a second direction crossing the first direction (the X-axis direction in the example).

The second interconnections 347 are arranged along a third direction crossing the first direction (the X-axis direction in the example). The second interconnections 347 individually extend along a fourth direction crossing the third direction (the Y-axis direction in the example).

The pressure sensors 310 are provided at intersecting portions of the first interconnections 346 with the second interconnections 347. One of the pressure sensors 310 is one of detection elements 310e for detection. Here, the intersecting portion includes a region around a location at which the first interconnection 346 crosses the second interconnection 347.

One ends 310a of the pressure sensors 310 are individually connected to the first interconnections 346. Other ends 310b of the pressure sensors 310 are individually connected to the second interconnections 347.

The control unit 341 is connected to the first interconnections 346 and the second interconnections 347.

For example, the control unit 341 includes a first interconnection circuit 346d connected to the first interconnections 346, a second interconnection circuit 347d connected to the second interconnections 347, and a controller 345 connected to the first interconnection circuit 346d and the second interconnection circuit 347d.

The pressure sensor 310 according to the first embodiment is small in size and can perform highly sensitive pressure sensing. Thus, a touch panel of high definition can be implemented.

The pressure sensors according to the first embodiment to the sixth embodiment can be used for various pressure sensor devices such as an atmospheric pressure sensor and an air pressure sensor for tires other than the applications described above.

According to the embodiments, a highly sensitive pressure sensor, audio microphone, blood pressure sensor, and touch panel can be provided.

As described above, the embodiments of the invention are described with reference to specific examples. However, the embodiments of the invention are not limited to these specific examples. For example, the specific configurations of the components such as the support substrate, the etching stopper layer, the diaphragm film, the electrode, the insulator, the under layer, the magnetic layer, the spacer layer, the reference layer, the magnetic coupling layer, the pinning layer, and the cap layer included in the pressure sensor are included in the scope of the invention as long as a person skilled in the art appropriately selects ones from a publicly known range, similarly implements the invention, and can obtain similar effects.

Further, any two or more components of the specific examples may be combined within the extent of technical feasibility and are included in the scope of the invention to the extent that the purport of the invention is included.

Moreover, all pressure sensors, audio microphones, blood pressure sensors, and touch panels practicable by an appropriate design modification by one skilled in the art based on the pressure sensors, the audio microphones, the blood pressure sensors, and the touch panels described above as embodiments of the invention also are within the scope of the invention to the extent that the purport of the embodiments of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A pressure sensor comprising:
   a substrate including a first region and a second region having a thickness thinner than a thickness of the first region;
   a first electrode provided on the first region;
   a second electrode provided on the first electrode;
   a first magnetic layer provided between the first electrode and the second electrode;
   a second magnetic layer provided between the first electrode and the first magnetic layer or between the first magnetic layer and the second electrode, a magnetization direction of the second magnetic layer being variable;
   a spacer layer provided between the first magnetic layer and the second magnetic layer in a stacking direction of layers from the first electrode to the second electrode; and
   a third magnetic layer provided continuously with the second magnetic layer on the second region, a magnetization of the third magnetic layer being changed according to strain caused on the second region.

2. The sensor according to claim 1, wherein the magnetization direction of the second magnetic layer is changed according to a magnetization direction of the third magnetic layer.

3. The sensor according to claim 1, further comprising a fourth magnetic layer provided between the second magnetic layer and the spacer layer, a magnetization direction of the fourth magnetic layer being variable.

4. The sensor according to claim 3, wherein the magnetization direction of the fourth magnetic layer is changed according to a magnetization direction of the second magnetic layer.

5. The sensor according to claim 1, further comprising a fifth magnetic layer provided on the third magnetic layer, a magnetization direction of the fifth magnetic layer being variable.

6. The sensor according to claim 5, wherein the magnetization direction of the fifth magnetic layer is changed according to a magnetization direction of the third magnetic layer.

7. The sensor according to claim 1, wherein an absolute value of a magnetostriction constant of the third magnetic layer is greater than an absolute value of a magnetostriction constant of the second magnetic layer.

8. The sensor according to claim 1, wherein a volume of the third magnetic layer is larger than a volume of the second magnetic layer.

9. The sensor according to claim 1, wherein a projected area of the third magnetic layer to a plane orthogonal to the stacking direction of layers is larger than a projected area of the second magnetic layer to a plane orthogonal to the stacking direction of layers.

10. The sensor according to claim 1, wherein a thickness of the third magnetic layer in the stacking direction of layers is thicker than a thickness of the second magnetic layer in the stacking direction of layers.

11. The sensor according to claim 1, further comprising
a first hard bias provided on the first region, and
a second hard bias provided on the first region,
the second magnetic layer being provided between the first hard bias and the second hard bias in a direction crossing the stacking direction of layers.

12. The sensor according to claim 1, further comprising
a third hard bias provided on the second region, and
a fourth hard bias provided on the second region,
the third magnetic layer being provided between the third hard bias and the fourth hard bias in a direction crossing the stacking direction of layers.

13. The sensor according to claim 1, further comprising
a first hard bias provided on the first region,
a second hard bias provided on the first region,
a third hard bias provided on the second region, and
a fourth hard bias provided on the second region,
the second magnetic layer being provided between the first hard bias and the second hard bias in a direction crossing the stacking direction of layers,
the third magnetic layer being provided between the third hard bias and the fourth hard bias in a direction crossing the stacking direction of layers.

14. The sensor according to claim 13, wherein
the third hard bias is provided continuously with the first hard bias, and
the fourth hard bias is provided continuously with the second hard bias.

15. The sensor according to claim 13, wherein
the third hard bias is provided apart from the first hard bias in a direction crossing the stacking direction of layers, and
the fourth hard bias is provided apart from the second hard bias in a direction crossing the stacking direction of layers.

16. An audio microphone comprising the sensor according to claim 1.

17. A blood pressure sensor comprising the sensor according to claim 1.

18. A touch panel comprising the sensor according to claim 1.

19. A pressure sensor comprising:
a substrate including a first region and a second region having a thickness thinner than a thickness of the first region;
a first electrode provided on the first region;
a second electrode provided on the first electrode;
a first magnetic layer provided between the first electrode and the second electrode;
a second magnetic layer provided between the first electrode and the first magnetic layer or between the first magnetic layer and the second electrode, a magnetization direction of the second magnetic layer being variable;
a spacer layer provided between the first magnetic layer and the second magnetic layer in a stacking direction of layers from the first electrode to the second electrode; and
a third magnetic layer provided on the second region and apart from the second magnetic layer, a magnetization of the third magnetic layer being changed according to strain caused on the second region.

20. The sensor according to claim 19, wherein the magnetization direction of the second magnetic layer is changed according to a magnetization direction of the third magnetic layer.

21. The sensor according to claim 19, wherein an absolute value of a magnetostriction constant of the third magnetic layer is greater than an absolute value of a magnetostriction constant of the second magnetic layer.

22. The sensor according to claim 19, wherein a volume of the third magnetic layer is larger than a volume of the second magnetic layer.

23. The sensor according to claim 19, wherein a projected area of the third magnetic layer to a plane orthogonal to the stacking direction of layers is larger than a projected area of the second magnetic layer to a plane orthogonal to the stacking direction of layers.

24. The sensor according to claim 19, wherein a thickness of the third magnetic layer in the stacking direction of layers is thicker than a thickness of the second magnetic layer in the stacking direction of layers.

25. The sensor according to claim 19, further comprising
a first hard bias provided on the first region, and
a second hard bias provided on the first region,
the second magnetic layer being provided between the first hard bias and the second hard bias in a direction crossing the stacking direction of layers.

26. The sensor according to claim 19, further comprising
a third hard bias provided on the second region, and
a fourth hard bias provided on the second region,
the third magnetic layer being provided between the third hard bias and the fourth hard bias in a direction crossing the stacking direction of layers.

27. The sensor according to claim 19, further comprising
a first hard bias provided on the first region,
a second hard bias provided on the first region,
a third hard bias provided on the second region, and
a fourth hard bias provided on the second region,
the second magnetic layer being provided between the first hard bias and the second hard bias in a direction crossing the stacking direction of layers,
the third magnetic layer being provided between the third hard bias and the fourth hard bias in a direction crossing the stacking direction of layers.

28. The sensor according to claim 27, wherein
the third hard bias is provided continuously with the first hard bias, and
the fourth hard bias is provided continuously with the second hard bias.

29. The sensor according to claim 27, wherein
the third hard bias is provided apart from the first hard bias in a direction crossing the stacking direction of layers, and the fourth hard bias is provided apart from the second hard bias in a direction crossing the stacking direction of layers.

30. An audio microphone comprising the sensor according to claim 19.

31. A blood pressure sensor comprising the sensor according to claim 19.

32. A touch panel comprising the sensor according to claim 19.

* * * * *